United States Patent
Hamabe

(10) Patent No.: US 7,050,761 B2
(45) Date of Patent: May 23, 2006

(54) MOBILE COMMUNICATION SYSTEM, TRANSMISSION MODE SWITCHING METHOD, AND RECORDING MEDIUM HAVING TRANSMISSION MODE SWITCHING METHOD RECORDED THEREON

(75) Inventor: Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 615 days.

(21) Appl. No.: 10/083,477

(22) Filed: Feb. 27, 2002

(65) Prior Publication Data

US 2002/0119757 A1 Aug. 29, 2002

(30) Foreign Application Priority Data

Feb. 28, 2001 (JP) ........................................ 2001-053452

(51) Int. Cl.
*H04B 1/00* (2006.01)
*H04B 7/00* (2006.01)

(52) U.S. Cl. ........................ 455/69; 455/68; 455/67.11; 455/67.13; 455/522; 370/252; 375/222

(58) Field of Classification Search ............. 455/67.11, 455/13, 67.16, 550.1, 68, 552.1, 69, 226.1–2, 455/415, 419; 370/235–236, 331–333, 242, 370/245, 437, 465; 714/708–709, 759–760; 375/220–222, 240.26–27

See application file for complete search history.

(56) References Cited

U.S. PATENT DOCUMENTS

| | | | | |
|---|---|---|---|---|
| 5,450,438 A | * | 9/1995 | Landry et al. ............... | 375/222 |
| 5,699,365 A | * | 12/1997 | Klayman et al. ............ | 714/708 |
| 6,301,265 B1 | * | 10/2001 | Kleider et al. .............. | 370/465 |
| 6,381,467 B1 | * | 4/2002 | Hill et al. ................... | 455/519 |
| 6,662,009 B1 | * | 12/2003 | Lynn .......................... | 455/424 |
| 6,823,194 B1 | * | 11/2004 | Haim .......................... | 455/522 |
| 2002/0055359 A1 | * | 5/2002 | Andersson et al. ......... | 455/426 |

FOREIGN PATENT DOCUMENTS

| | | |
|---|---|---|
| CN | 1130452 A | 7/1996 |
| EP | 0963074 | * 8/1999 |
| EP | 0 963 074 A2 | 12/1999 |

(Continued)

OTHER PUBLICATIONS

Japanese Office Action dated Jan. 6, 2004, with partial English translation.
Korean Office Action dated Mar. 12, 2004 with Japanese Translation.
Chinese Office Action dated Jun. 10, 2005 ( with English translation).

*Primary Examiner*—Vivian Chin
*Assistant Examiner*—Tuan Tran
(74) *Attorney, Agent, or Firm*—McGinn & Gibb, PLLC

(57) ABSTRACT

To provide a mobile communication system capable of easily performing selection of an optimal transmission mode. Upon receiving a receiving error notice from a mobile station, a transmission mode switching selecting portion of a base station forwards an instruction to switch a transmission mode to a mode slower than a current transmission mode to a modulation/coding portion. After receiving the receiving error notice, if the receiving error notice is not continuously received for a predetermined number of blocks Ns, the transmission mode switching selecting portion forwards an instruction to switch a transmission mode to a mode faster than the current transmission mode to the modulation/coding portion. The modulation/coding portion switches the modulation/coding code to any one of a QPSK modulation/coding circuit, a 16QAM modulation/coding circuit and a 64QAM modulation/coding circuit in response to the switching instruction and performs modulation/coding in the circuit switched to.

26 Claims, 41 Drawing Sheets

FOREIGN PATENT DOCUMENTS

| | | |
|---|---|---|
| JP | 6-232849 | 8/1994 |
| JP | 8-274756 | 10/1996 |
| JP | 11-164373 | 6/1999 |
| JP | 2000-188609 | 7/2000 |
| JP | 2000-216723 | 8/2000 |
| KR | 2000-0052817 | 8/2000 |
| WO | WO 98/19414 * | 5/1998 |
| WO | WO0070772 A | 11/2000 |

* cited by examiner

FIG. 13

|  | EQUAL TO OR LARGER THAN THRESHOLD VALUE | SMALLER THAN THRESHOLD VALUE |
|---|---|---|
| C1 / N1 | SLOWER MODE | IDENTICAL MODE |
| C2 / N2 | SLOWER MODE | FASTER MODE |

MOBILE COMMUNICATION SYSTEM, TRANSMISSION MODE SWITCHING METHOD, AND RECORDING MEDIUM HAVING TRANSMISSION MODE SWITCHING METHOD RECORDED THEREON

BACKGROUND OF THE INVENTION

1. Field of the Invention

The present invention relates to a mobile communication system and a transmission mode switching method used therefor as well as a recording medium having a program of the method recorded therein and, in particular, to a modulation/coding mode switching method in a system using an HS-PDSCH (High Speed-Physical Downlink Shared Channel).

2. Description of the Related Art

In recent years, a mobile terminal (mobile station) such as a cellular phone has been advanced to cope with multimedia for handling still images with a large amount of data, short animations or the like and a large-capacity and high-speed data transmission method is required accordingly.

As such a large-capacity and high-speed data transmission method, there are proposed a PDSCH system that makes only a transmission speed in downlink (direction form a base station to a mobile station) high, an HS-PDSCH (High Speed-Physical Downlink Shared Channel) system, or the like.

In a mobile communication system for carrying out data transmission from a base station to a mobile station using the above-described HS-PDSCH, any one of a plurality of modulation/coding modes such as a QPSK (Quadrature Phase Shift Keying) that is capable of transmitting two bits (four values) by one modulation, a 16QAM (16 Quadrature Amplitude Modulation) that is capable of transmitting four bits (sixteen values) by one modulation and a64QAM (64 Quadrature Amplitude Modulation) that is capable of transmitting six bits (sixty-four values) by one modulation.

An example of selecting one of the modulation/coding modes is shown in FIG. 40. In FIG. 40, for example, the modulation/coding mode is selected such that the closer a mobile station 102 is to a base station 101 in distance the faster the transmission is. That is, the base station 101 selects the modulation/coding modes of the64QAM, the 16QAM and the QPSK in the order of closeness to the mobile station 102.

As a method of selecting one of the above-described modulation/coding modes of the64QAM, the 16QAM and the QPSK, conventionally, there is a method of determining in advance a range of a receiving quality (Ec/Io (energy per one chip/interference wave power per unit frequency)) of a common pilot signal (CPICH: Common Pilot Channel) that is forwarded from a base station to a mobile station and uses respective modulation/coding modes and selecting a modulation/coding mode according to a receiving quality of a common pilot signal (hereinafter referred to as a first prior art).

In this case, the mobile station measures a receiving quality of a common pilot signal from the base station to inform the base station of the receiving quality. A modulation/coding mode is selected by the base station according to a receiving quality of a common pilot signal informed by the mobile station. For example, as shown in FIG. 41, the base station selects the modulation/coding modes of the 64QAM, the 16QAM and the QPSK in the order of excellence of a receiving quality of a common pilot signal informed by the mobile station.

In addition, as a method of selecting one of the modulation/coding modes of the 64QAM, the 16QAM and the QPSK, there is a method of detecting an error of HS-PDSCH data forwarded as a block from a base station to a mobile station and selecting a modulation/coding mode according to the block error rate.

In this case, the mobile station detects an error of an HS-PDSCH data block from the base station. The base station or the mobile station calculates a block error rate of the HS-PDSCH data at a predetermined period set in advance and selects a modulation/coding mode according to the block error rate.

For example, as shown in FIG. 42, the base station or the mobile station switches the modulation/coding mode to a low-speed mode if a calculated block error rate is larger than a predetermined block error rate T. In FIG. 42, it is switched from the 16QAM modulation/coding mode to the QPSK modulation/coding mode.

In addition, the base station or the mobile station switches the modulation/coding mode to a high-speed mode if a calculated block error rate is smaller than the predetermined block error rate T. In FIG. 42, it is switched from the QPSK modulation/coding mode to the 16QAM modulation/coding mode.

In the above-described conventional mobile communication system, in case of a first prior art, there is a problem that it is difficult to most appropriately set a range (threshold value) of a receiving quality of a common pilot signal corresponding to respective modulation/coding modes.

In addition, in case of the first prior art, since a measurement error is included in a receiving quality, it is difficult to select an optimal modulation/coding mode due to the measurement error as well. If measurement time is extended in order to make a measurement error of a receiving quality of a common pilot signal small, it is impossible to select a modulation/coding mode while following a change in conditions of a transmission path.

Here, as a factor for determining the conditions of the transmission path, there are a transmission loss, a multi-path environment (the number of paths and a size of each path), a noise power (interference wave power and thermal noise power), a moving speed of a mobile station, or the like. Thus, even if a receiving quality of a common pilot signal is identical, the above-described factor may be different, which makes an optimal mode of the HS-PDSCH different according to a multi-path environment or a moving speed of a mobile station. Further, the optimal mode means a mode with which a data transmission speed becomes maximum among modes that can satisfy a target communication quality (block error rate or the like).

Moreover, in the case in which a transmission power of the HS-PDSCH is changed while keeping a transmission power of a common pilot signal constant, if the mobile station performs mode selection, it is necessary for the base station to inform the mobile station of information on the change of the transmission power of the HS-PDSCH and the mobile station to select a mode based on the information. In this case, control information of which the base station informs the mobile station increases and an optimal mode cannot be selected while the base station sending the control information. To the contrary, if the base station performs mode selection, it is necessary for the base station to change a threshold value of each mode according to the change of the transmission power of the HS-PDSCH.

On the other hand, in a second prior art, it is necessary to extend measurement time of a block error rate in order to increase measurement accuracy of a block error rate, when a state of a transmission path changes, time required for changing a mode to an optimal mode becomes long. In particular, when an optimal mode turns into a low-speed mode, a state in which a block error rate exceeds a target value is likely to continue for a long time. In addition, if measurement time of a block error rate is reduced in order to solve this problem, a measurement error of a block error rate increases.

When a length of time when a predetermined block error rate is satisfied and a length of time when the predetermined block error rate is not satisfied are substantially equal in ratio, an entire block error rate may be larger than the predetermined block error rate. Thus, since it is necessary to set the predetermined block error rate larger than the target block error rate, optimization of the predetermined block error rate becomes difficult. Therefore, the second prior art also has a problem that selection of an optimal mode is difficult.

SUMMARY OF THE INVENTION

The present invention has been achieved in view of these problems, and it is an object of the present invention to provide a mobile communication system that is capable of easily carrying out selection of an optimal modulation/coding mode and a modulation/coding mode switching method used therefor as well as a recording medium having program of the same method recorded therein.

A mobile communication system according to the present invention is a mobile communication system capable of selecting any one of a plurality of modulation/coding modes used for data transmission of a unit of block between a base station controlled by a base station control apparatus and a mobile station, which is provided with detecting means that is provided in the mobile station and detects occurrence of a receiving error of a unit of block in the data transmission and switching selecting means for switching the modulation/coding modes based on the occurrence of the receiving error to be detected by the detecting means.

A modulation/coding mode switching method according to the present invention is a modulation/coding mode switching method capable of selecting any one of a plurality of modulation/coding modes used for data transmission of a unit of block between a base station controlled by a base station control apparatus and a mobile station, which is provided with a first step of detecting occurrence of a receiving error of a unit of block in the data transmission in the mobile station and a second step of performing switching of the modulation/coding modes based on the occurrence of the receiving error to be detected in the first step.

A recording medium having recorded therein a program of a modulation/coding mode switching method according to the present invention is a recording medium having program of a modulation/coding mode switching method of a mobile communication system capable of selecting any one of a plurality of modulation/coding mode used for data transmission of a unit of block between a base station controlled by a base station control apparatus and a mobile station, the program causes a computer to execute processing for detecting occurrence of a receiving error of a unit of block in the data transmission in the mobile station and processing for performing switching of the modulation/coding mode based on the occurrence of the receiving error to be detected.

The mobile communication system of the present invention is the mobile communication system capable of selecting any one of the plurality of modulation/coding modes, which performs switching of the modulation/coding modes based on occurrence of a receiving error.

More specifically, in the mobile communication system of the present invention, when the base station sends an information block to the mobile station, the mobile station receives the information block and, if the receipt of the information block contains an error, informs the base station that it has failed to receive the information block.

The base station switches the modulation/coding mode to a mode of lower transmission rate (hereinafter denoted as "a slower mode") than a current mode when failures of receiving the information block have reached a predetermined number of times (one or more). In addition, the base station switches the modulation/coding mode to a mode of higher transmission rate (hereinafter denoted as "a faster mode") than a current mode when successes of receiving the information block have reached another predetermined number of times (larger than the above-described predetermined number of times).

The switching to a faster mode may be performed when a receiving error rate within a predetermined length of time has become smaller than a predetermined value. In addition, request/determination of switching of the modulation/coding modes based on a receiving error may be carried out in the mobile station or the base station control apparatus instead of the base station.

That is, in a first method of the present invention, the switching of the modulation/coding modes is carried out based on occurrence of a receiving error, and conditions for switching the modulation/coding mode to a mode faster than a current mode and conditions for switching the modulation/coding mode to a mode slower than a current mode are made different.

The base station switches the modulation/coding mode to a slower mode if the mobile station has failed to receive information block and to a faster mode if the mobile station has succeeded in receiving information block continuously for a predetermined number of blocks Ns (or predetermined time Ts) or more. In this case, if the predetermined time Ts is used, the time for condition for switching the modulation/coding mode to a faster mode is made shorter than the time for the condition for switching to a slower mode. The rate of shortening the time is made equal to a ratio of data transmission speeds.

In addition, the predetermined number of blocks Ns or the predetermined time Ts is determined according to a target block error rate. In this case, if the predetermined number of blocks Ns is used, $1/(Ns+a)$ is made equal to the target block error rate. For example, when $a=1$, if the target block error rate is 0.1, the predetermined number of blocks $Ns=9$. Further, $a \geq 1$.

Consequently, the modulation/coding mode is switched to a slower mode in response to occurrence of an error of one block, whereby it becomes possible to promptly switch the modulation/coding mode to a slower mode when conditions of a transmission path are deteriorated. In addition, if a target block error rate is satisfied, it becomes possible to immediately switch the modulation/coding mode to a faster mode. Thus, it becomes possible to promptly switch the modulation/coding mode to an optimal mode.

On the other hand, in a second method of the present invention, the modulation/coding mode is switched to a slower mode when a block error rate in a first predetermined number of blocks N1 (or first predetermined time T1) is larger than a first predetermined block error rate R1, switched to a faster mode when a block error rate in a second predetermined number of blocks N2 (or second predetermined time T2) is smaller than a second predetermined block error rate R2, and switched to a slower mode when the block error rate in the second predetermined number of blocks N2 (or second predetermined time T2) is equal to or larger than a third predetermined block error rate R3. In this case, it is assumed that the first predetermined number blocks N1<the second predetermined number of blocks N2 (or the first predetermined time T1<the second predetermined time T2).

In this case, if the first predetermined time T1 and the second predetermined time T2 are used, the time for the condition for switching the modulation/coding mode to a faster mode is made shorter than the time for the condition for switching to a slower mode. The rate of shortening the time is made equal to a ratio of data transmission speeds.

In addition, the first predetermined number of blocks N1 and the second predetermined number of blocks N2 (or the first predetermined time T1 and the second predetermined time T2), the fist predetermined block error rate R1, the second predetermined block error rate R2 and the third predetermined block error rate R3 are determined according to a target block error rate.

As described above, since the modulation/coding mode is switched to a slower mode with the first predetermined number of blocks N1 that is smaller than the other number of blocks in response to increase of the block error rate, it becomes possible to promptly switch the modulation/coding mode to a slower mode when conditions of a transmission path are deteriorated.

In addition, since the modulation/coding mode is switched to a faster mode with the second predetermined number of blocks N2 larger than the first predetermined number of blocks N1 in response to decrease of the block error rate, it becomes possible to satisfy a target block error rate. In this case, since the block error rate is monitored at a long period, it becomes possible to reduce unnecessary switching operations due to occurrence of block errors.

BRIEF DESCRIPTION OF THE DRAWINGS

FIG. 13 illustrates conditions for switching modulation/coding modes according to the third embodiment of the present invention;

DESCRIPTION OF THE PREFERRED EMBODIMENTS

Figure 1:
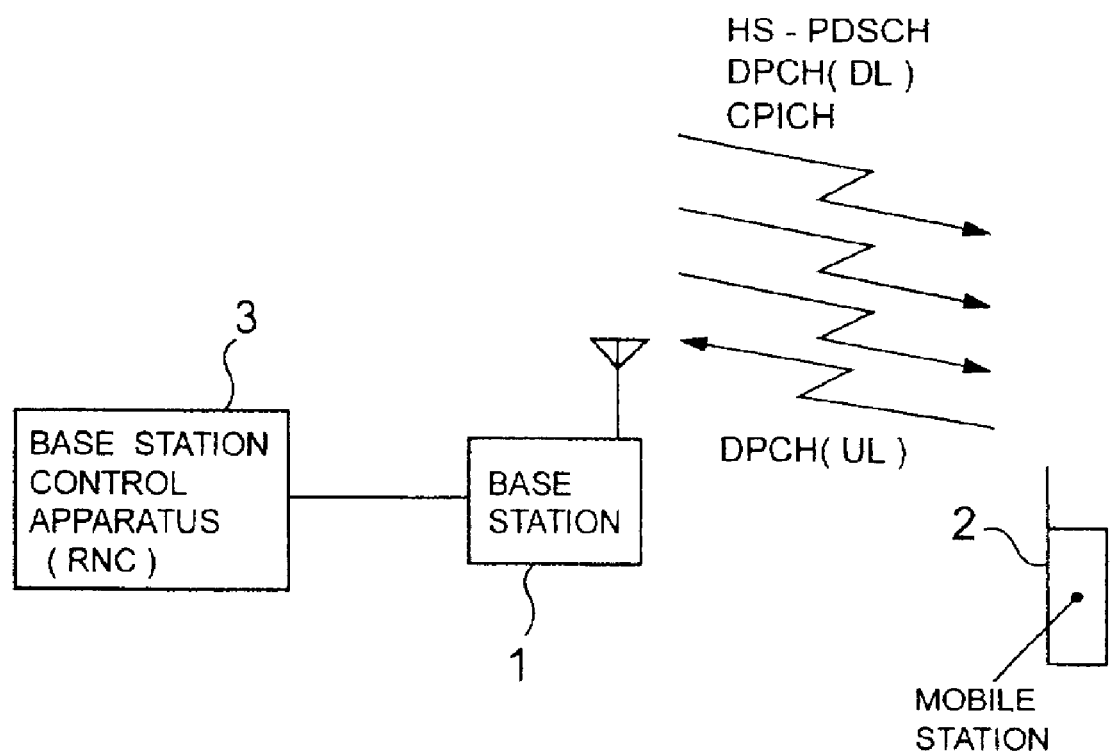
FIG. 1 is a block diagram showing a configuration of a mobile communication system according to an embodiment mode of the present invention.

Preferred embodiments of the present invention will be hereinafter described with reference to the accompanying drawings. Further, the present invention is not limited to embodiments described in this specification but can be modified in various ways within the scope of claims.

In addition, in the accompanying drawings, like reference numerals designate the same or similar parts throughout the figures thereof.

FIG. 1 is a block diagram showing a configuration of a mobile communication system according to an embodiment mode of the present invention. In FIG. 1, the mobile communication system according to the embodiment mode of the present invention consists of a base station 1, a mobile station 2 and a base station control apparatus (e.g., RNC (Radio Network Controller)) 3.

The base station 1 divides data of an HS-PDSCH (High Speed-Physical Downlink Shared Channel) into blocks and sends them to the mobile station 2. A CRC (Cyclic Redundancy Check) code (error detection code) is added to the blocks. Upon receiving data blocks of the HS-PDSCH, the mobile station 2 determines existence or nonexistence of a receiving error of each data block using the CRC code and informs the base station 1 of a result of the determination.

In the above-described mobile communication system, selection of a plurality of modulation/coding codes such as a QPSK (Quadrature Phase Shift Keying) that is capable of transmitting two bits (four values) by one modulation, a 16QAM (16 Quadrature Amplitude Modulation) that is capable of transmitting four bits (sixteen values) by one modulation and a 64QAM (64 Quadrature Amplitude Modulation) that is capable of transmitting six bits (sixty-four values) by one modulation is possible. Any one of the base station 1, the mobile station 2 and the base station control apparatus 3 may perform determination of switching of the above-described modulation/coding modes.

When the base station 1 or the base station control apparatus 3 determines switching of the modulation/coding modes, it uses a DPCH (Dedicated Physical Channel) of down link (DL) to inform the mobile station 2 of the switching. When the mobile station 2 determines switching of the modulation/coding modes, it uses the DPCH of up link (UL) to inform the base station 1 of the switching. The base station 1 switches the modulation/coding modes at predetermined timing after informing the above-described mode switching.

Figure 2:
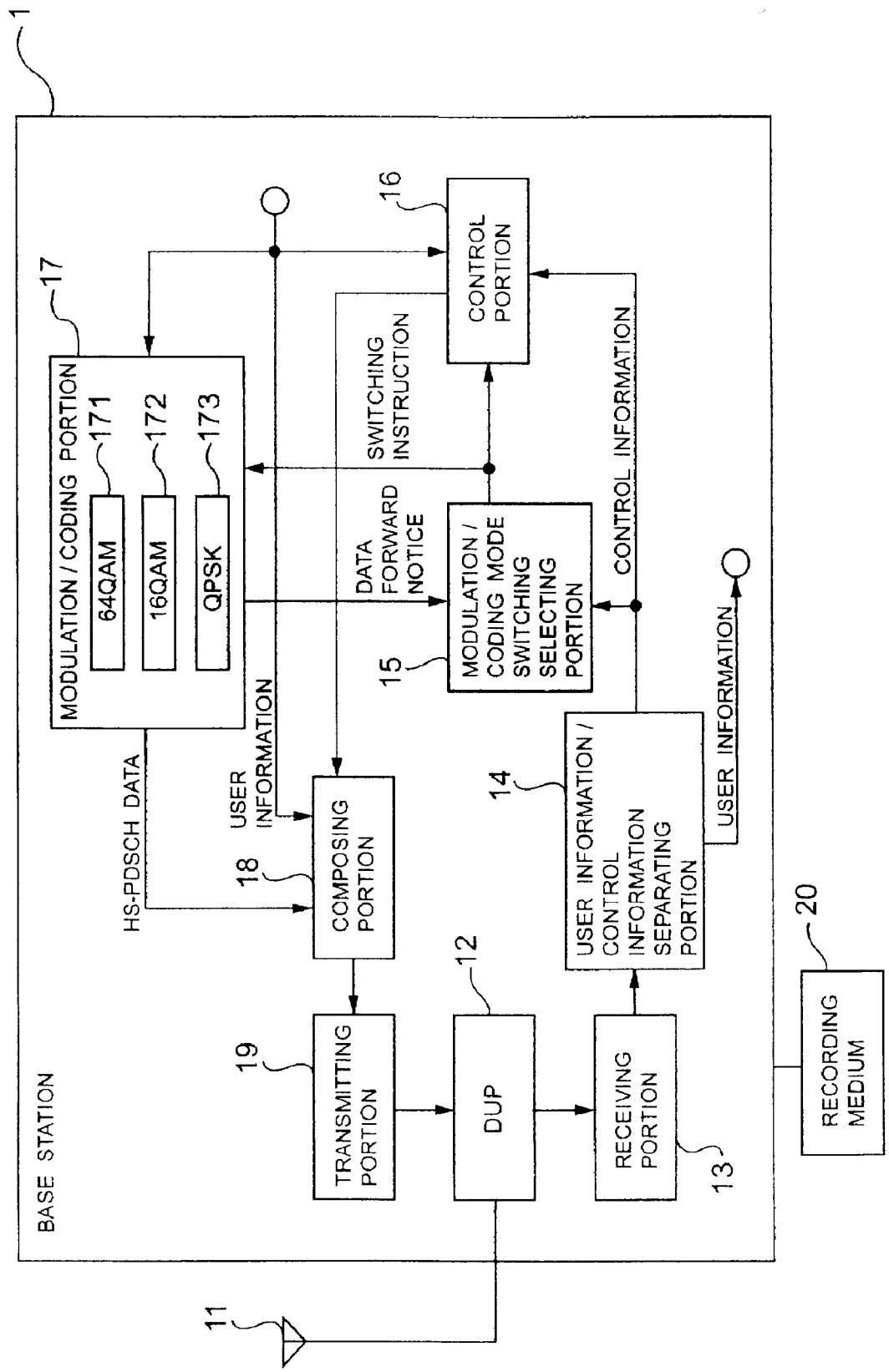
FIG. 2 is a block diagram showing a configuration of a base station according to a first embodiment of the present invention.

FIG. 2 is a block diagram showing a configuration of the base station 1 according to a first embodiment of the present invention. In FIG. 2, the base station 1 comprises an antenna 11, a duplexer (DUP) 12, a receiving portion 13, a user information/control information separating portion 14, a modulation/coding mode switching selecting portion 15, a control portion 16, a modulation/coding portion 17, a composing portion 18, a transmitting portion 19 and a recording medium 20. Further, since a publicly-known technology is applicable to a call control portion, a voice input/output portion and a display portion of the base station 1, descriptions on configurations and operations of these portions will be omitted.

The receiving portion 13 forwards a signal (DPCH(UL) or the like) received via the antenna 11 and the duplexer 12 to the user information/control information separating portion 14. The user information/control information separating portion 14 separates a received signal from the receiving portion 13 into user information (a voice signal, an image signal or the like) and control information. Then, the user information/control information separating portion 14 forwards the user information to the above-described call control portion, voice output portion and display portion of the base station 1 and forwards the control information to the modulation/coding mode switching selection portion 15 and the control portion 16.

The modulation/coding mode switching selecting portion 15 executes a program stored in the recording medium 20, thereby monitoring a receiving error notice from a not-shown mobile station, and, upon receiving a receiving error notice, forwards an instruction to switch the modulation/coding mode to a mode slower than a current modulation/coding mode to the control portion 16 and the modulation/coding portion 17, respectively.

In addition, if the modulation/coding mode switching selecting portion 15 does not receive a receiving error notice continuously for a predetermined number of blocks Ns after receiving a receiving error notice, it forwards an instruction to switch the modulation/coding mode to a mode faster than a current modulation/coding mode to the control portion 16 and the modulation/coding portion 17, respectively.

Here, the modulation/coding mode switching selecting portion 15 controls selection such that 1/(a+Ns) equals to a target block error rate. Further, it is assumed that, when $a \geq 1$, for example, a=1, if the target error rate is 0.1, the predetermined number of blocks Ns=9.

The control portion 16 executes a program stored in the recording medium 20, thereby generating various control signals based on control information from the user information/control information separating portion 14 and input information from the outside (e.g., control information or the like from a not-shown base station control apparatus) and outputs the controls signals to each portion within the base station 1 to control it. Further, a program executed by each portion of the base station 1 including the control portion 16 is stored in the recording medium 20.

In addition, when mode switching is performed in the modulation/coding portion 17 according to a switching instruction from the modulation/coding mode switching selecting portion 15, the control portion 16 generates control information including information of the mode switching to forward it to the composing portion 18.

The modulation/coding portion 17 comprises a QPSK (Quadrature Phase Shift Keying) modulation/coding circuit 171, a 16QAM (16 Quadrature Amplitude Modulation) modulation/coding circuit 172 and a 64QAM (64 Quadrature Amplitude Modulation) modulation/coding circuit 173.

The modulation/coding portion 17 responds to a switching instruction from the modulation/coding mode switching selecting portion 15 to switch over to any one of the QPSK modulation/coding circuit 171, the 16QAM modulation/coding circuit 172 and the 64QAM modulation/coding circuit 173, performs modulation/coding with the circuit switched to and forwards data to the composing portion 18 as HS-PDSCH data.

The composing portion 18 composes the control information including the information of mode switching from the control portion 16, the HS-PDSCH data from the modulation/coding portion 17, the input signals from the outside such as the call control portion and the voice input portion of the base station 1, or the like, to send the composed data from the antenna 11 as the HS-PDSCH via the transmitting portion 19 and the duplexer 12.

Figure 3:
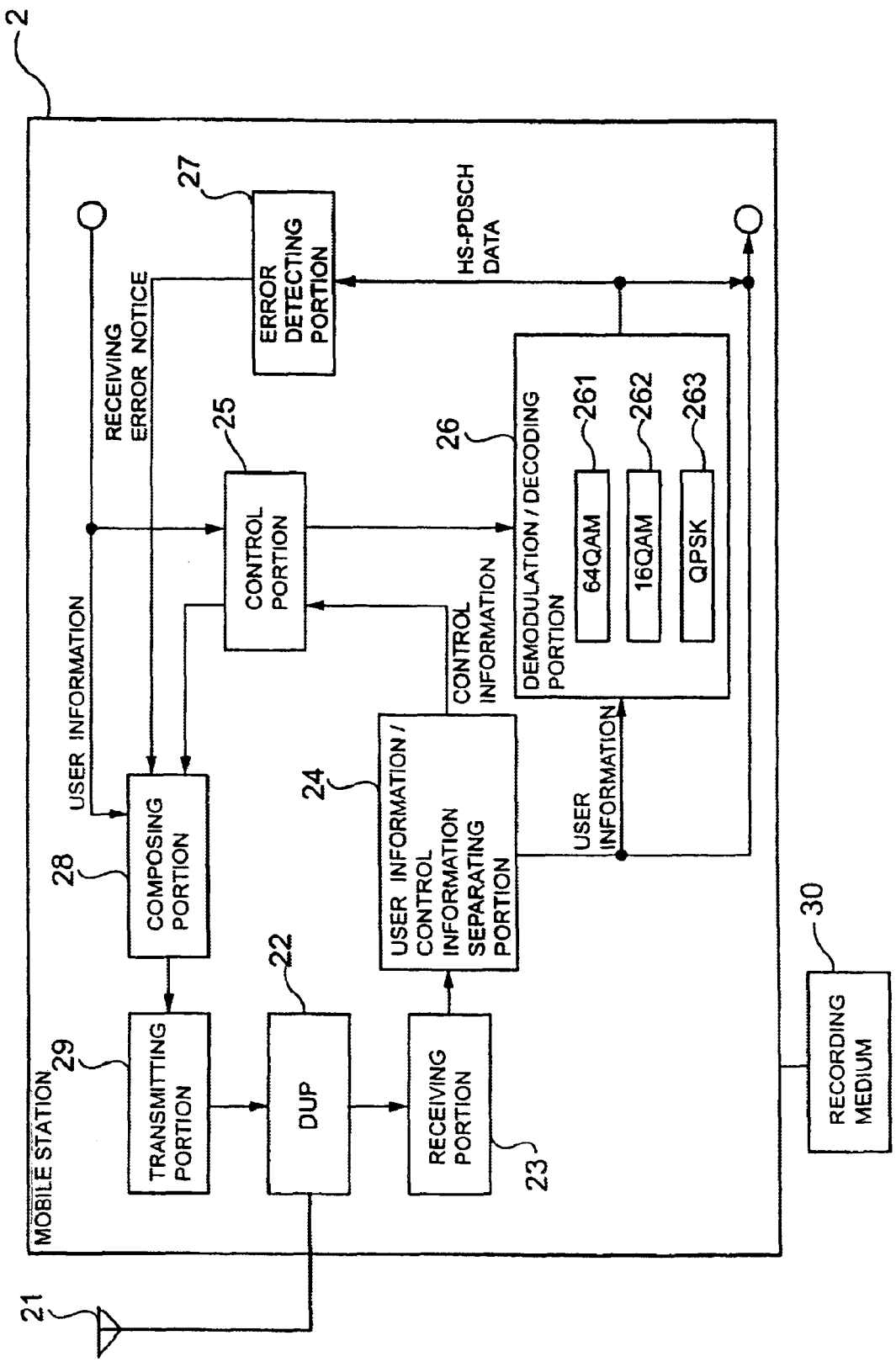
FIG. 3 is a block diagram showing a configuration of a mobile station according to the first embodiment of the present invention.

FIG. 3 is a block diagram showing a configuration of the mobile station 2 according to the first embodiment of the present invention. In FIG. 3, the mobile station 2 comprises an antenna 21, a duplexer (DUP) 22, a receiving portion 23, a user information/control information separating portion 24, a control portion 25, a demodulation/decoding portion 26, an error detecting portion 27, a composing portion 28, a transmitting portion 29 and a recording medium 30. Further, since a publicly-known technology is applicable to a call control portion, a voice input/output portion and a display portion of the mobile station 2, descriptions on configurations and operations of these portions will be omitted.

The receiving portion 23 forwards a signal (CPICH (Common Pilot Channel), DPCH, HS-PDSCH (Physical Downlink Shared Channel)) received via the antenna 21 and the duplexer 22 to the user information/control information separating portion 24.

The user information/control information separating portion 24 separates a received signal from the receiving portion 23 into user information (a voice signal, an image signal or the like) and control information. Then, the user information/control information separating portion 24 forwards the user information to the demodulation/decoding portion 26, the above-described call control portion, voice output portion and display portion of the mobile station 2, respectively, and forwards the control information to the control portion 25.

The control portion 25 executes a program stored in the recording medium 30, thereby generating various control signals based on control information from the user information/control information separating portion 24 and input information from the outside (e.g., user information or the like from a ten key and a voice input portion) to output them to each portion within the mobile station 2 and control each portion and, at the same time, generating control information to the base station 1 to forward it to the composing portion 28. Further, a program that is executed by each portion of the mobile station 2 including the control portion 25 is stored in the recording medium 30.

The demodulation/decoding portion 26 comprises a QPSK demodulation/decoding circuit 261, a 16QAM demodulation/decoding circuit 262 and a64QAM demodulation/decoding circuit 263. The demodulation/decoding portion 26 responds to a switching instruction from the control portion 25 to switch over to any one of the QPSK demodulation/decoding circuit 261, the 16QAM demodulation/decoding circuit 262 and the 64QAM demodulation/decoding circuit 263, performs demodulation/decoding with the circuit switched to and outputs HS-PDSCH data to the error detecting portion 27 and each portion within the mobile station 2.

Upon receiving the HS-PDSCH data decoded by the demodulation/decoding portion 26, the error detecting portion 27 determines existence or nonexistence of a receiving error of each data block using a CRC code added to the data and outputs a result of the determination to the composing portion 28.

The composing portion 28 composes the control information from the control portion 25, the determination result from the error detecting portion 27 and the input signals from the outside such as the call control portion and the voice input portion of the mobile station 2, or the like, to send the composed data from the antenna 21 as the DPCH (UL) and the HS-PDSCH via the transmitting portion 29 and the duplexer 22.

Figure 4:
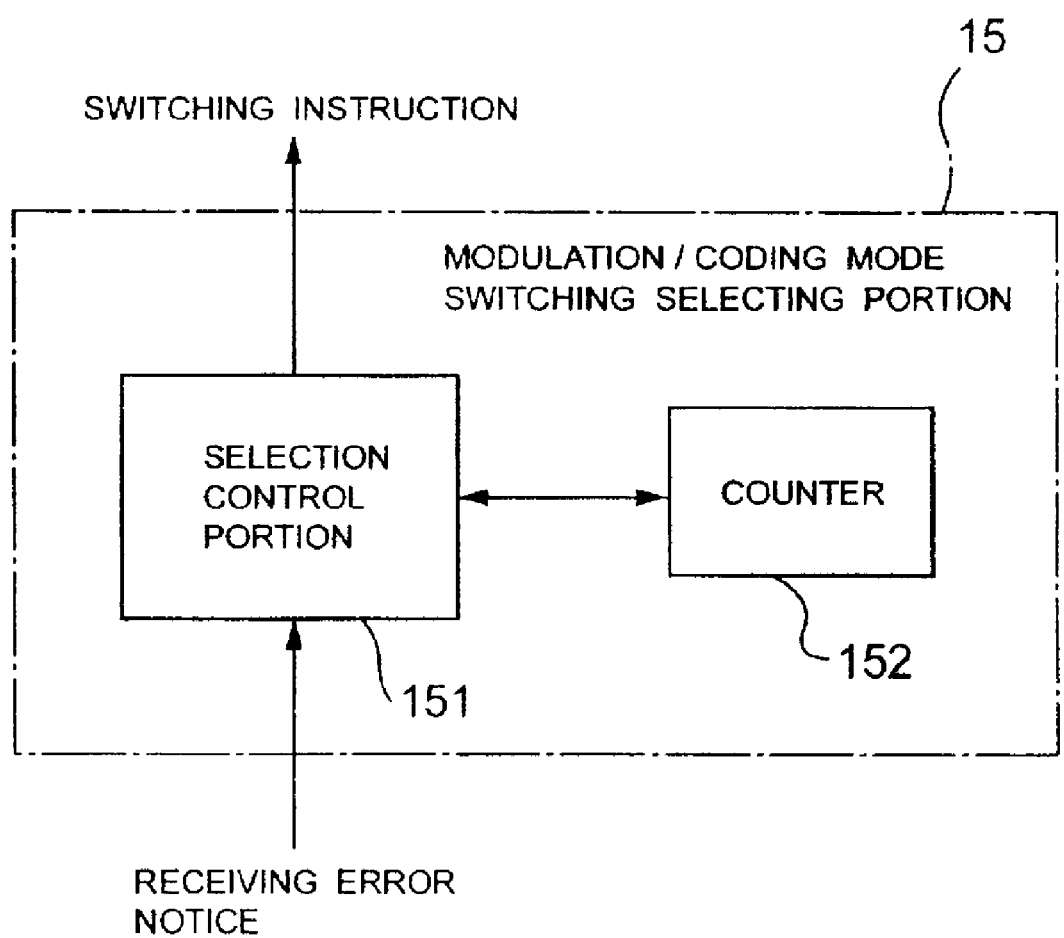
FIG. 4 is a block diagram showing a configuration of a modulation/coding mode switching selecting portion of FIG. 2.

FIG. 4 is a block diagram showing a configuration of the modulation/coding mode switching selecting portion 15 of FIG. 2. In FIG. 4, the modulation/coding mode switching selecting portion 15 comprises a selection control portion 151 and a counter 152.

Figure 5:
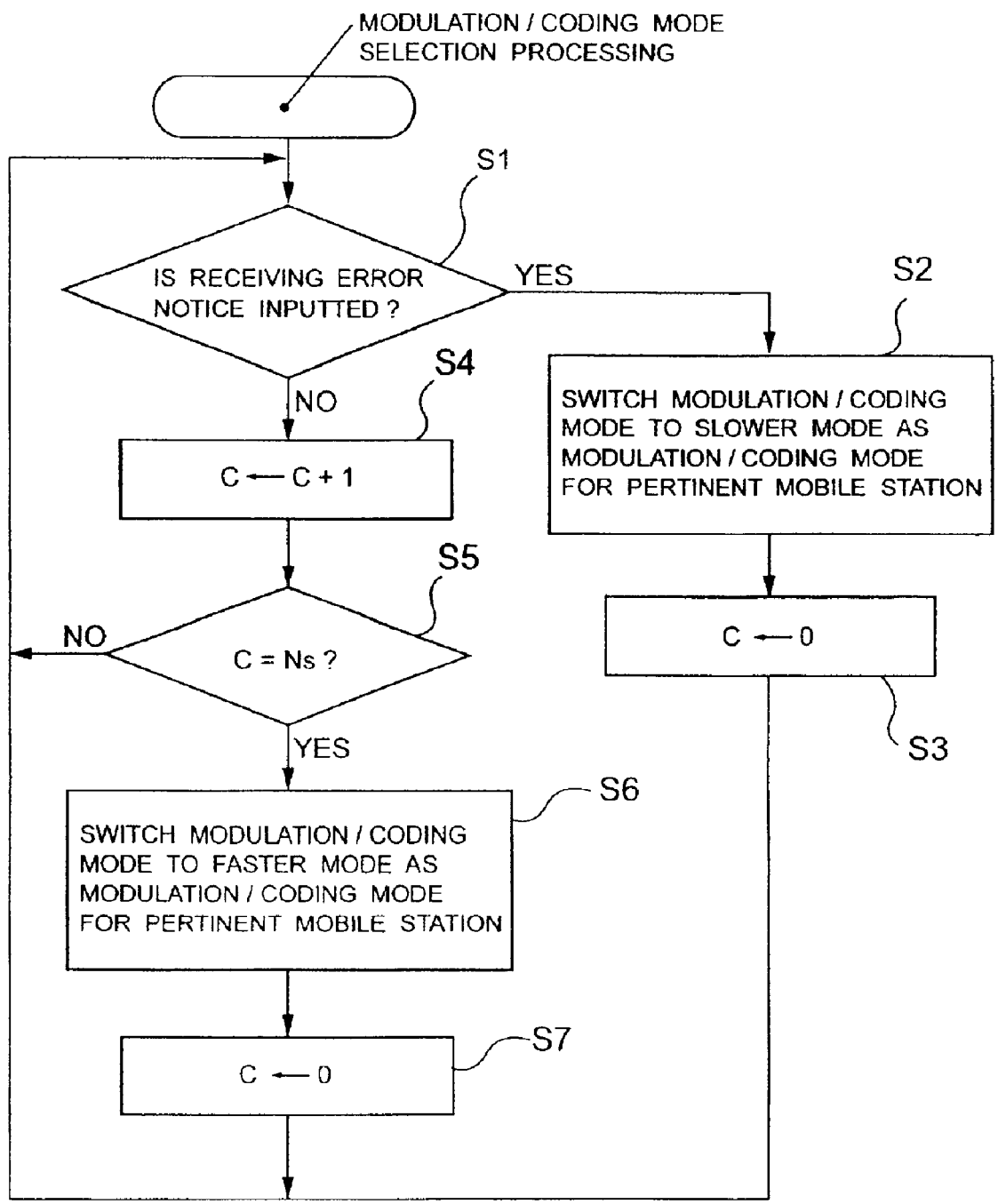
FIG. 5 is a flow chart showing an operation of modulation/coding mode switching selection by the modulation/coding mode switching selecting portion of FIG. 4.

FIG. 5 is a flow chart showing an operation of modulation/coding mode switching selection by the modulation/coding mode switching selecting portion 15 of FIG. 4. The operation of modulation/coding mode switching selection by the modulation/coding mode switching selecting portion 15 will be described with reference to FIGS. 4 and 5.

When a receiving error notice is inputted from the mobile station 2 (step S1 in FIG. 5), the selection control portion 151 of the modulation/coding mode switching selecting portion 15 switches a modulation/coding mode to a slower mode as a modulation/coding mode for the pertinent mobile station 2 (step S2 in FIG. 5) and clears a counter value C of the counter 152 (C←0) (step S3 in FIG. 5).

If a receiving error notice is not inputted from the mobile station 2 (step S7 in FIG. 5), the selection control portion 151 increments the counter value C of the counter 152 (C←C+1) (step S4 in FIG. 5). When the incremented counter value C of the counter 152 is equal to the predetermined number of blocks Ns (C=Ns) (step S5 in FIG. 5), the selection control portion 151 switches the modulation/coding mode to a faster mode as a modulation/coding mode for the pertinent mobile station 2 (step S6 in FIG. 5) and clears the counter value C of the counter 152 (C←0) (step S7 in FIG. 5).

That is, upon receiving a receiving error notice from the mobile station 2, the selection control portion 151 switches the modulation/coding mode to a slower mode and, if a data block is successfully received continuously for a predetermined number of blocks Ns or more after performing the switching, switches the modulation/coding mode to a faster mode.

Figure 6:
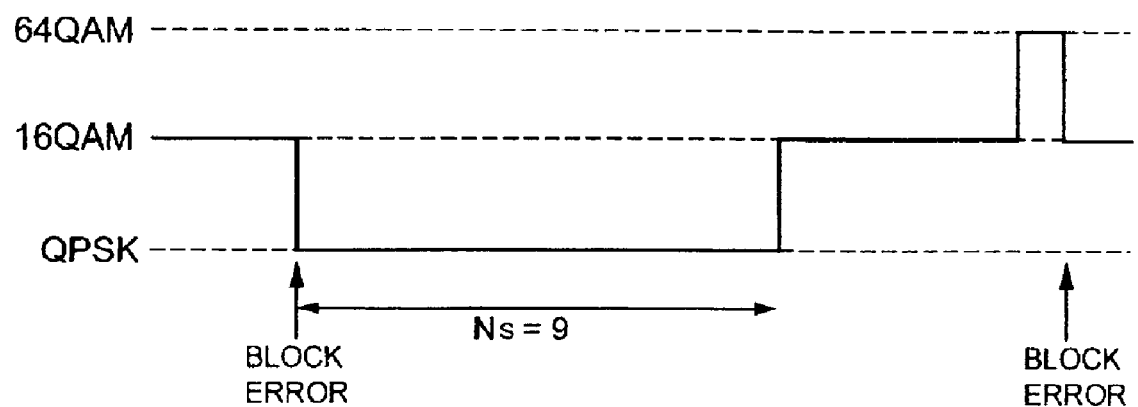
FIG. 6 illustrates an operation of modulation/coding mode switching according to the first embodiment of the present invention.

FIG. 6 illustrates a modulation/coding mode switching operation according to the first embodiment of the present invention. FIG. 6 shows an operations of switching the modulation/coding mode to a slower QPSK modulation/coding mode in response to occurrence of a block error when the 16QAM modulation/coding mode is selected and, thereafter, switching the modulation/coding mode to the faster 16QAM modulation/coding mode and 64QAM modulation/coding mode in response to nonoccurrence of a block error continuously for the predetermined number of blocks Ns or more.

Further, in switching the modulation/coding mode to the faster 16QAM modulation/coding mode, the selection control portion 151 controls selection such that 1/(Ne+Ns) is equal to a target block error rate. In FIG. 6, it is assumed that the target block error rate is 0.1 and the predetermined number of blocks Ns=9 when Ne=1.

In this way, since the base station 1 switches the modulation/coding mode at an error of one block, it can promptly switch the modulation/coding mode to a slower mode when conditions of a transmission path are deteriorated. In addition, when a target block error rate is satisfied, the base station 1 can immediately switch the modulation/coding mode to a faster mode. Thus, the modulation/coding mode can be promptly switched to an optimal mode in the first embodiment of the present invention. In this case, since the predetermined number of blocks Ns is determined according to a target block error rate, the target block error rate can be satisfied.

Figure 7:
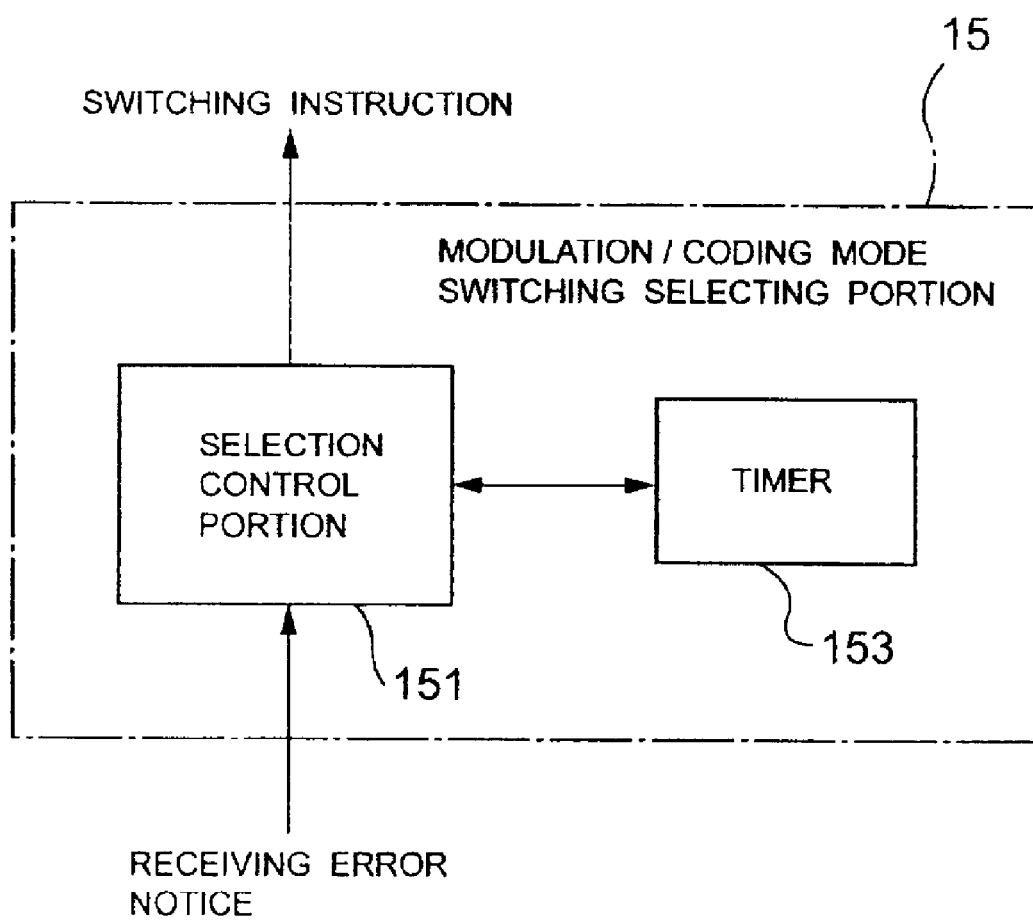
FIG. 7 is a block diagram showing a configuration of a modulation/coding mode switching selecting portion according to a second embodiment of the present invention.

FIG. 7 is a block diagram showing a configuration of the modulation/coding mode switching selecting portion 15 according to a second embodiment of the present invention. In FIG. 7, the modulation/coding mode switching selecting portion 15 comprises a selection control portion 151 and a timer 153. Further, although not shown, the second embodiment of the present invention has the same configuration as that of the mobile communication system shown in FIG. 2 and those of the base station 1 according to the first embodiment of the present invention shown in FIG. 1 and the mobile station 2 according to the first embodiment of the present invention shown in FIG. 3, descriptions on them will be omitted.

Figure 8:
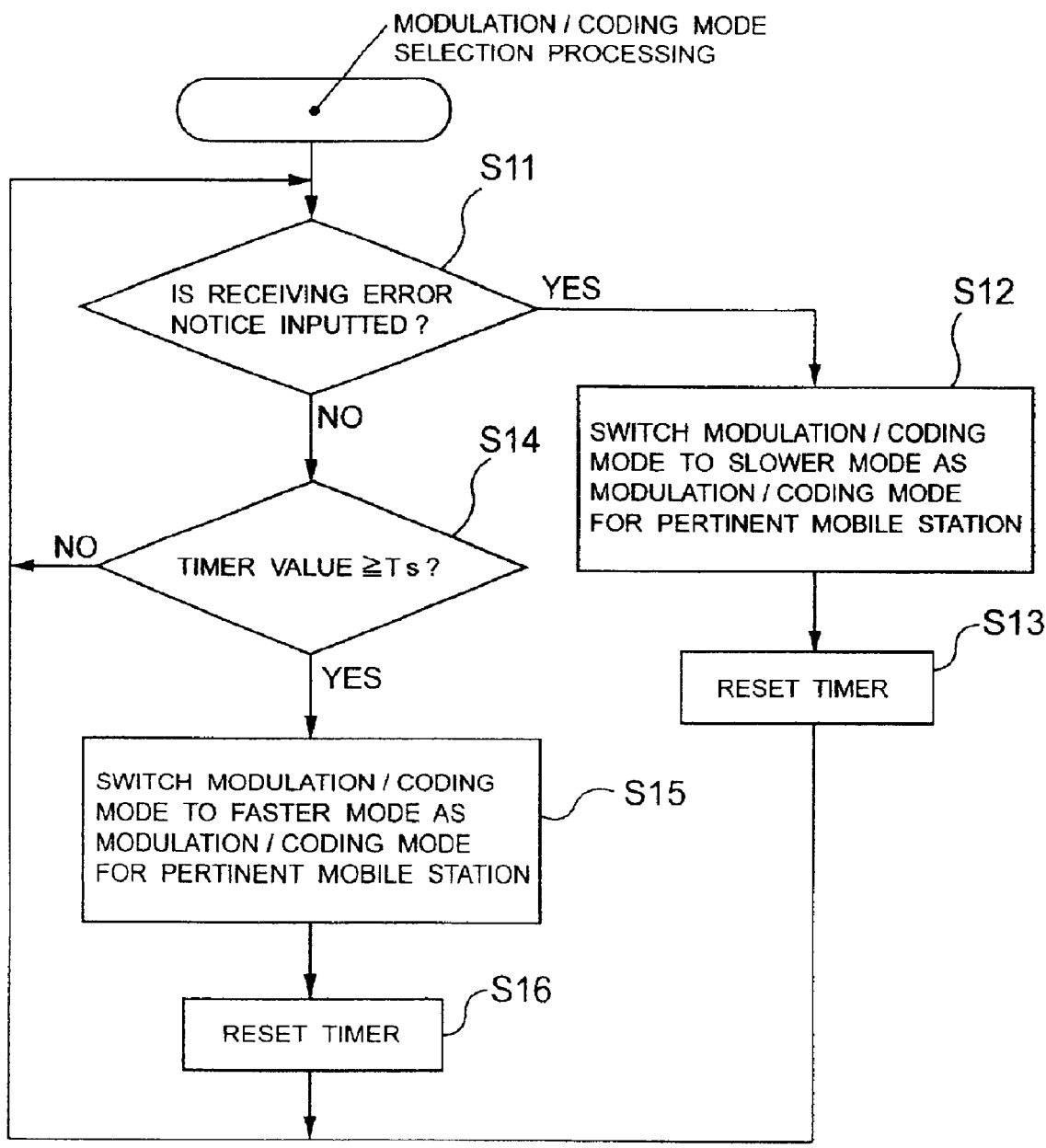
FIG. 8 is a flow chart showing an operation of modulation/coding mode switching selection by the modulation/coding mode switching selecting portion of FIG. 7.

FIG. 8 is a flow chart showing an operation of modulation/coding mode switching selection by the modulation/coding mode switching selecting portion 15 of FIG. 7. The operation of modulation/coding mode switching selection by the modulation/coding mode switching selecting portion 15 according to the second embodiment of the present invention will be described with reference to FIGS. 7 and 8.

When a receiving error notice is inputted from the mobile station 2 (step S11 in FIG. 8), the selection control portion 151 of the modulation/coding mode switching selecting portion 15 switches the modulation/coding mode to a slower mode as a modulation/coding mode for the pertinent mobile station 2 (step S12 in FIG. 8) and resets the timer 153 (step S13 in FIG. 8).

If a receiving error notice is not inputted from the mobile station 2 (step S11 in FIG. 8), when a timer value of the timer 153 exceeds the predetermined time Ts (step S14 in FIG. 8), the selection control portion 151 switches the modulation/coding mode to a faster mode as a modulation/coding mode for the pertinent mobile station 2 (step S15 in FIG. 8) and resets the timer 153 (step S16 in FIG. 8).

That is, upon receiving a receiving error notice from the mobile station 2, the selection control portion 151 switches the modulation/coding mode to a slower mode and, when a data block is successfully received continuously for the predetermined time Ts or more after performing the switching, switches the modulation/coding mode to a faster mode.

In this way, since the base station 1 switches the modulation/coding mode at an error of one block, it can promptly switch the modulation/coding block to a slower mode when conditions of a transmission path are deteriorated. In addition, when a target block error rate is satisfied, the base station 1 can immediately switch the modulation/coding mode to a faster mode. Thus, the modulation/coding mode can be promptly switched to an optimal mode in the second embodiment of the present invention. In this case, if the predetermined time Ts is required for transmission of the predetermined number of blocks Ns, since the predetermined time Ts is determined according to a target block error rate, the target block error rate can be satisfied.

Figure 9:
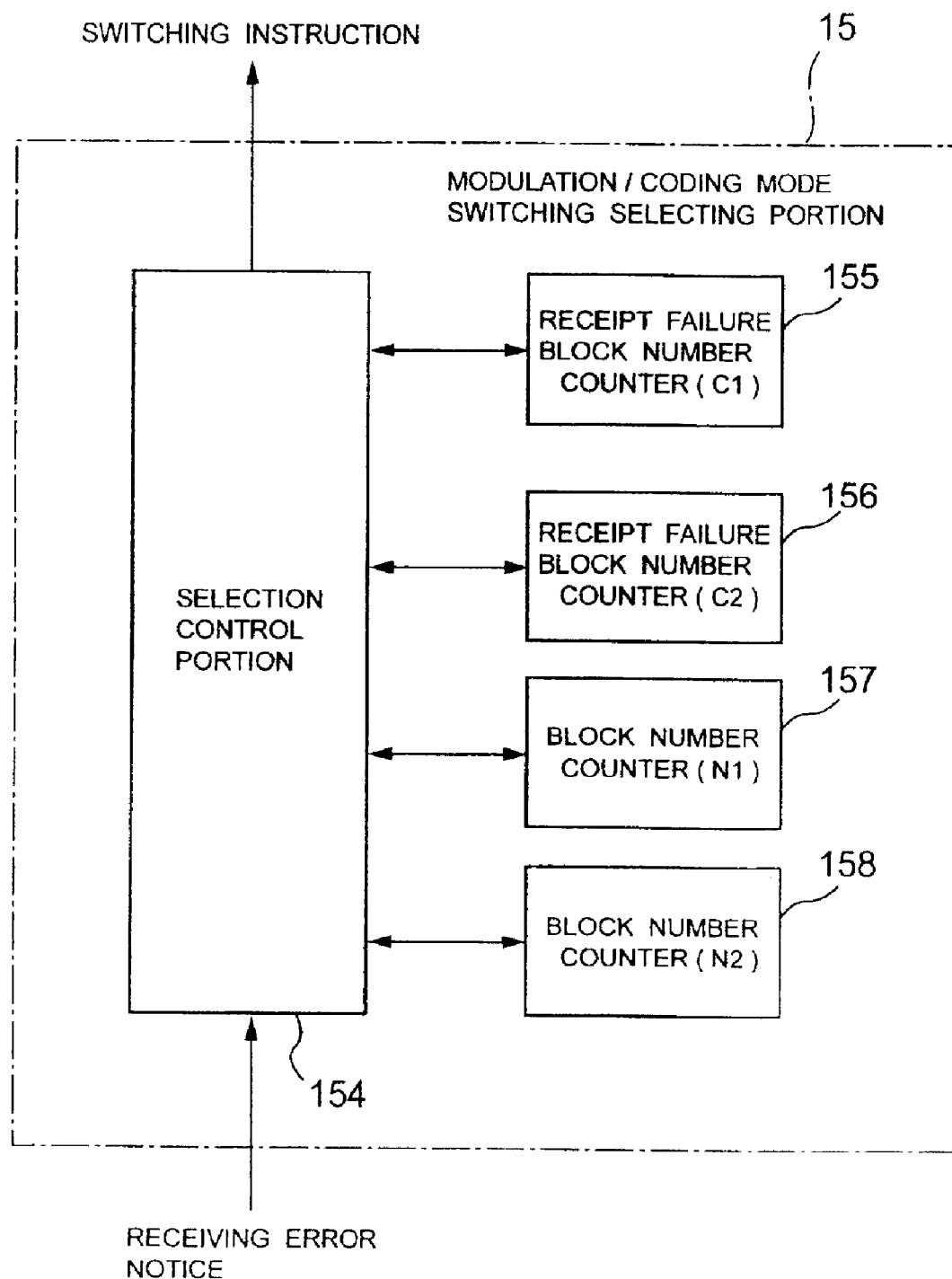
FIG. 9 is a block diagram showing a configuration of a modulation/coding mode switching selecting portion according to a third embodiment of the present invention.

FIG. 9 is a block diagram showing a configuration of the modulation/coding mode switching selecting portion 15 according to a third embodiment of the present invention. In FIG. 9, the modulation/coding mode switching selecting portion 15 comprises a selection control portion 154, a receipt failure block number counter (C1) 155, a receipt failure block number counter (C2) 156, a block number counter (N1) 157 and a block number counter (N2) 158. Further, although not shown, the third embodiment of the present invention has the same configuration as that of the mobile communication system shown in FIG. 1 and those of the base station 1 according to the first embodiment of the present invention shown in FIG. 2 and the mobile station 2 according to the first embodiment of the present invention shown in FIG. 3, descriptions on them will be omitted.

Figure 10:
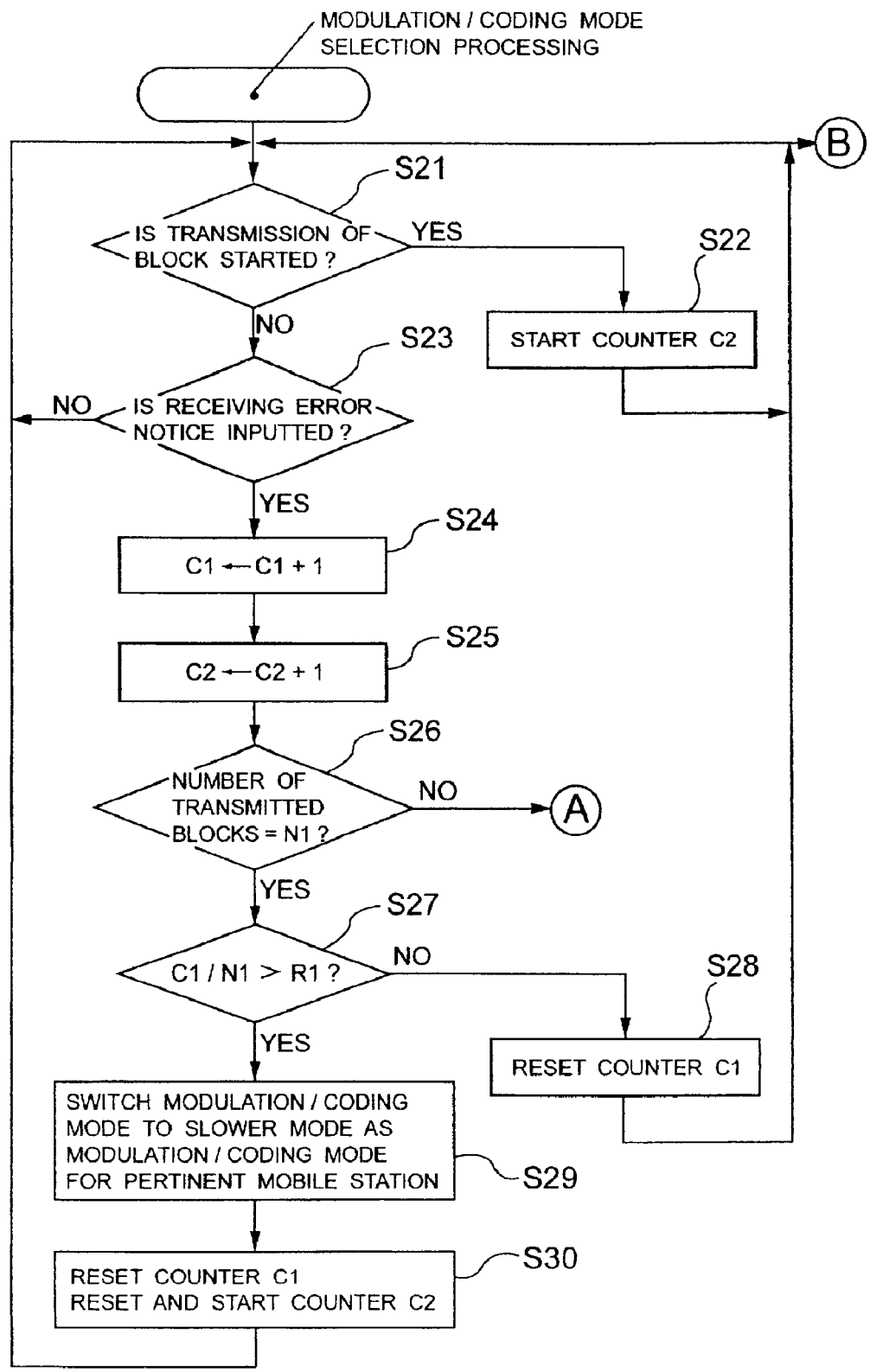
FIG. 10 is a flow chart showing an operation of modulation/coding mode switching selection by the modulation/coding mode switching selecting portion of FIG. 9.
Figure 11:
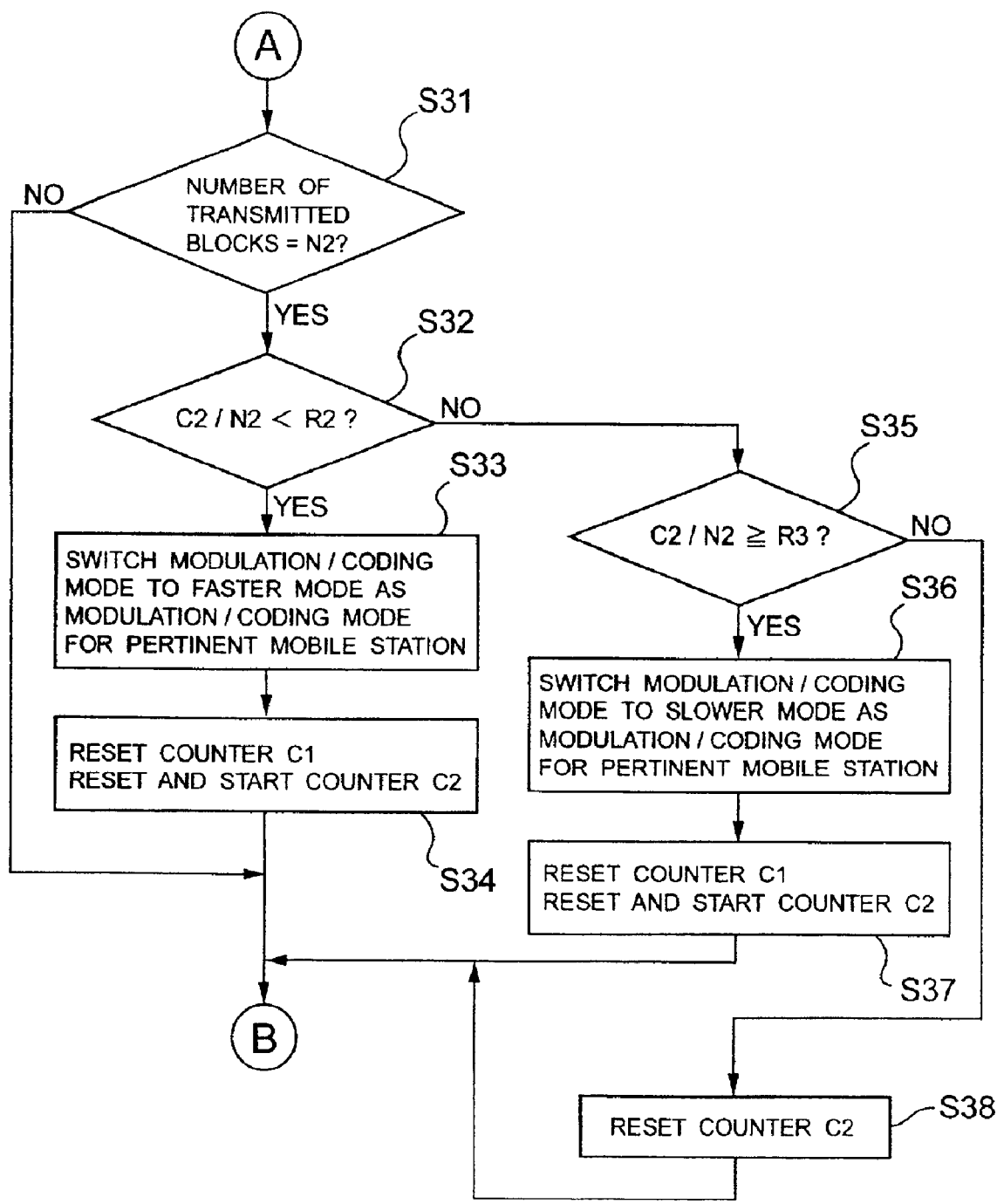
FIG. 11 is a flow chart showing an operation of modulation/coding mode switching selection by the modulation/coding mode switching selecting portion of FIG. 9.

FIGS. 10 and 11 are a flow chart showing an operation of modulation/coding switching selection by the modulation/coding mode switching selecting portion 15 of FIG. 9. The operation of modulation/coding mode switching selection by the modulation/coding mode switching selecting portion 15 according to the third embodiment of the present invention will be described with reference to FIGS. 9 to 11.

When transmission of a data block from the base station 1 to the mobile station 2 is started (step S21 in FIG. 10), the selection control portion 154 of the modulation/coding mode switching selecting portion 15 starts the receipt failure block number counter (C2) 156 (step S22 in FIG. 10). Following the start of the receipt failure block number counter (C2) 156, the selection control portion 154 also starts the block number counter (N2) 158 and increments the block number counter (N2) 158 each time transmission of a data block is performed.

Thereafter, when a receiving error notice is inputted from the mobile station 2 (step S23 in FIG. 10), the selection control portion 154 starts and increments the receipt failure block number counter (C1) 155 (C1←C1+1) (step S24 in FIG. 10) and, at the same time, increments the receipt failure block number counter (C2) 156 (C2←C2+1) (step S25 in FIG. 10). Further, following the start of the receipt failure block number counter (C1) 155, the selection control portion 154 also starts the block number counter (N1) 157 and increments the block number counter (N1) 157 each time transmission of a data block is performed.

When the block number counter (N1) 157 is counted up (the number of transmitted blocks=N1) (step S26 in FIG. 10), if a value found by dividing the count value C1 of the receipt failure block number counter (C1) 155 by the number of transmitted blocks=N1 (block error rate=C1/N1) is smaller than a block error rate R1 set in advance (step S27 in FIG. 10), the selection control portion 154 resets the receipt failure block number counter (C1) 155 (C1←0) (step S28 in FIG. 10) and returns to step S21.

In addition, if the block error rate=(C1/N1) is larger than the block error rate R1 set in advance (step S27 in FIG. 10), the selection control portion 154 switches the modulation/coding mode to a slower mode as a modulation/coding mode for the pertinent mobile station 2 (step S29 in FIG. 10), resets the receipt failure block number counter (C1) 155 (C1←0), resets the receipt failure block number counter (C2) 156 (C2←0) and restarts the receipt failure block number counter (C2) 156 (step S30 in FIG. 10) and returns to step S21.

When the block number counter (N2) 158 is counted up (number of transmitted blocks=N2) (step S31 in FIG. 11), if a value found by dividing the count value C2 of the receipt failure block number counter (C2) 156 by the number of transmitted blocks=N2 (block error rate=C2/N2) is smaller than a block error rate R2 set in advance (step S32 in FIG. 11), the selection control portion 154 switches the modulation/coding mode to a faster mode as a modulation/coding mode for the pertinent mobile station 2 (step S33 in FIG. 11), resets the receipt failure block number counter (C1) 155 (C1←0), resets the receipt failure block number counter (C2) 156 (C2←0) and restarts the receipt failure block number counter (C2) 156 (step S34 in FIG. 11) and returns to step S21.

In addition, if the block error rate=(C2/N2) is equal to or larger than a block error rate R3 set in advance (step S35 in FIG. 11), the selection control portion 154 switches the modulation/coding mode to a slower mode as a modulation/coding mode for the pertinent mobile station 2 (step S36 in FIG. 11), resets the receipt failure block number counter (C1) 155 (C1←0), resets the receipt failure block number counter (C2) 156 (C2←0) and restarts the receipt failure block number counter (C2) 156 (step S37 in FIG. 11) and returns to step S21.

If the block error rate=(C2/N2) is smaller than the block error rate R3 set in advance (step S35 in FIG. 11), the selection control portion 154 resets the receipt failure block number counter (C2) 156 (C2←0) (step S38 in FIG. 11) and returns to step S21.

Figure 12:
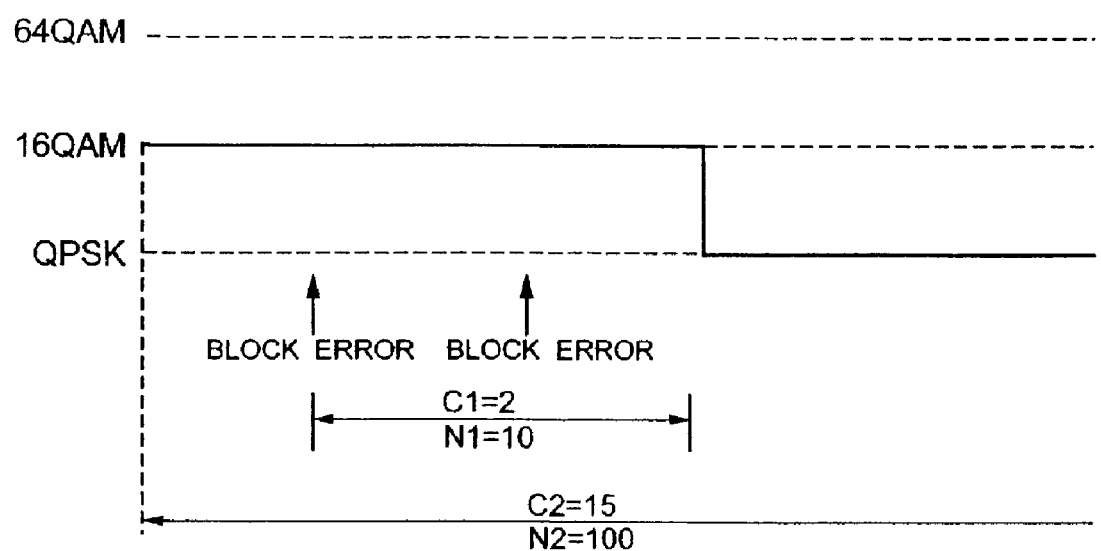
FIG. 12 illustrates a modulation/coding mode switching operation according to the third embodiment of the present invention.

FIG. 12 illustrates a modulation/coding mode switching operation according to the third embodiment of the present invention. FIG. 12 shows an operation for switching the modulation/coding mode to a slower QPSK modulation/coding mode if a block error rate is larger than the block error rate R1 set in advance in a predetermined number of blocks N1 since occurrence of a block error when the 16QAM modulation/coding mode is selected.

FIG. 13 illustrates conditions of switching the modulation/coding modes according to the third embodiment of the present invention. Switching of the modulation/coding modes according to the third embodiment of the present invention will be described with reference to FIGS. 12 and 13.

Upon receiving a receiving error notice from the mobile station 2, the base station 1 starts the receipt failure block number counter (C1) 155, which counts the number of blocks failed to be received, and counts the number of times of occurrence of a receiving error in the predetermined number of blocks N1 from the block (e.g., ten blocks). As a result, the base station 1 switches the modulation/coding mode to a slower mode if C1/N1 is larger than R1 (e.g., 0.3) and does not perform switching of the modulation/coding mode if C1/N1 is smaller than R1.

On the other hand, when transmission of a block is started or when the modulation/coding mode has been switched, the base station 1 starts the receipt failure block number counter (C2) 156, which counts the number of blocks failed to be received, and counts the number of times of occurrence of a receiving error in the predetermined number of blocks N2 from the block (e.g., one hundred blocks). As a result, the base station 1 switches the modulation/coding mode to a faster mode if C2/N2 is smaller than R2 (e.g., 0.1), switches the modulation/coding mode to a slower mode if C2/N2 is larger than R3 (e.g., 0.2) and does not perform switching of the modulation/coding mode if C2/N2 is larger than R2 and smaller than R3.

In this case, it is assumed that the predetermined number of blocks N2 is larger than the predetermined number of blocks N1 and, the smaller the predetermined number of blocks N1 the more promptly the modulation/coding mode can be switched in response to increase of a block error rate.

In this way, since the base station 1 switches the modulation/coding mode to a slower mode at the few predetermined number of blocks N1 in response to increase of a block error rate, it can promptly switch the modulation/coding mode to a slower mode when conditions of a transmission path are deteriorated.

In addition, since the base station 1 switches the modulation/coding mode to a faster mode at the predetermined number of blocks N2 that is larger than the predetermined number of blocks N1 in response to decrease of a block error rate, a target block error rate can be satisfied. Thus, the modulation/coding mode can be promptly switched to an optimal mode in the third embodiment of the present invention. In this case, since the switching to a faster mode is monitored at a long period, unnecessary switching of a mode can be reduced. Moreover, switching to a slower mode is determined according to a plurality of block errors, whereby unnecessary switching of a mode can also be reduced.

Figure 14:
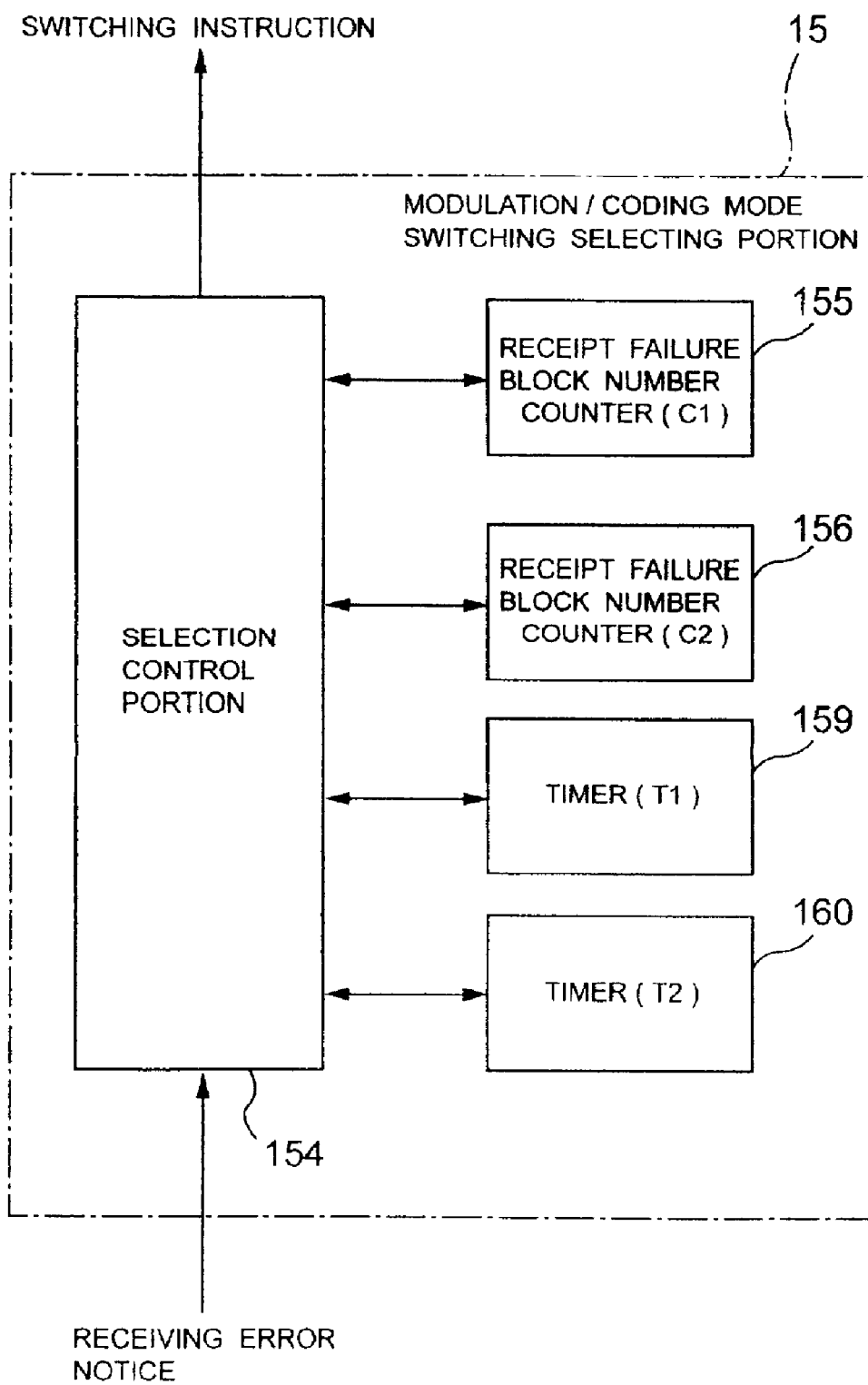
FIG. 14 is a block diagram showing a configuration of a modulation/coding mode switching selecting portion according to a fourth embodiment of the present invention.

FIG. 14 is a block diagram showing a configuration of the modulation/coding mode switching selecting portion 15 according to a fourth embodiment of the present invention. In FIG. 14, the modulation/coding mode switching selecting portion 15 according to the fourth embodiment of the present invention has the same configuration as that of the modulation/coding mode switching selecting portion 15 according to the third embodiment of the present invention shown in FIG. 9 except that it is provided with a timer (T1) 159 and a timer (T2) 160 instead of the block number counter (N1) 157 and the block number counter (N2) 158 and the identical elements are denoted by the identical reference numerals. In addition, operations of the identical elements are the same as those in the third embodiment.

Figure 15:
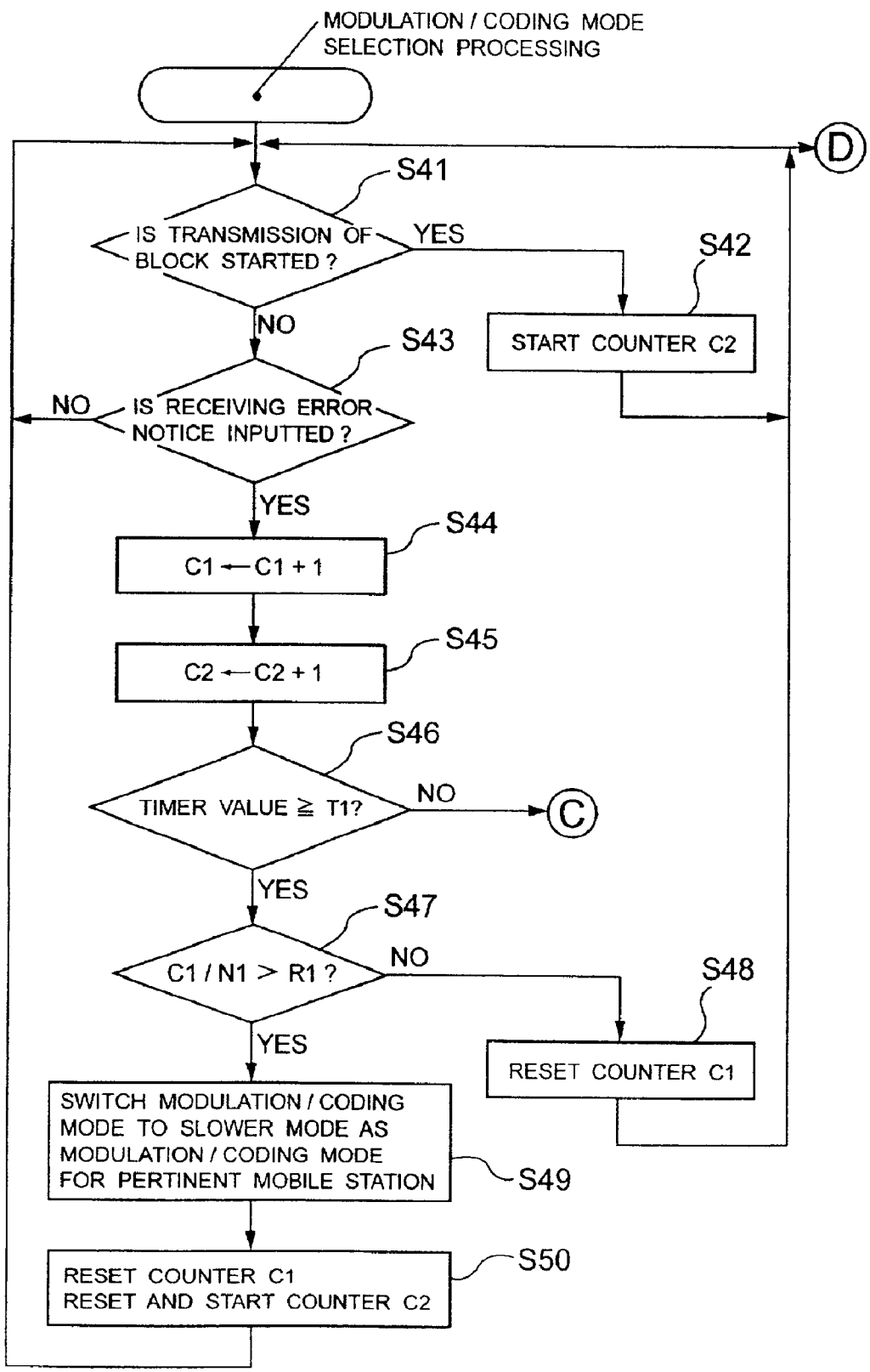
FIG. 15 is a flow chart showing an operation of modulation/coding mode switching selection by the modulation/coding mode switching selecting portion of FIG. 14.
Figure 16:
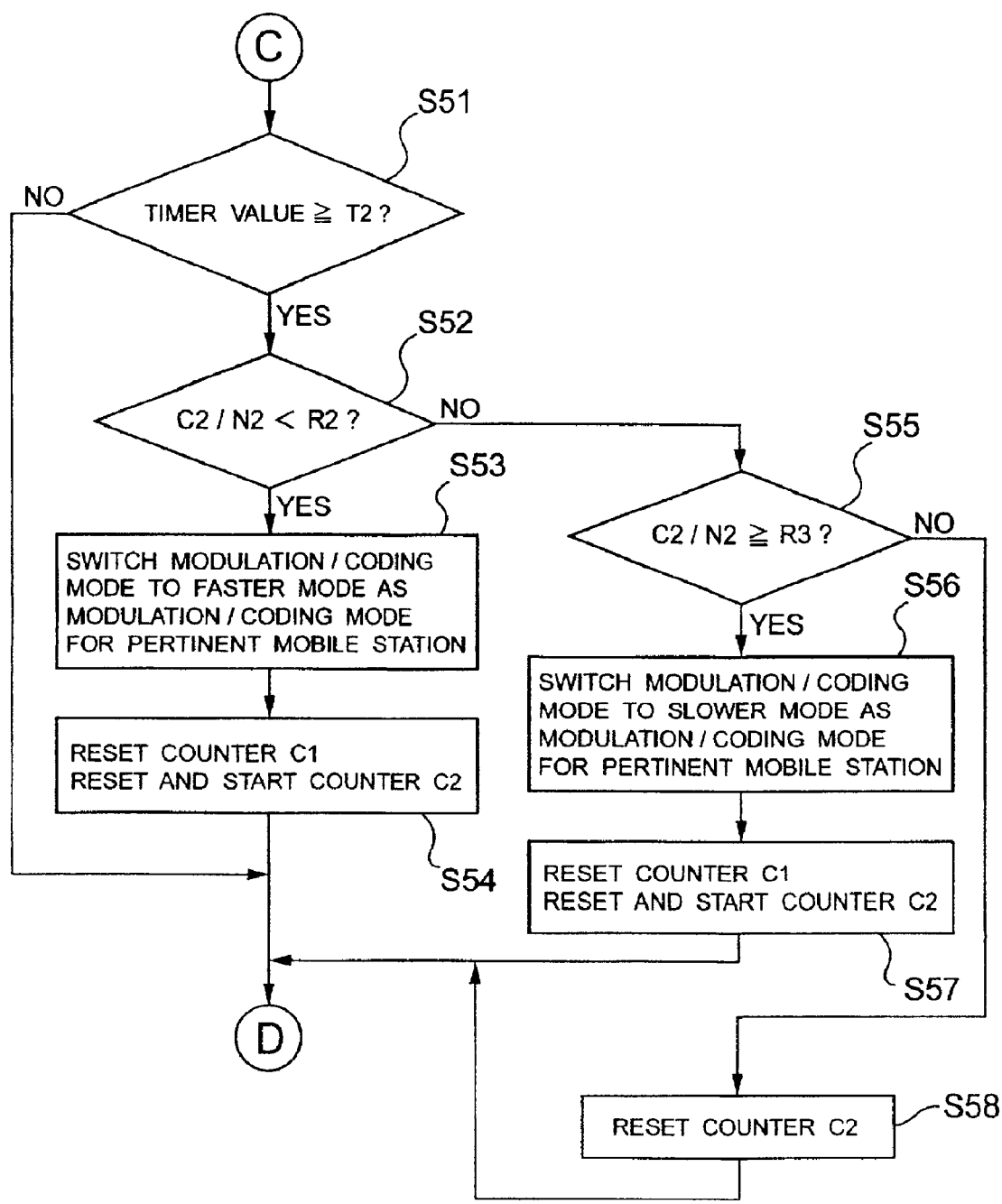
FIG. 16 is a flow chart showing an operation of modulation/coding mode switching selection by the modulation/coding mode switching selecting portion of FIG. 14.

FIGS. 15 and 16 are a flowchart showing an operation of modulation/coding mode switching selection by the modulation/coding mode switching selecting portion 15 of FIG. 14. The operation of modulation/coding mode switching selection by the modulation/coding mode switching selecting portion 15 according to the fourth embodiment of the present invention will be described with reference to FIGS. 14 to 16.

When transmission of a data block from the base station 1 to the mobile station 2 is started (step S41 in FIG. 15), the selection control portion 154 of the modulation/coding mode switching selecting portion 15 starts the receipt failure block number counter (C2) 156 (step S42 in FIG. 15). The selection control portion 154 starts the timer (T2) 160 following the start of the receipt failure block number counter (C2) 156.

Thereafter, when a receiving error notice is inputted from the mobile station 2 (step S43 in FIG. 15), the selection control portion 154 starts and increments the receipt failure block number counter (C1) 155 (C1←C1+1) (step S44 in FIG. 15) and, at the same time, increments the receipt failure block number counter (C2) 156 (C2←C2+1) (step S45 in FIG. 15). Further, the selection control portion 154 starts the timer (T1) 159 following the start of the receipt failure block number counter (C1) 155.

When the timer (T1) 159 is up (timer value≧T1) (step S46 in FIG. 15), if a value found by dividing the count value C1 of the receipt failure block number counter (C1) 155 by the number of blocks=N1 to be transmitted during the predetermined time T1 (block error rate=C1/N1) is smaller than the block error rate R1 set in advance (step S47 in FIG. 15), the selection control portion 154 resets the receipt failure block number counter (C1) 155 (C1←0) (step S48 in FIG. 15) and returns to step S41.

In addition, if the block error rate (=C1/N1) is larger than the block error rate R1 set in advance (step S47 in FIG. 15), the selection control portion 154 switches the modulation/coding mode to a slower mode as a modulation/coding mode for the pertinent mobile station 2 (step S49 in FIG. 15), resets the receipt failure block number counter (C1) 155 (C1←0), resets the receipt failure block number counter (C2) 156 (C2←0) and restarts the receipt failure block number counter (C2) 156 (step S50 in FIG. 15) and returns to step S41.

When the timer (T2) 160 is up (timer value≧T2) (step S51 in FIG. 16), if a value found by dividing the count value C2 of the receipt failure block number counter (C2) 156 by the number of blocks=N2 to be transmitted during the predetermined time T2 (block error rate=C2/N2) is smaller than the block error rate R2 set in advance (step S52 in FIG. 16), the selection control portion 154 switches the modulation/coding mode to a faster mode as a modulation/coding mode for the pertinent mobile station 2 (step S53 in FIG. 16), resets the receipt failure block number counter (C1) 155 (C1←0), resets the receipt failure block number counter (C2) 156 (C2←0) and restarts the receipt failure block number counter (C2) 156 (step S54 in FIG. 16) and returns to step S41.

In addition, if the block error rate (=C2/N2) is equal to or larger than the block error rate R3 set in advance (step S55 in FIG. 16), the selection control portion 154 switches the modulation/coding mode to a slower mode as a modulation/coding mode for the pertinent mobile station 2 (step S56 in FIG. 16), resets the receipt failure block number counter (C1) 155 (C1←0), resets the receipt failure block number counter (C2) 156 (C2←0) and restarts the receipt failure block number counter (C2) 156 (step S57 in FIG. 16) and returns to step S41.

If the block error rate (=C2/N2) is smaller than the block error rate R3 set in advance (step S55 in FIG. 16), the selection control portion 154 resets the receipt failure block number counter (C2) 156 (C2←0) (step S58 in FIG. 16) and returns to step S41.

In this way, since the base station 1 switches the modulation/coding mode to a slower mode at the short predetermined time T1 in response to increase of a block error rate, it can promptly switch the modulation/coding mode to a slower mode when conditions of a transmission path are deteriorated.

In addition, since the base station 1 switches the modulation/coding mode to a faster mode at the predetermined time T2 that is longer than the predetermined time T1 in response to decrease of a block error rate, a target block error rate can be satisfied. Thus, the modulation/coding mode can be promptly switched to an optimal mode in the fourth embodiment of the present invention. In this case, since the switching to a faster mode is monitored at a long period, unnecessary switching of a mode can be reduced. Moreover, since switching to a slower mode is determined according to a plurality of block errors, unnecessary switching of a mode can also be reduced.

Figure 17:
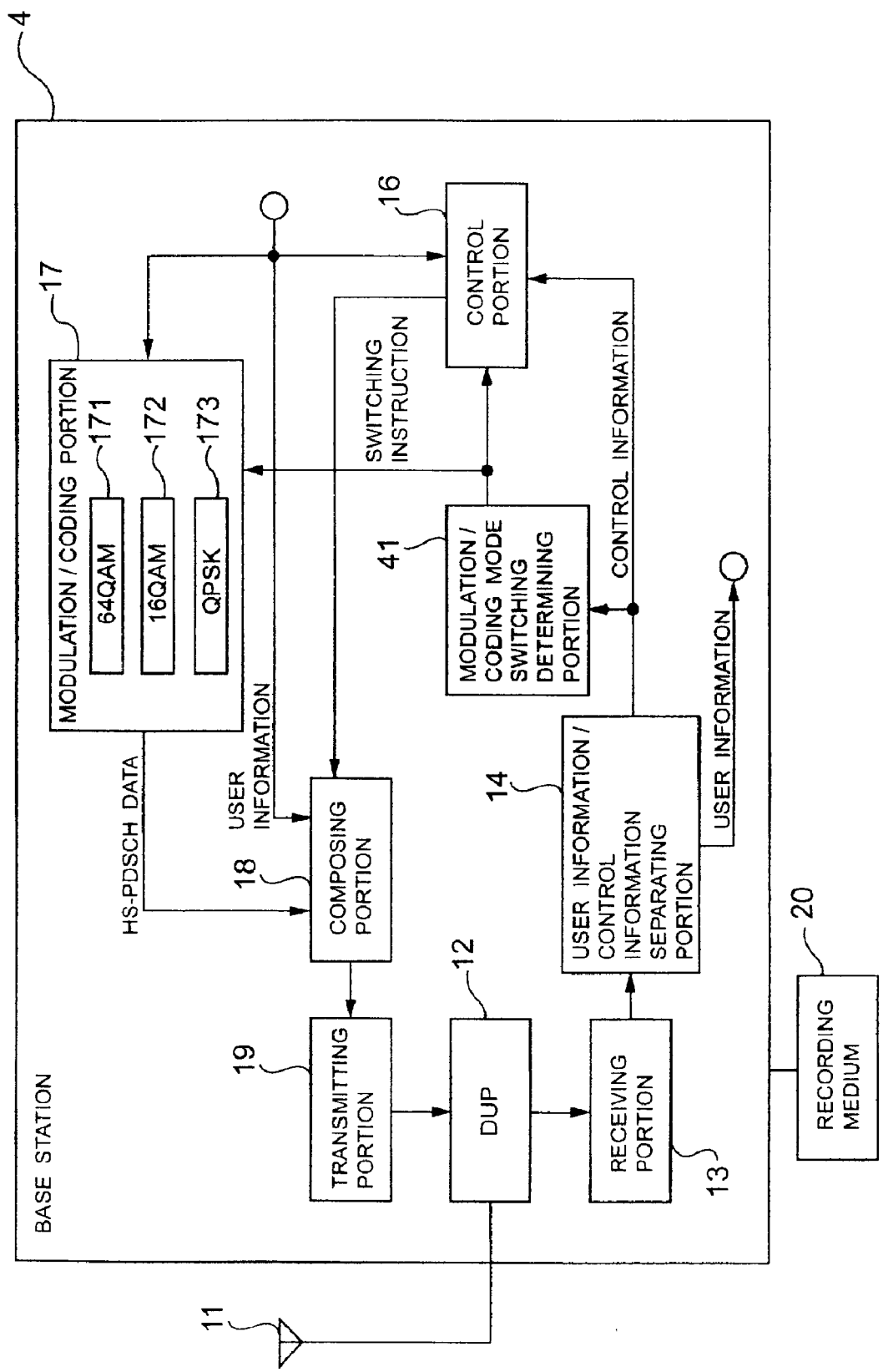
FIG. 17 is a block diagram showing a configuration of a base station according to a fifth embodiment of the present invention.

FIG. 17 is a block diagram showing a configuration of a base station 4 according to a fifth embodiment of the present invention. In FIG. 17, the base station 4 according to the fifth embodiment of the present invention has the same configuration as that of the base station 1 according to the first embodiment of the present invention shown in FIG. 2 except that a modulation/coding mode switching determining portion 41 is provided instead of the modulation/coding mode switching selecting portion 15 and the identical elements are denoted by the identical reference numerals. In addition, the operations of the identical elements are the same as those of the first embodiment of the present invention.

The modulation/coding mode switching determining portion 41 executes a program stored in the recording medium 20, thereby monitoring a switching instruction notice from a not-shown mobile station, and, upon receiving a switching instruction notice, forwards a switching instruction to switch the modulation/coding mode to a mode slower than a current modulation/coding mode to the control portion 16 and the modulation/coding portion 17, respectively.

Figure 18:
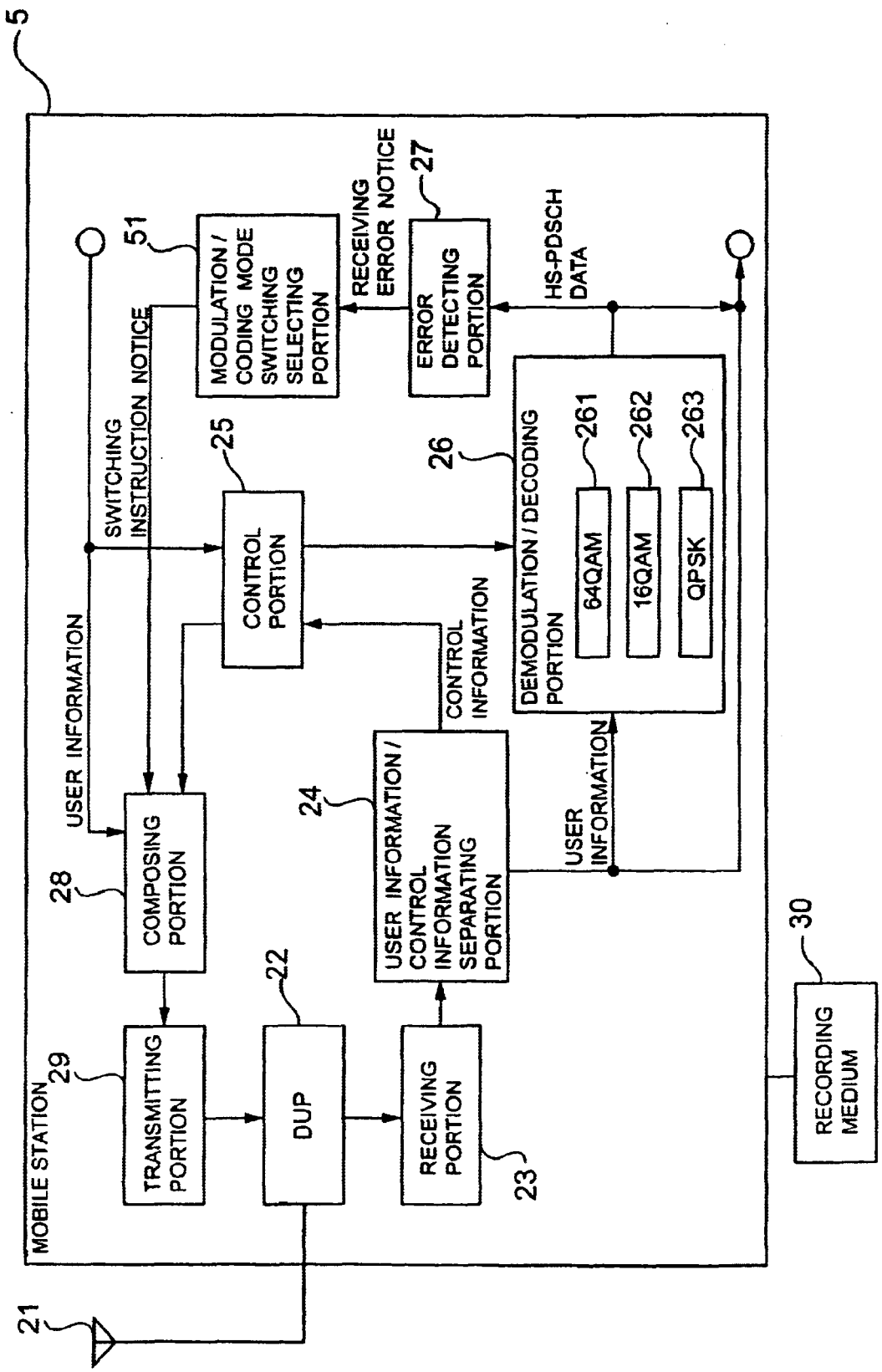
FIG. 18 is a block diagram showing a configuration of a mobile station according to the fifth embodiment of the present invention.

FIG. 18 is a block diagram showing a configuration of a mobile station 5 according to the fifth embodiment of the present invention. In FIG. 18, the mobile station 5 according to the fifth embodiment of the present invention has the same configuration as that of the mobile station 2 according to the first embodiment of the present invention according to the present invention shown in FIG. 3 except that a modulation/coding mode switching selecting portion 51 is provided and the identical elements are denoted by the identical reference numerals. In addition, the operations of the identical elements are the same as those of the first embodiment of the present invention.

Upon receiving data of the HS-PDSCH decoded by the demodulation/decoding portion 26, the error detecting portion 27 determines existence or nonexistence of a receiving error of each data block using the CRC code added to the data and outputs a result of the determination to the modulation/coding mode switching selecting portion 51.

The modulation/coding mode switching selecting portion 51 executes a program stored in the recording medium 30, thereby monitoring the determination result from the error detecting portion 27, and, if the determination result shows that a receiving error exists, forwards a switching instruction notice to switch the modulation/coding mode to a mode slower than a current modulation/coding mode to the composing portion 28.

In addition, if a receiving error does not occur continuously for the predetermined number of blocks Ns after the receiving error, the modulation/coding mode switching selecting portion 51 forwards a switching instruction notice to switch the modulation/coding mode to a mode faster than a current modulation/coding mode to the composing portion 28.

The composing portion 28 composes the control information from the control portion 25, the switching instruction notice from the modulation/coding mode switching selecting portion 51, an input signal from the outside such as the call control portion and the voice input portion of the mobile station 2, or the like, to send the composed data from the antenna 21 as the DPCH (UL) and the HS-PDSCH via the transmitting portion 29 and the duplexer 22.

Figure 19:
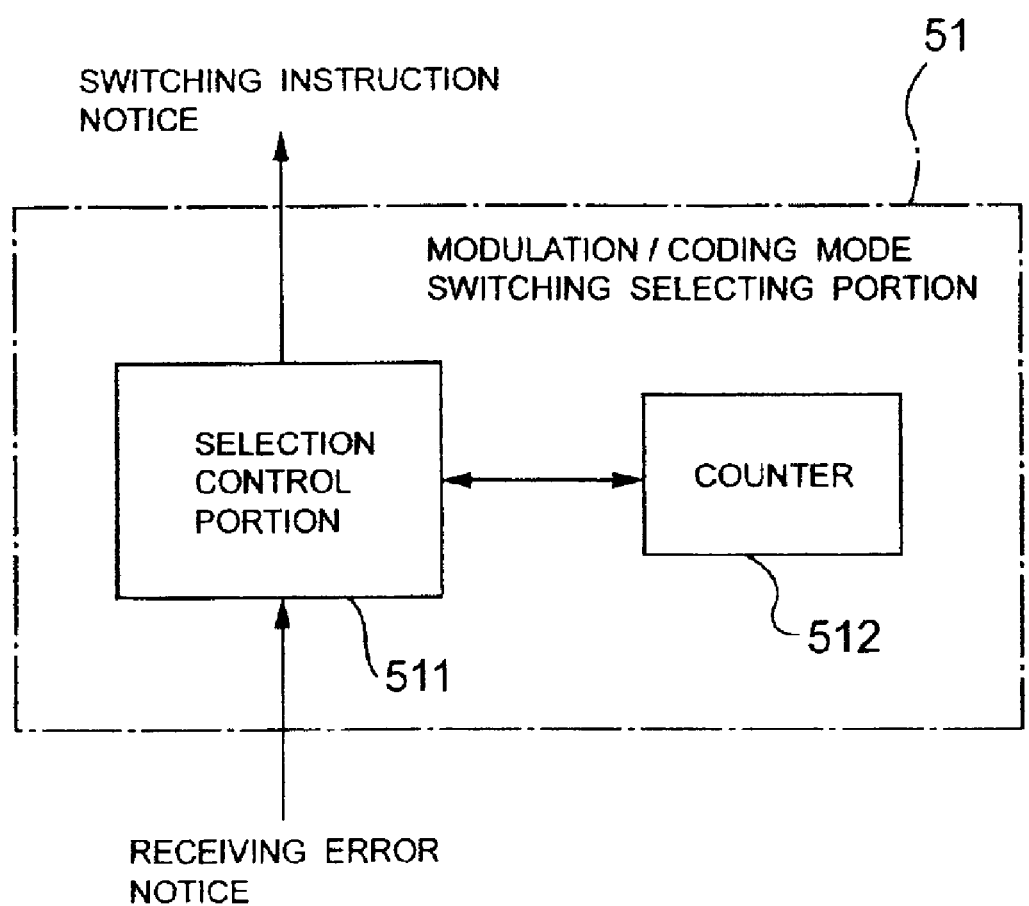
FIG. 19 is a block diagram showing a configuration of the modulation/coding switching selecting portion of FIG. 18.

FIG. 19 is a block diagram showing a configuration of the modulation/coding mode switching selecting portion 51 of FIG. 18. In FIG. 19, the modulation/coding mode switching selecting portion 51 comprises a selection control portion 511 and a counter 512.

Figure 20:
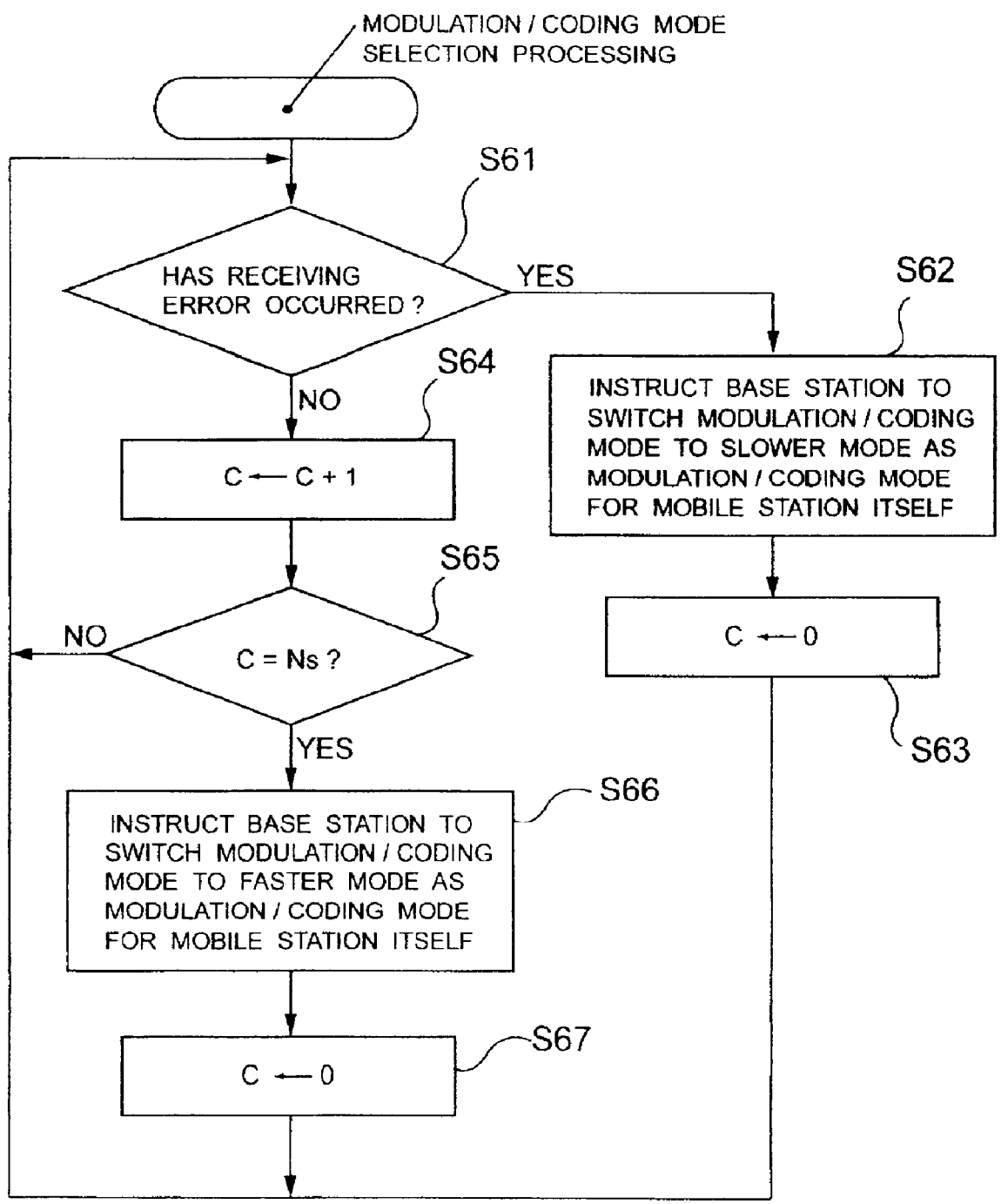
FIG. 20 is a flow chart showing an operation of modulation/coding mode switching selection by the modulation/coding mode switching selecting portion of FIG. 19.

FIG. 20 is a flow chart showing an operation of modulation/coding mode switching selection by the modulation/coding mode switching selecting portion 51 of FIG. 19. The operation of modulation/coding mode switching selection by the modulation/coding mode switching selecting portion 51 will be described with reference to FIGS. 19 and 20.

If the determination result from the error detecting portion 27 shows that an receiving error exists (step S61 in FIG. 20), the selection control portion 511 of the modulation/coding mode switching selection portion 51 instructs the base station 4 to switch the modulation/coding mode to a slower mode as a modulation/coding mode for the mobile station 5 itself (step S62 in FIG. 20) and clears the counter value C of the counter 512 (C←0) (step S63 in FIG. 20).

If the determination result from the error detecting portion 27 does not shown a receiving error exists (step S61 in FIG. 20), the selection control portion 511 increments the counter value C of the counter 512 (C←C+1) (step S64 in FIG. 20). When the incremented counter value C of the counter 512 is equal to the predetermined number of blocks Ns (C=Ns) (step S65 in FIG. 20), the selection control portion 511 instructs the base station 4 to switch the modulation/coding mode to a faster mode as a modulation/coding mode for the mobile station 5 itself (step S66 in FIG. 20) and clears the counter value C of the counter 512 (C←0) (step S67 in FIG. 20).

That is, the selection control portion 511 switches the modulation/coding mode to a slower mode if the determination result from the detecting portion 27 shows that a receiving error exists and switches the modulation/coding mode to a faster mode if a data block is successfully received for the predetermined number of blocks Ns or more after performing the switching.

In this way, since the mobile station 5 switches the modulation/coding mode at an error of one block, it can promptly switch the modulation/coding mode to a slower mode when conditions of a transmission path are deteriorated. In addition, when a target block error rate is satisfied, the mobile station 5 can immediately switch the modulation/coding mode to a faster mode. Thus, the modulation/coding mode can be promptly switched to an optimal mode in the fifth embodiment of the present invention. In this case, since the predetermined number of blocks Ns is determined according to a target block error rate, the target block error rate can be satisfied.

Figure 21:
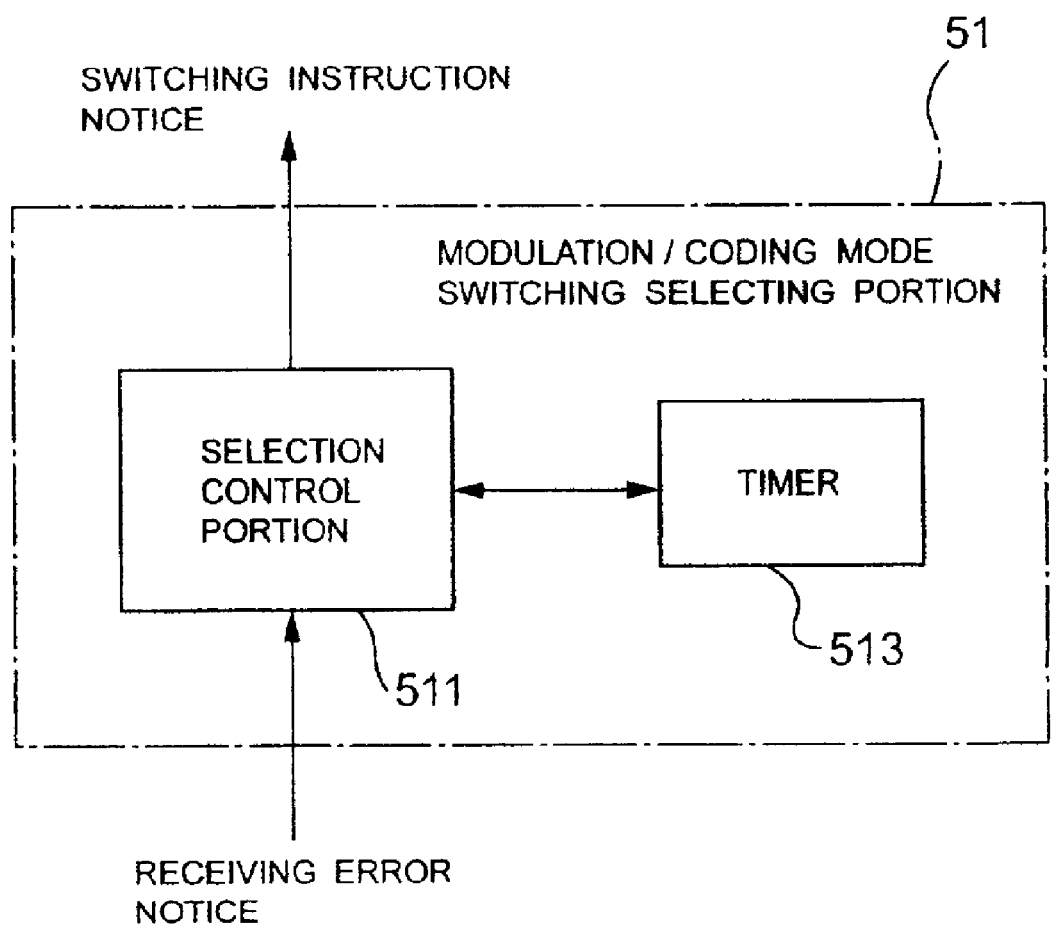
FIG. 21 is a block diagram showing a configuration of a modulation/coding mode switching selecting portion according to a sixth embodiment of the present invention.

FIG. 21 is a block diagram showing a configuration of the modulation/coding mode switching selecting portion 51 according to a sixth embodiment of the present invention. In FIG. 21, the modulation/coding mode switching selecting portion 51 comprises the selection control portion 511 and a timer 513. Further, although not shown, since the sixth embodiment of the present invention has the same configuration as that of the mobile communication system shown in FIG. 1 and the same configuration as those of the base station 4 according to the fifth embodiment of the present invention shown in FIG. 17 and the mobile station 5 according to the fifth embodiment of the present invention shown in FIG. 18, descriptions on them will be omitted.

Figure 22:
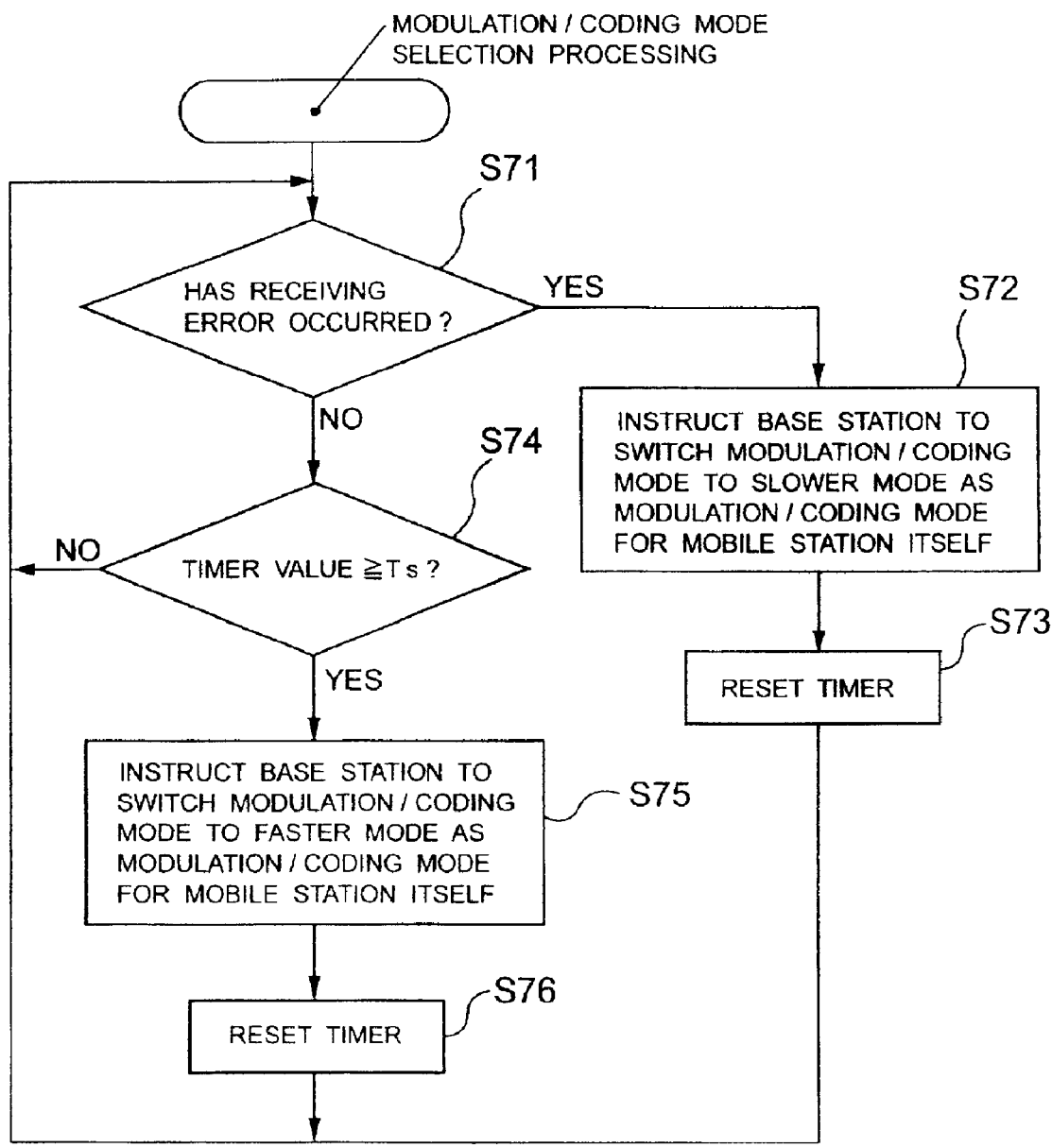
FIG. 22 is a flow chart showing an operation of modulation/coding mode switching selection by the modulation/coding switching selecting portion of FIG. 21.

FIG. 22 is a flow chart showing an operation of the modulation/coding mode switching selection by the modulation/coding mode switching selecting portion 51 of FIG. 21. The operation of modulation/coding mode switching selection by the modulation/coding mode switching selecting portion 51 according to the sixth embodiment of the present invention will be described with reference to FIGS. 21 and 22.

If the determination result from the error detecting portion 27 shows that a receiving error exists (step S71 in FIG. 22), the selection control portion 511 of the modulation/coding mode switching selection portion 51 instructs the base station 4 to switch the modulation/coding mode to a slower mode as a modulation/coding mode for the mobile station 5 itself (step S72 in FIG. 22) and resets the timer 513 (step S73 in FIG. 22).

If the determination result from the error detecting portion 27 does not show a receiving error exists (step S71 in FIG. 22), when a timer value of the timer 513 exceeds the predetermined time Ts (step S74 in FIG. 22), the selection control portion 511 instructs the base station 4 to switch the modulation/coding mode to a faster mode as a modulation/coding mode for the mobile station 5 itself (step S75 in FIG. 22) and resets the timer 513 (step S76 in FIG. 22).

That is, the selection control portion 511 switches the modulation/coding mode to a slower mode if the determination result from the detecting portion 27 shows that a receiving error exists and switches the modulation/coding mode to a faster mode if a data block is successfully received for the predetermined time Ts or more after performing the switching.

In this way, since the mobile station 51 switches the modulation/coding mode at an error of one block, it can promptly switch the modulation/coding mode to a slower mode when conditions of a transmission path are deteriorated. In addition, when a target block error rate is satisfied, the mobile station 5 can immediately switch the modulation/coding mode to a faster mode. Thus, the modulation/coding mode can be promptly switched to an optimal mode in the sixth embodiment of the present invention. In this case, if the predetermined time Ts is time required for transmitting the predetermined number of blocks Ns, since the predetermined time Ts is determined according to a target block error rate, the target block error rate can be satisfied.

Figure 23:
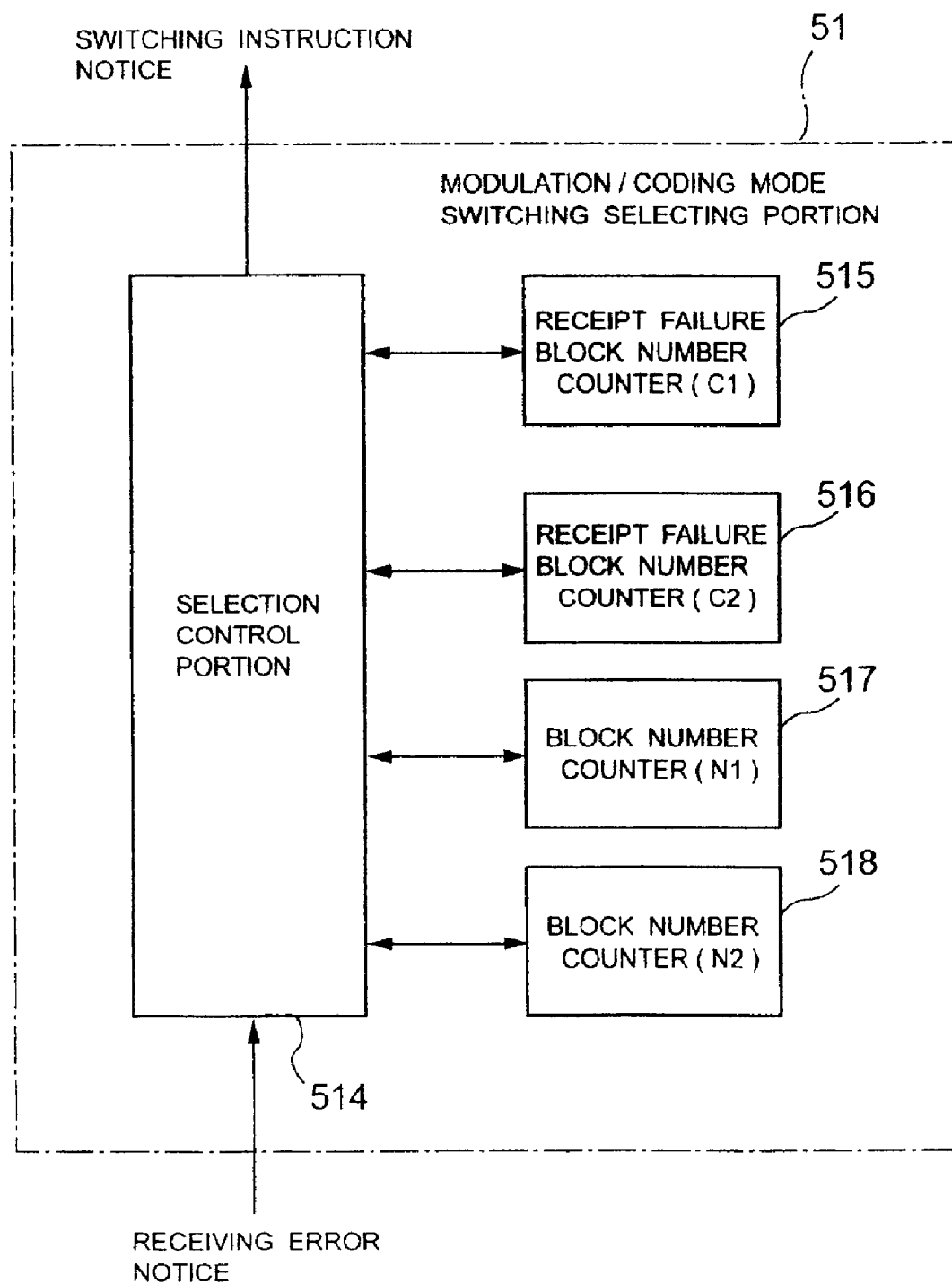
FIG. 23 is a block diagram showing a configuration of a modulation/coding mode switching selecting portion according to a seventh embodiment of the present invention.

FIG. 23 is a block diagram showing a configuration of the modulation/coding mode switching selecting portion 51 according to a seventh embodiment of the present invention. In FIG. 23, the modulation/coding mode switching selecting portion 51 comprises a selection control portion 514, a receipt failure block number counter (C1) 515, a receipt failure block number counter (C2) 516, a block number counter (N1) 517 and a block number counter (N2) 518. Further, although not shown, since the seventh embodiment of the present invention has the same configuration as that of the mobile communication system shown in FIG. 1 and the same configuration as those of the base station 4 according to the fifth embodiment of the present invention shown in FIG. 17 and the mobile station 5 according to the fifth embodiment of the present invention shown in FIG. 18, descriptions on them will be omitted.

Figure 24:
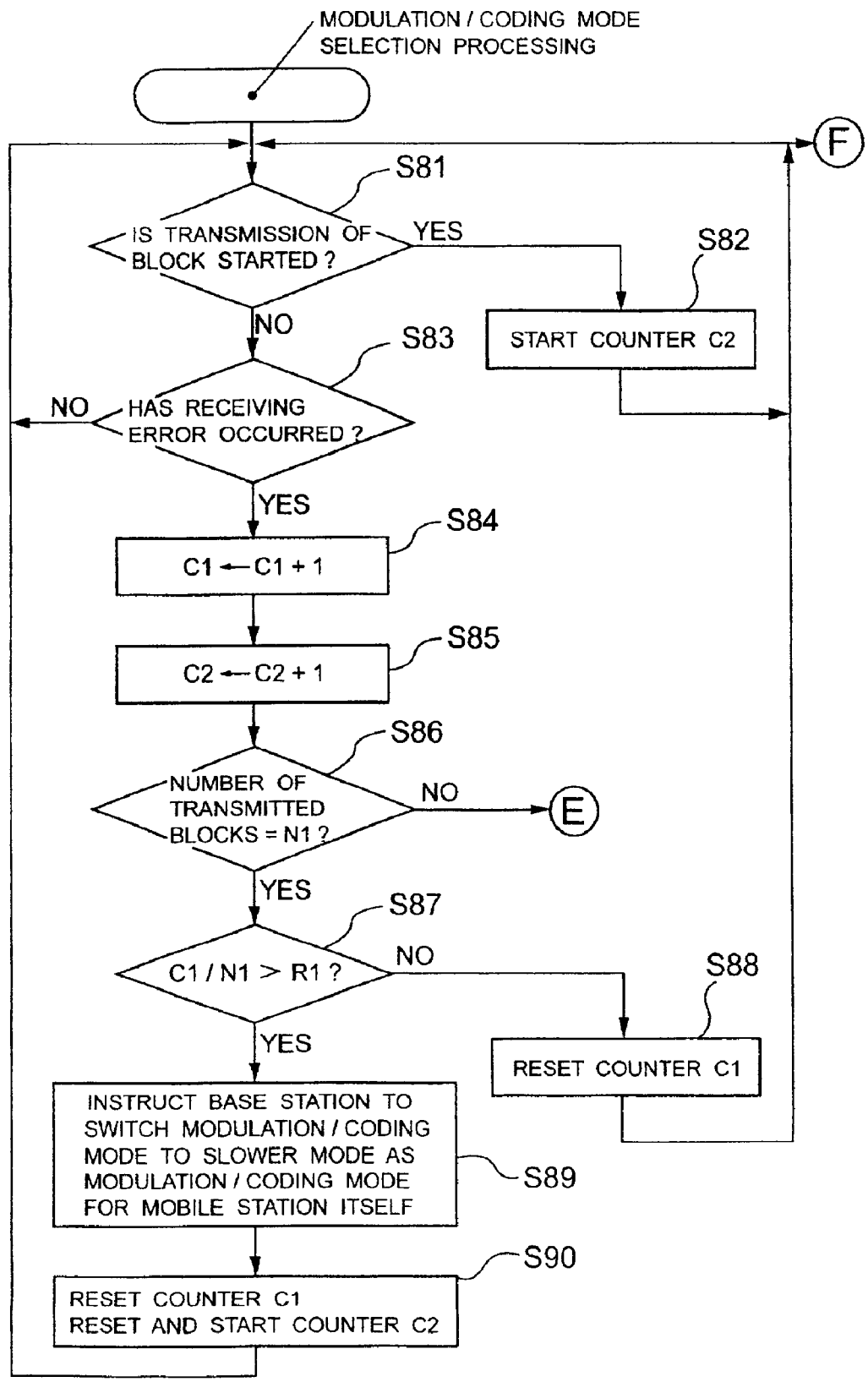
FIG. 24 is a flow chart showing an operation of modulation/coding mode switching selection by the modulation/coding mode switching selecting portion of FIG. 23.
Figure 25:
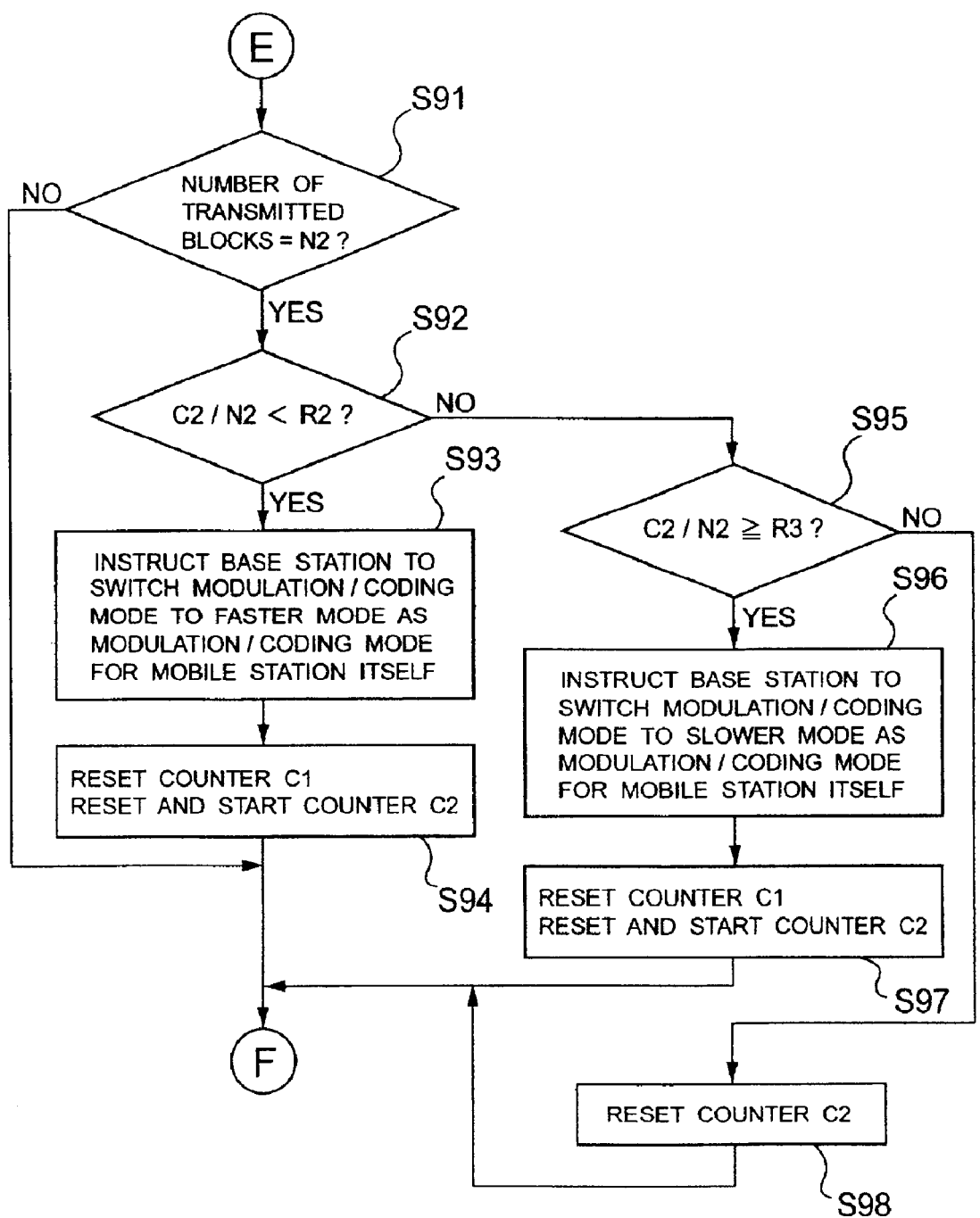
FIG. 25 is a flow chart showing an operation of modulation/coding mode switching selection by the modulation/coding mode switching selecting portion of FIG. 23.

FIGS. 24 and 25 are a flow chart showing an operation of the modulation/coding mode switching selection by the modulation/coding mode switching selecting portion 51 of FIG. 23. The operation of modulation/coding mode switching selection by the modulation/coding mode switching selecting portion 51 according to the seventh embodiment of the present invention will be described with reference to FIGS. 23 to 25.

When transmission of a data block from the base station 4 to the mobile station 5 is started (step S81 in FIG. 24), the selection control portion 514 of the modulation/coding mode switching selecting portion 51 starts the receipt failure block number counter (C2) 516 (step S82 in FIG. 24). The selection control portion 514 also starts the block number counter (N2) 518 following the start of the receipt failure block number counter (C2) 516 and increments the block number counter (N2) 518 each time transmission of a data block is performed.

Thereafter, if the determination result from the error detecting portion 27 shows that a receiving error exists (step S83 in FIG. 24), the selection control portion 514 starts and increments the receipt failure block number counter (C1) 515 (C1←C1+1) (step S84 in FIG. 24) and, at the same time, increments the receipt failure block number counter (C2) 516 (C2←C2+1) (step S85 in FIG. 24). Further, following the start of the receipt failure block number counter (C1) 515, the selection control portion 514 also starts the block number counter (N1) 517 and increments the block number counter (N1) 517 each time transmission of a data block is performed.

When the block number counter (N1) 517 is counted up (the number of transmitted blocks=N1) (step S86 in FIG. 24), if a value found by dividing the count value C1 of the receipt failure block number counter (C1) 515 by the number of transmitted blocks=N1 (block error rate=C1/N1) is smaller than the block error rate R1 set in advance (step S87 in FIG. 24), the selection control portion 514 resets the receipt failure block number counter (C1) 515 (C1←0) (step S88 in FIG. 24) and returns to step S81.

In addition, if the block error rate=(C1/N1) is larger than the block error rate R1 set in advance (step S87 in FIG. 24), the selection control portion 514 instructs the base station 4 to switch the modulation/coding mode to a slower mode as a modulation/coding mode for the mobile station 5 itself (step S89 in FIG. 24), resets the receipt failure block number counter (C1) 515 (C1←0), resets the receipt failure block number counter (C2) 516 (C2←0) and restarts the receipt failure block number counter (C2) 516 (step S90 in FIG. 24) and returns to step S81.

When the block number counter (N2) 518 is counted up (number of transmitted blocks=N2) (step S91 in FIG. 25), if a value found by dividing the count value C2 of the receipt failure block number counter (C2) 516 by the number of transmitted blocks=N2 (block error rate=C2/N2) is smaller than the block error rate R2 set in advance (step S92 in FIG. 25), the selection control portion 514 instructs the base station 4 to switch the modulation/coding mode to a faster mode as a modulation/coding mode for the mobile station 5 itself (step S93 in FIG. 25), resets the receipt failure block number counter (C1) 515 (C1←0), resets the receipt failure block number counter (C2) 516 (C2←0) and restarts the receipt failure block number counter (C2) 516 (step S94 in FIG. 25) and returns to step S81.

In addition, if the block error rate=(C2/N2) is equal to or larger than the block error rate R3 set in advance (step S95 in FIG. 25), the selection control portion 514 instructs the base station 4 to switch the modulation/coding mode to a slower mode as a modulation/coding mode for the mobile station 5 itself (step S96 in FIG. 25), resets the receipt failure block number counter (C1) 515 (C1←0), resets the receipt failure block number counter (C2) 516 (C2←0) and restarts the receipt failure block number counter (C2) 516 (step S97 in FIG. 25) and returns to step S81.

If the block error rate=(C2/N2) is smaller than the block error rate R3 set in advance (step S95 in FIG. 25), the selection control portion 514 resets the receipt failure block number counter (C2) 516 (C2←0) (step S98 in FIG. 25) and returns to step S81.

In this way, since the mobile station 5 switches the modulation/coding mode to a slower mode at the few predetermined number of blocks N1 in response to increase of a block error rate, it can promptly switch the modulation/coding mode to a slower mode when conditions of a transmission path are deteriorated.

In addition, since the mobile station 5 switches the modulation/coding mode to a faster mode at the predetermined number of blocks N2 that is larger than the predetermined number of blocks N1 in response to decrease of a block error rate, a target block error rate can be satisfied. Thus, the modulation/coding mode can be promptly switched to an optimal mode in the seventh embodiment of the present invention. In this case, since the switching to a faster mode is monitored at a long period, unnecessary switching of a mode can be reduced. Moreover, switching to a slower mode is determined according to a plurality of block errors, whereby unnecessary switching of a mode can also be reduced.

Figure 26:
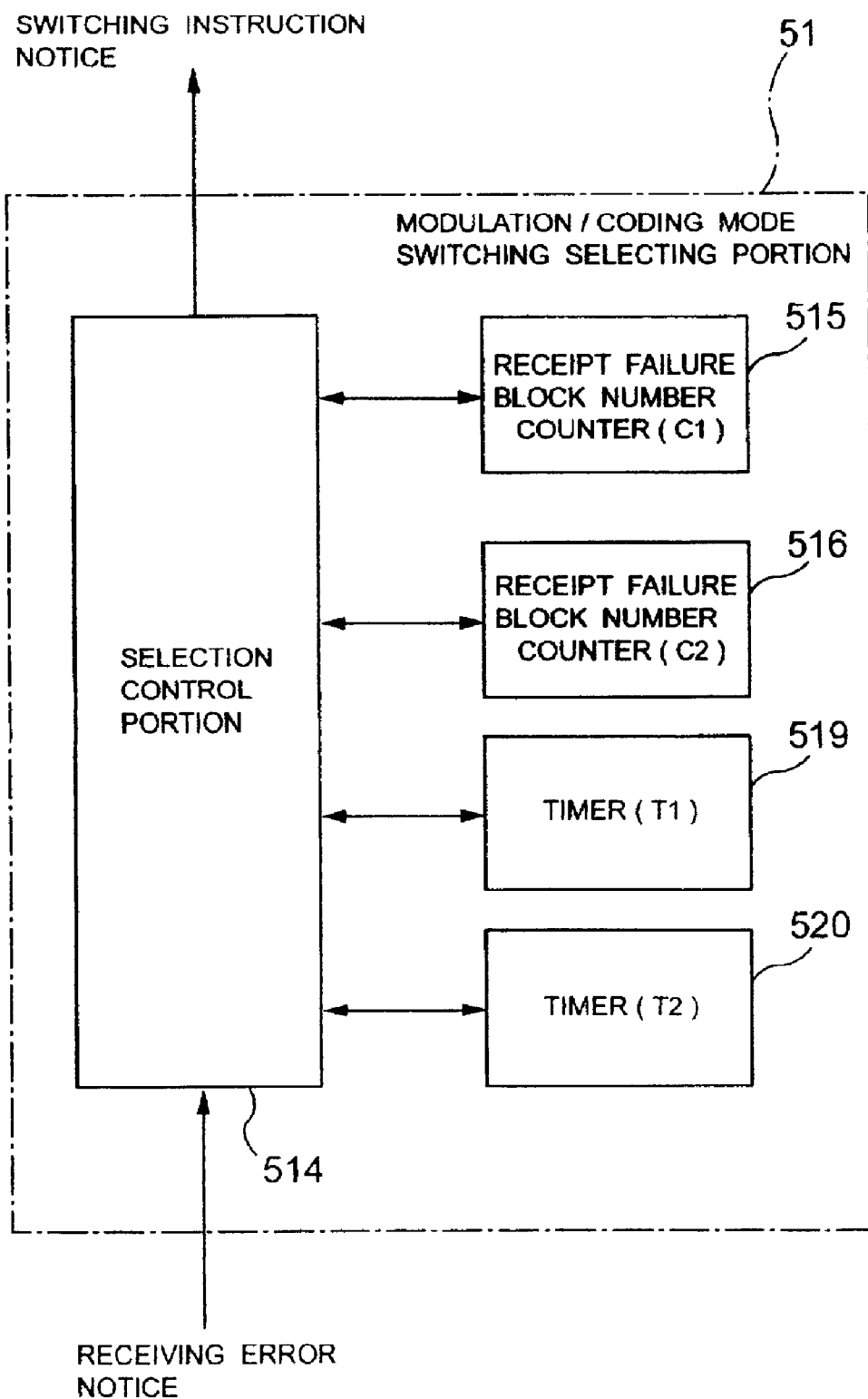
FIG. 26 is a block diagram showing a configuration of a modulation/coding mode switching unit according to an eighth embodiment of the present invention.

FIG. 26 is a block diagram showing a configuration of the modulation/coding mode switching selecting portion 51 in an eighth embodiment of the present invention. In FIG. 26, the modulation/coding mode switching selecting portion 51 according to the eighth embodiment of the present invention has the same configuration as that of the modulation/coding mode switching selecting portion 51 according to the seventh embodiment of the present invention shown in FIG. 23 except that it is provided with a timer (T1) 519 and a timer (T2) 520 instead of the block number counter (N1) 517 and the block number counter (N2) 518 and the identical elements are denoted by the identical reference numerals. In addition, operations of the identical elements are the same as those in the seventh embodiment.

Figure 27:
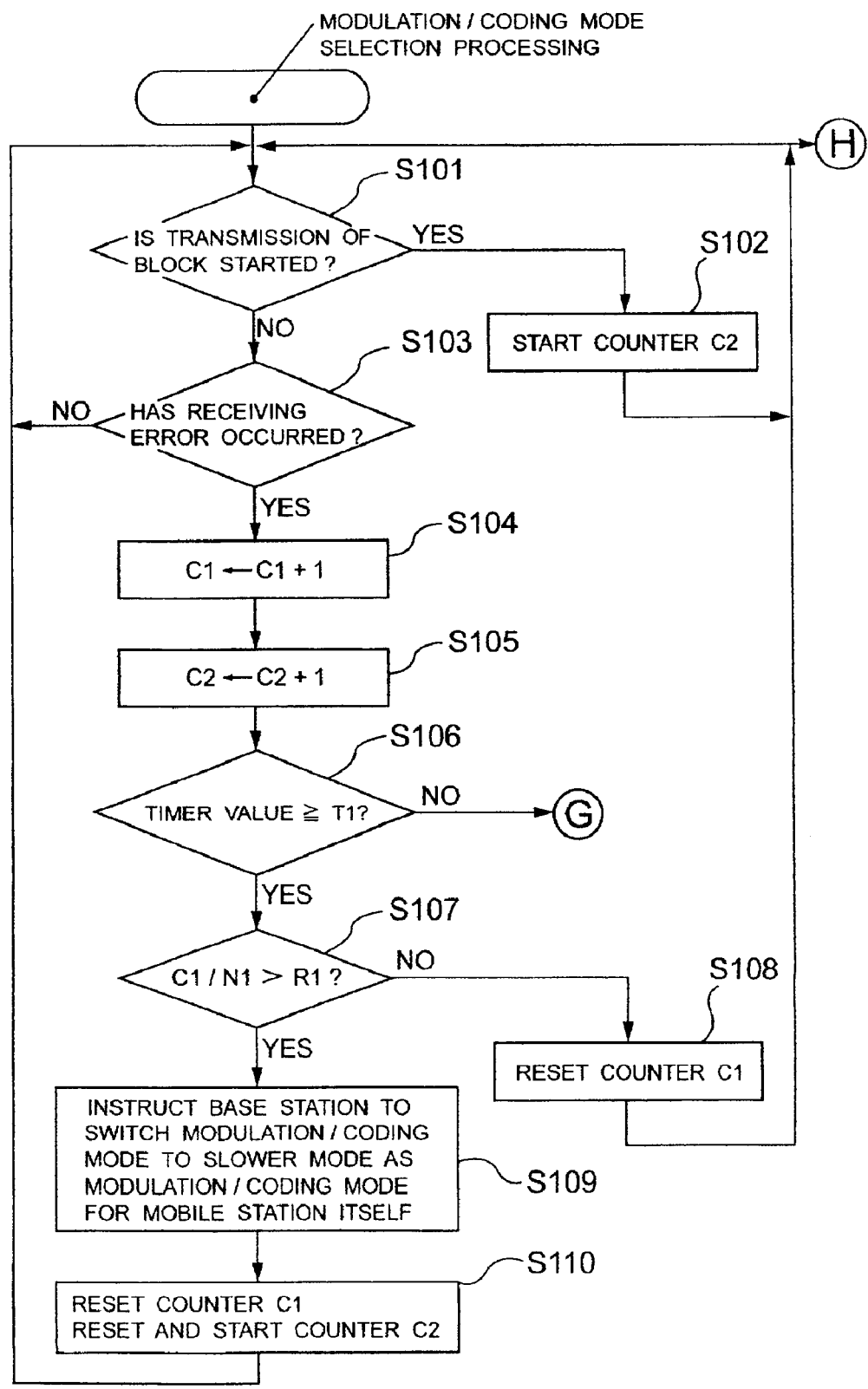
FIG. 27 is a flow chart showing an operation of modulation/coding mode switching selection by the modulation/coding mode switching selecting portion of FIG. 26.
Figure 28:
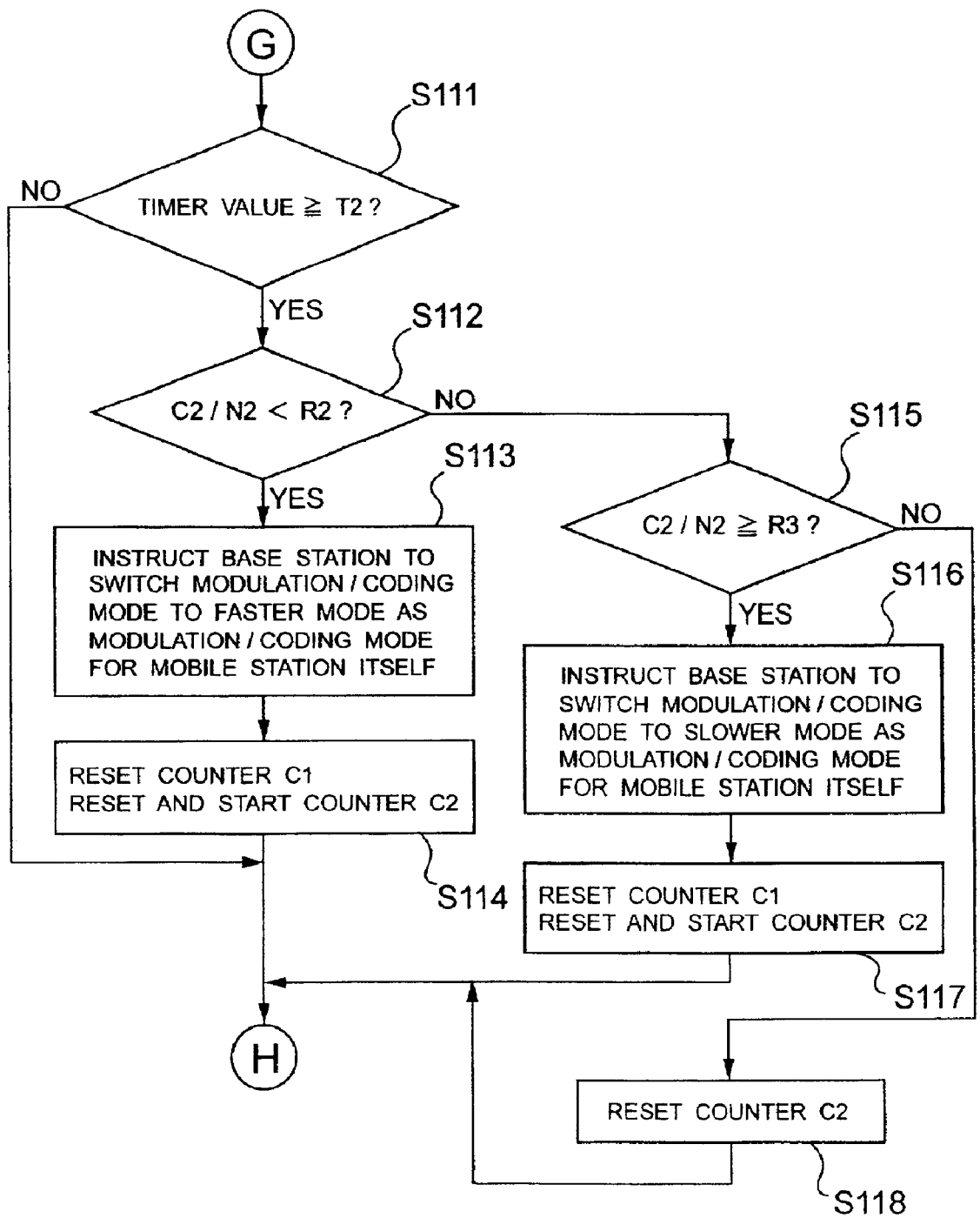
FIG. 28 is a flow chart showing an operation of modulation/coding mode switching selection by the modulation/coding mode switching selecting portion of FIG. 26.

FIGS. 27 and 28 are a flowchart showing an operation of modulation/coding mode switching selection by the modulation/coding mode switching selecting portion 51 of FIG. 26. The operation of modulation/coding mode switching selection by the modulation/coding mode switching selecting portion 51 according to the eighth embodiment of the present invention will be described with reference to FIGS. 26 to 28.

When transmission of a data block from the base station 4 to the mobile station 5 is started (step S101 in FIG. 27), the selection control portion 514 of the modulation/coding mode switching selecting portion 51 starts the receipt failure block number counter (C2) 516 (step S102 in FIG. 27). The selection control portion 514 starts the timer (T2) 520 following the start of the receipt failure block number counter (C2) 516.

Thereafter, if the determination result from the error detecting portion 27 shows that a receiving error exists (step S103 in FIG. 27), the selection control portion 514 starts and increments the receipt failure block number counter (C1) 515 (C1←C1+1) (step S104 in FIG. 27) and, at the same time, increments the receipt failure block number counter (C2) 516 (C2+←C2+1) (step S105 in FIG. 27). Further, the selection control portion 514 starts the timer (T1) 519 following the start of the receipt failure block number counter (C1) 515.

When the timer (T1) 519 is up (timer value≧T1) (step S106 in FIG. 27), if a value found by dividing the count value C1 of the receipt failure block number counter (C1) 515 by the number of blocks=N1 to be transmitted during the predetermined time T1 (block error rate=C1/N1) is smaller than the block error rate R1 set in advance (step S107 in FIG. 27), the selection control portion 514 resets the receipt failure block number counter (C1) 515 (C1←0) (step S108 in FIG. 27) and returns to step S101.

In addition, if the block error rate (=C1/N1) is larger than the block error rate R1 set in advance (step S107 in FIG. 27), the selection control portion 514 instructs the base station 4 to switch the modulation/coding mode to a slower mode as a modulation/coding mode for the mobile station 5 itself (step S109 in FIG. 27), resets the receipt failure block number counter (C1) 515 (C1←0), resets the receipt failure block number counter (C2) 516 (C2←0) and restarts the receipt failure block number counter (C2) 516 (step S110 in FIG. 27) and returns to step S101.

When the timer (T2) 520 is up (timer value≧T2) (step Sill in FIG. 28), if a value found by dividing the count value C2 of the receipt failure block number counter (C2) 516 by the number of blocks=N2 to be transmitted during the predetermined time T2 (block error rate=C2/N2) is smaller than the block error rate R2 set in advance (step S112 in FIG. 28), the selection control portion 514 instructs the base station 4 to switch the modulation/coding mode to a faster mode as a modulation/coding mode for the mobile station 5 itself (step S113 in FIG. 28), resets the receipt failure block number counter (C1) 515 (C1←0), resets the receipt failure block number counter (C2) 516 (C2←0) and restarts the receipt failure block number counter (C2) 516 (step S114 in FIG. 28) and returns to step S101.

In addition, if the block error rate (=C2/N2) is equal to or larger than the block error rate R3 set in advance (step S115 in FIG. 28), the selection control portion 514 instructs the base station 4 to switch the modulation/coding mode to a slower mode as a modulation/coding mode for the mobile station 5 itself (step S116 in FIG. 28), resets the receipt failure block number counter (C1) 515 (C1←0), resets the receipt failure block number counter (C2) 516 (C2←0) and restarts the receipt failure block number counter (C2) 516 (step S117 in FIG. 28) and returns to step S101.

If the block error rate (=C2/N2) is smaller than the block error rate R3 set in advance (step S115 in FIG. 28), the selection control portion 514 resets the receipt failure block number counter (C2) 516 (C2←0) (step S118 in FIG. 28) and returns to step S101.

In this way, since the mobile station 5 switches the modulation/coding mode to a slower mode at the short predetermined time T1 in response to increase of a block error rate, it can promptly switch the modulation/coding mode to a slower mode when conditions of a transmission path are deteriorated.

In addition, since the mobile station 5 switches the modulation/coding mode to a faster mode at the predetermined time T2 that is longer than the predetermined time T1 in response to decrease of a block error rate, a target block error rate can be satisfied. Thus, the modulation/coding mode can be promptly switched to an optimal mode in the eighth embodiment of the present invention. In this case, since the switching to a faster mode is monitored at a long period, unnecessary switching of a mode can be reduced. Moreover, since switching to a slower mode is determined according to a plurality of block errors, unnecessary switching of a mode can also be reduced.

Figure 29:
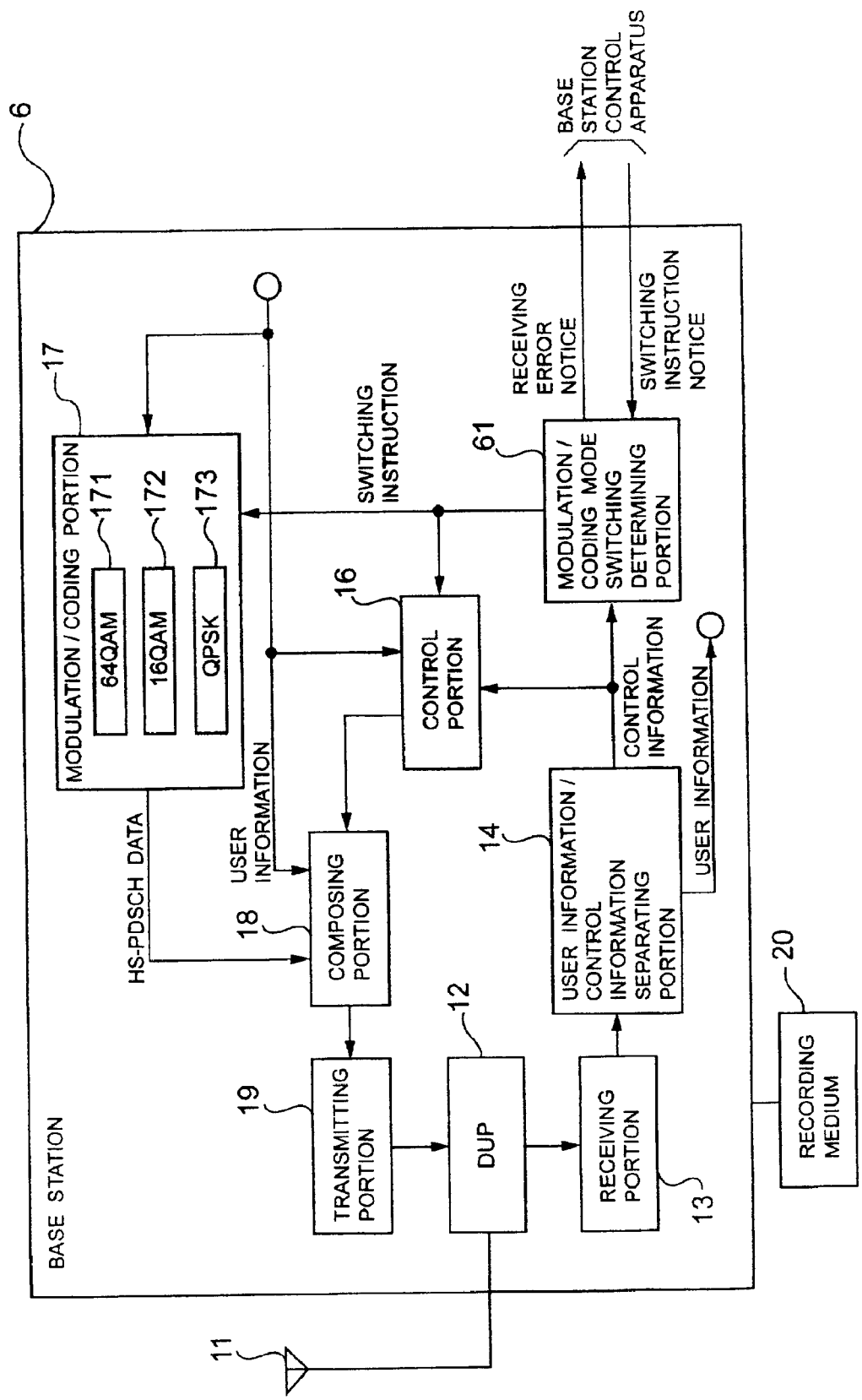
FIG. 29 is a block diagram showing a configuration of a base station according to a ninth embodiment of the present invention.

FIG. 29 is a block diagram showing a configuration of a base station 6 according to a ninth embodiment of the present invention. In FIG. 29, the base station 6 according to the ninth embodiment of the present invention has the same configuration as that of the base station 1 according to the first embodiment of the present invention shown in FIG. 2 except that a modulation/coding mode switching determining portion 61 is provided instead of the modulation/coding mode switching selecting portion 15 and the identical elements are denoted by the identical reference numerals. In addition, the operations of the identical elements are the same as those of the first embodiment of the present invention.

The modulation/coding mode switching determining portion 61 executes a program stored in the recording medium 20, thereby monitoring a receiving error notice from a not-shown mobile station, and, upon receiving a receiving error notice, forwards the receiving error notice to a not-shown base station control apparatus without adding any change to it.

In addition, the modulation/coding mode switching determining portion 61 also monitors a switching instruction notice from the base station control apparatus and, upon receiving a switching instruction notice, forwards an instruction to switch the modulation/coding mode to a mode slower than a current modulation/coding mode to the control portion 16 and the modulation/coding portion 17, respectively. Further, the above-described mobile station has the same configuration and operation as those of the mobile station 2 according to the first embodiment of the present invention shown in FIG. 3.

Figure 30:
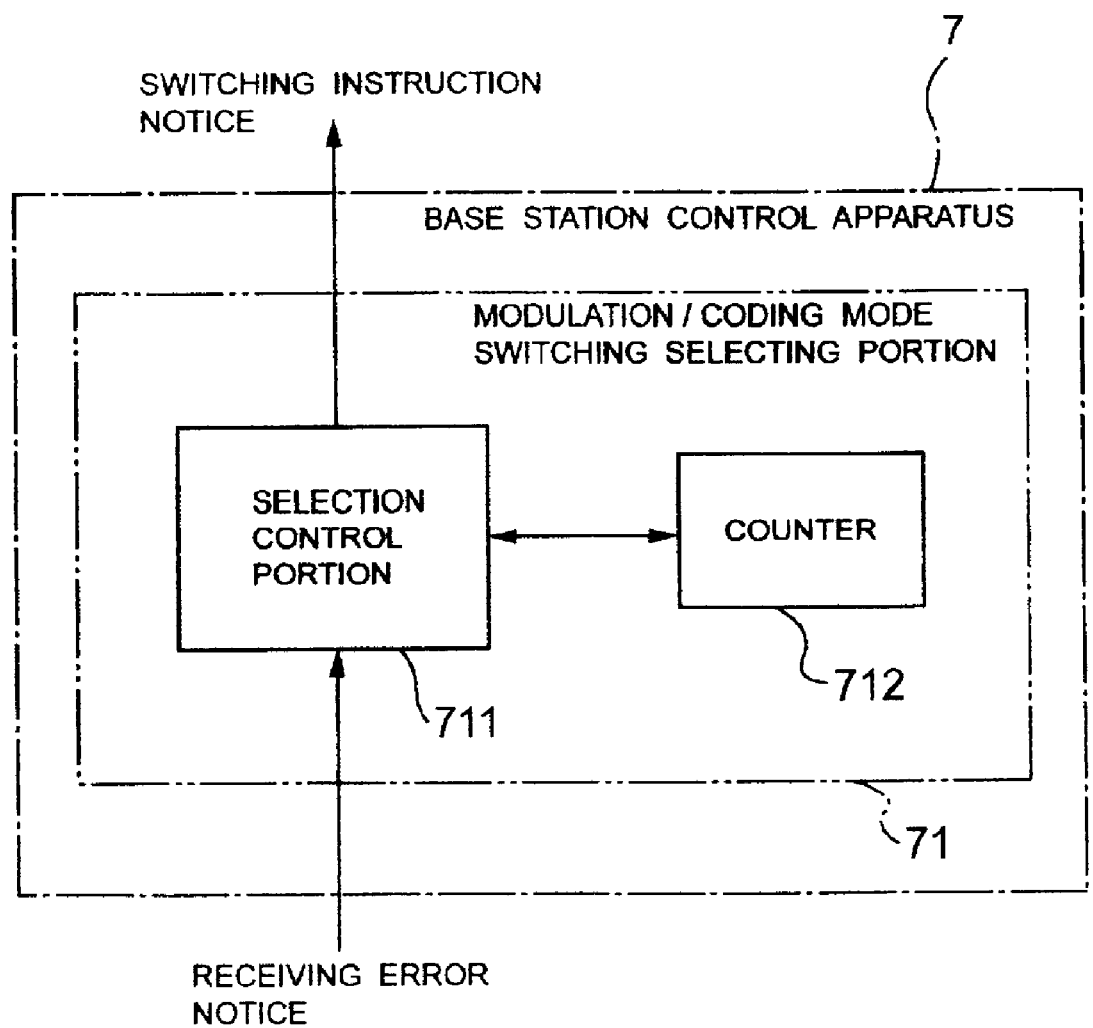
FIG. 30 is a block diagram showing a configuration of a base station control apparatus according to the ninth embodiment of the present invention.

FIG. 30 is a block diagram showing a configuration of a base station control apparatus 7 according to the ninth embodiment of the present invention. In FIG. 30, the base station control apparatus 7 is provided with a modulation/coding mode switching selecting portion 71 and the modulation/coding mode switching selecting portion 71 comprises a selection control portion 711 and a counter 712. Further, since a publicly-known technology is applicable to other controlled portions or the like of the base station control apparatus 7, descriptions on configurations and operations of these portions will be omitted.

Figure 31:
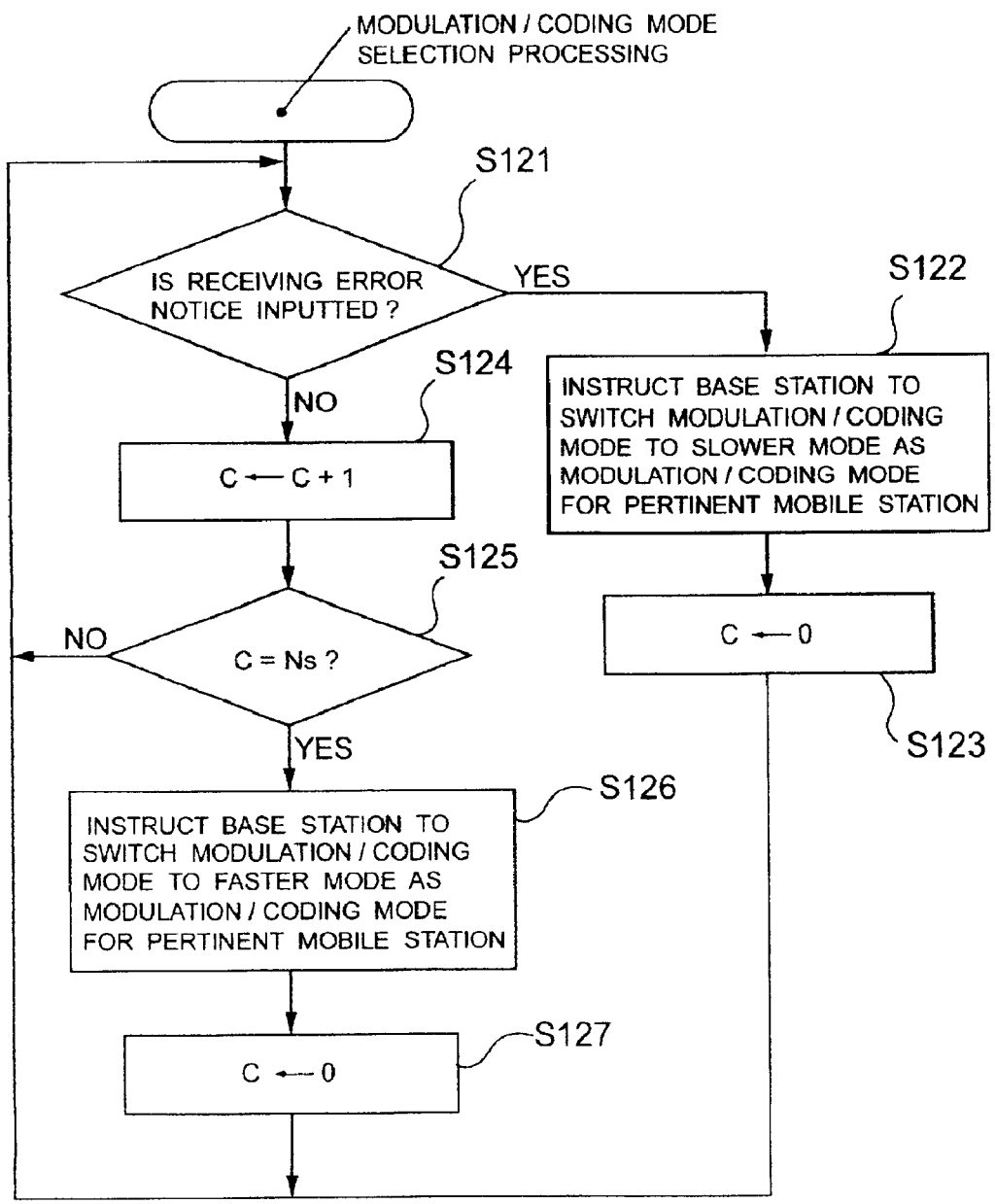
FIG. 31 is a flow chart showing an operation of modulation/coding mode switching selection by the modulation/coding mode switching selecting portion of FIG. 30.

FIG. 31 is a flow chart showing an operation of modulation/coding mode switching selection by the modulation/coding mode switching selecting portion 71 of FIG. 30. The operation of modulation/coding mode switching selection by the modulation/coding mode switching selecting portion 71 according to the ninth embodiment of the present invention will be described with reference to FIGS. 30 and 31.

Upon receiving a receiving error notice from the mobile station 2 via the base station 6(step S121 in FIG. 31), the selection control portion 711 of the modulation/coding mode switching selecting portion 71 instructs the base station 6 to switch the modulation/coding mode to a slower mode as a modulation/coding mode for the pertinent mobile station 2 (step S122 in FIG. 31) and clears a counter value C of the counter 712 (C←0) (step S123 in FIG. 31).

If a receiving error notice is not received from the mobile station 2 via the base station 6 (step S121 in FIG. 31), the selection control portion 711 increments the counter value C of the counter 712 (C←C+1) (step S124 in FIG. 31). When the incremented counter value C of the counter 712 is equal to the predetermined number of blocks Ns (C=Ns) (step S125 in FIG. 31), the selection control portion 711 instructs the base station 6 to switch the modulation/coding mode to a faster mode as a modulation/coding mode for the pertinent mobile station 2 (step S126 in FIG. 31) and clears the counter value C of the counter 712 (C←0) (step S127 in FIG. 31).

That is, upon receiving a receiving error notice from the mobile station 2 via the base station 6, the selection control portion 711 switches the modulation/coding mode to a slower mode and, if a data block is successfully received continuously for the predetermined number of blocks Ns or more after performing the switching, switches the modulation/coding mode to a faster mode.

In this way, since the base station control apparatus 7 switches the modulation/coding mode at an error of one block, it can promptly switch the modulation/coding block to a slower mode when conditions of a transmission path are deteriorated. In addition, when a target block error rate is satisfied, the base station control apparatus 7 can immediately switch the modulation/coding mode to a faster mode. Thus, the modulation/coding mode can be promptly switched to an optimal mode in the ninth embodiment of the present invention. In this case, since the predetermined number of blocks Ns is determined according to a target block error rate, the target block error rate can be satisfied.

Figure 32:
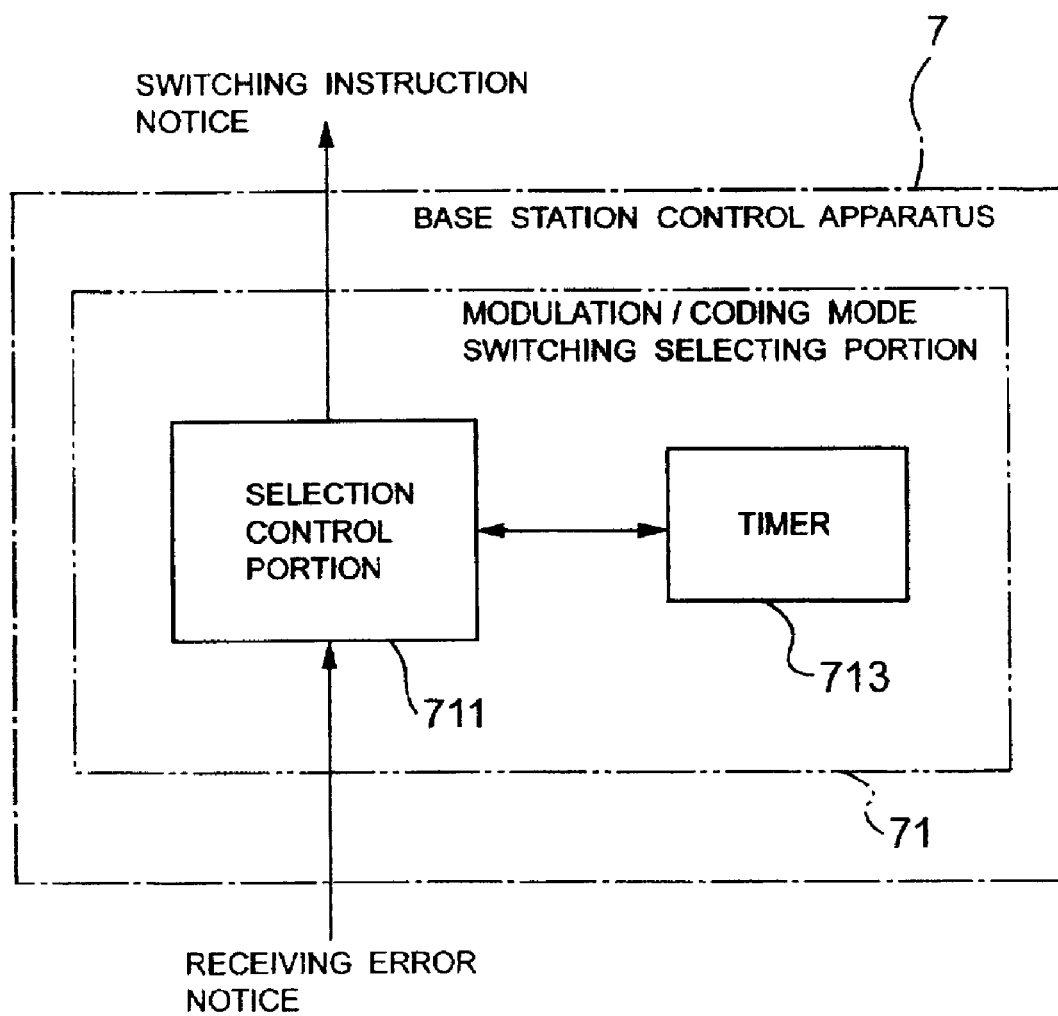
FIG. 32 is a block diagram showing a configuration of a modulation/coding mode switching selecting portion according to a tenth embodiment of the present invention.

FIG. 32 is a block diagram showing a configuration of the modulation/coding mode switching selecting portion 71 according to a tenth embodiment of the present invention. In FIG. 32, the modulation/coding mode switching selecting portion 71 comprises a selection control portion 711 and a timer 713. Further, although not shown, the tenth embodiment of the present invention has the same configuration as that of the mobile communication system shown in FIG. 1 and those of the base station 6 according to the ninth embodiment of the present invention shown in FIG. 29 and the mobile station 2 according to the first embodiment of the present invention shown in FIG. 3, descriptions on them will be omitted.

Figure 33:
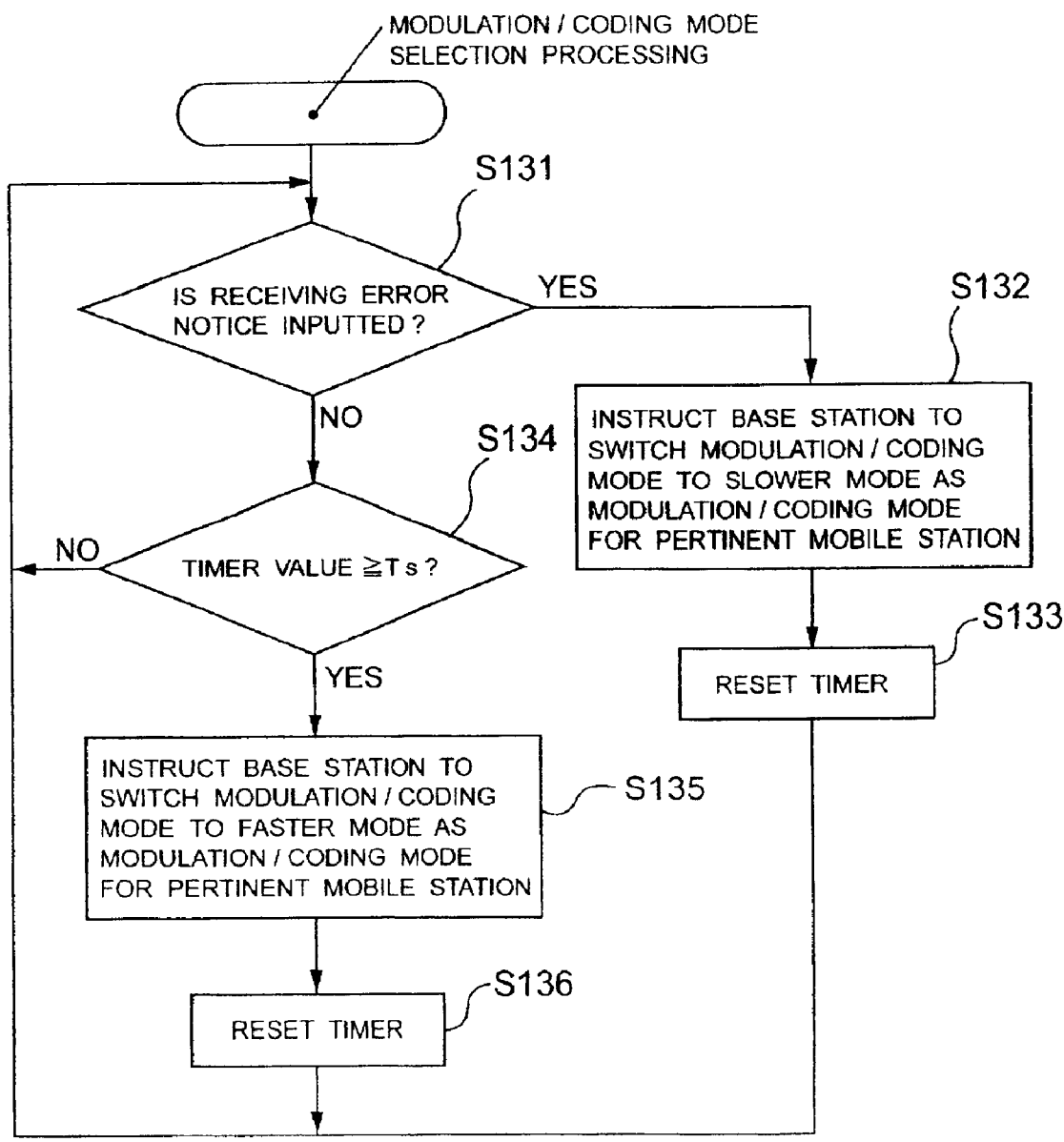
FIG. 33 is a flow chart showing an operation of modulation/coding mode switching selection by the modulation/coding mode switching selecting portion of FIG. 32.

FIG. 33 is a flow chart showing an operation of modulation/coding mode switching selection by the modulation/coding mode switching selecting portion 71 of FIG. 32. The operation of modulation/coding mode switching selection by the modulation/coding mode switching selecting portion 71 according to the tenth embodiment of the present invention will be described with reference to FIGS. 32 and 33.

Upon receiving a receiving error notice from the mobile station 2 via the base station 6 (step S131 in FIG. 33), the selection control portion 711 of the modulation/coding mode switching selecting portion 71 instructs the base station 6 to switch the modulation/coding mode to a slower mode as a modulation/coding mode for the pertinent mobile station 2 (step S132 in FIG. 33) and resets the timer 713 (step S133 in FIG. 33).

If a receiving error notice from the mobile station 2 is not received via the base station 6 (step S131 in FIG. 33), when a timer value of the timer 713 exceeds the predetermined time Ts (step S134 in FIG. 33), the selection control portion 711 instructs the base station 6 to switch the modulation/coding mode to a faster mode as a modulation/coding mode for the pertinent mobile station 2 (step S135 in FIG. 33) and resets the timer 713 (step S136 in FIG. 33).

That is, upon receiving a receiving error notice from the mobile station 2 via the base station 6, the selection control portion 711 switches the modulation/coding mode to a slower mode and, when a data block is successfully received continuously for the predetermined time Ts or more after performing the switching, switches the modulation/coding mode to a faster mode.

In this way, since the base station control apparatus 7 switches the modulation/coding mode at an error of one block, it can promptly switch the modulation/coding block to a slower mode when conditions of a transmission path are deteriorated. In addition, when a target block error rate is satisfied, the base station control apparatus 7 can immediately switch the modulation/coding mode to a faster mode. Thus, the modulation/coding mode can be promptly switched to an optimal mode in the tenth embodiment of the present invention. In this case, if the predetermined time Ts is time required for transmission of the predetermined number of blocks Ns, since the predetermined time Ts is determined according to a target block error rate, the target block error rate can be satisfied.

Figure 34:
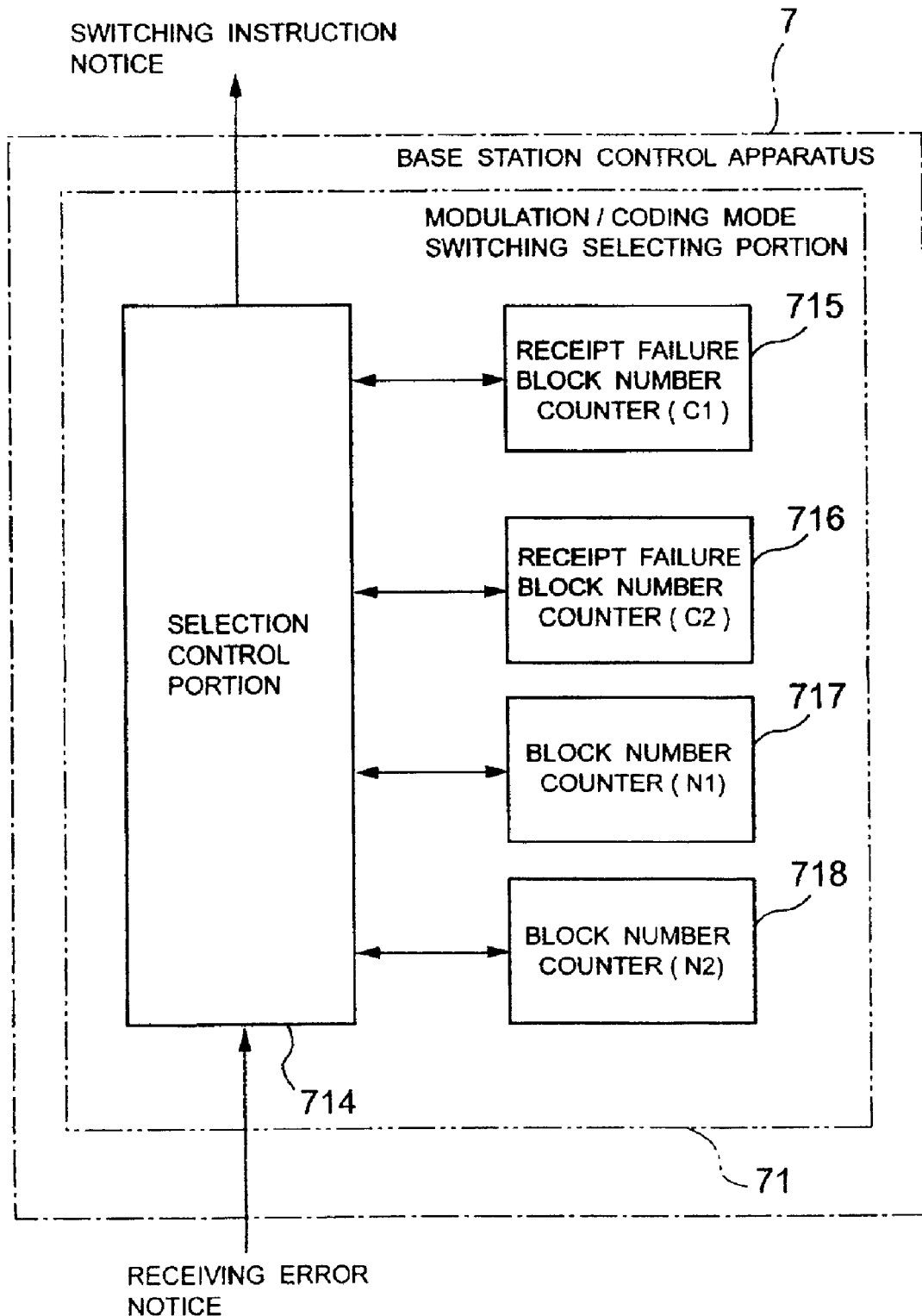
FIG. 34 is a block diagram showing a configuration of a modulation/coding mode switching selecting portion according to an eleventh embodiment of the present invention.

FIG. 34 is a block diagram showing a configuration of the modulation/coding mode switching selecting portion 71 according to an eleventh embodiment of the present invention. In FIG. 34, the modulation/coding mode switching selecting portion 71 comprises a selection control portion 714, a receipt failure block number counter (C1) 715, a receipt failure block number counter (C2) 716, a block number counter (N1) 717 and a block number counter (N2) 718. Further, although not shown, the eleventh embodiment of the present invention has the same configuration as that of the mobile communication system shown in FIG. 1 and those of the base station 6 according to the ninth embodiment of the present invention shown in FIG. 29 and the mobile station 2 according to the first embodiment of the present invention shown in FIG. 3, descriptions on them will be omitted.

Figure 35:
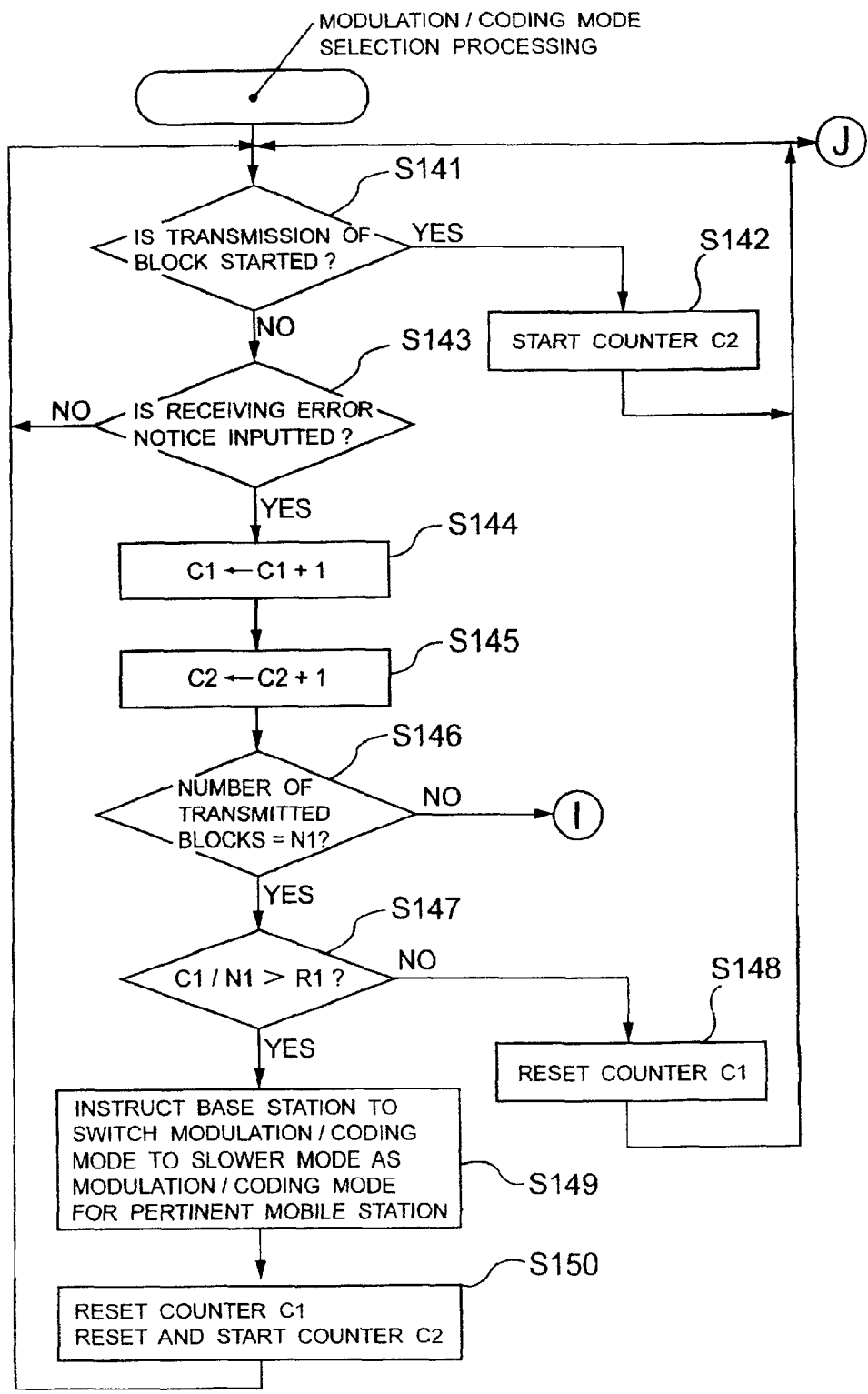
FIG. 35 is a flow chart showing an operation of modulation/coding mode switching selection by the modulation/coding mode switching selecting portion of FIG. 34.
Figure 36:
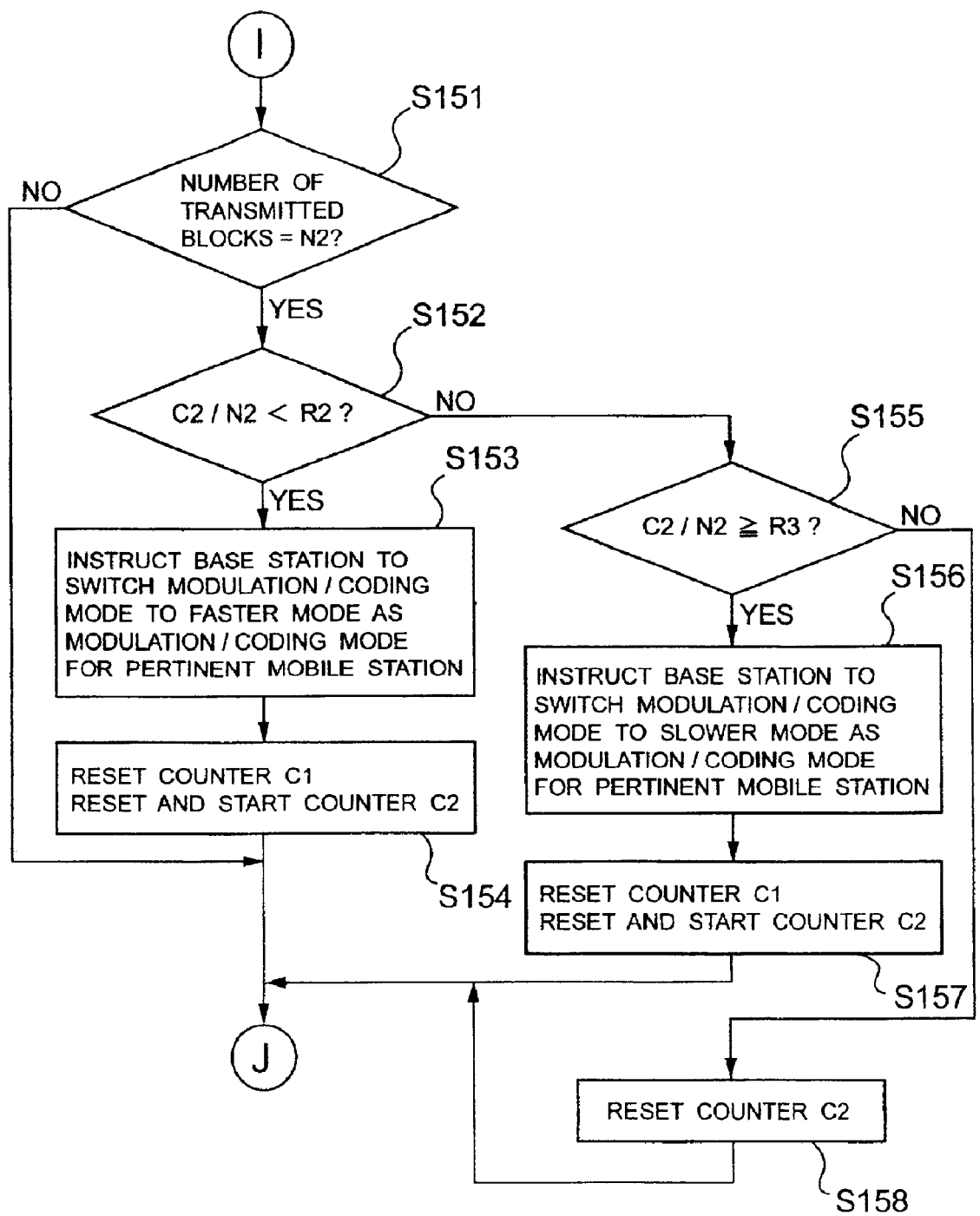
FIG. 36 is a flow chart showing an operation of modulation/coding mode switching selection by the modulation/coding mode switching selecting portion of FIG. 34.

FIGS. 35 and 36 are a flow chart showing an operation of modulation/coding switching selection by the modulation/coding mode switching selecting portion 71 of FIG. 34. The operation of modulation/coding mode switching selection by the modulation/coding mode switching selecting portion 71 according to the eleventh embodiment of the present invention will be described with reference to FIGS. 34 to 36.

When transmission of a data block from the base station 6 to the mobile station 2 is started (step S141 in FIG. 35), the selection control portion 714 of the modulation/coding mode switching selecting portion 71 starts the receipt failure block number counter (C2) 716 (step S142 in FIG. 35). Following the start of the receipt failure block number counter (C2) 716, the selection control portion 714 also starts the block number counter (N2) 718 and increments the block number counter (N2) 718 each time transmission of a data block is performed.

Thereafter, upon receiving a receiving error notice from the mobile station 2 via the base station 6 (step S143 in FIG. 35), the selection control portion 714 starts and increments the receipt failure block number counter (C1) 715 (C1←C1+1) (step S144 in FIG. 35) and, at the same time, increments the receipt failure block number counter (C2) 716 (C2←C2+1) (step S145 in FIG. 35). Further, following the start of the receipt failure block number counter (C1) 715, the selection control portion 714 also starts the block number counter (N1) 717 and increments the block number counter (N1) 717 each time transmission of a data block is performed.

When the block number counter (N1) 717 is counted up (the number of transmitted blocks=N1) (step S146 in FIG. 35), if a value found by dividing the count value C1 of the receipt failure block number counter (C1) 715 by the number of transmitted blocks=N1 (block error rate=C1/N1) is smaller than a block error rate R1 set in advance (step S147 in FIG. 35), the selection control portion 714 resets the receipt failure block number counter (C1) 715 (C1←0) (step S148 in FIG. 35) and returns to step S141.

In addition, if the block error rate=(C1/N1) is larger than the block error rate R1 set in advance (step S147 in FIG. 35), the selection control portion 714 instructs the base station 6 to switch the modulation/coding mode to a slower mode as a modulation/coding mode for the pertinent mobile station 2 (step S149 in FIG. 35), resets the receipt failure block number counter (C1) 715 (C1←0), resets the receipt failure block number counter (C2) 716 (C2←0) and restarts the receipt failure block number counter (C2) 716 (step S150 in FIG. 35) and returns to step S141.

When the block number counter (N2) 718 is counted up (number of transmitted blocks=N2) (step S151 in FIG. 36), if a value found by dividing the count value C2 of the receipt failure block number counter (C2) 716 by the number of transmitted blocks=N2 (block error rate=C2/N2) is smaller than a block error rate R2 set in advance (step S152 in FIG. 36), the selection control portion 714 instructs the base station 6 to switch the modulation/coding mode to a faster mode as a modulation/coding mode for the pertinent mobile station 2 (step S153 in FIG. 36), resets the receipt failure block number counter (C1) 715 (C1←0), resets the receipt failure block number counter (C2) 716 (C2←0) and restarts the receipt failure block number counter (C2) 716 (step S154 in FIG. 36) and returns to step S141.

In addition, if the block error rate=(C2/N2) is equal to or larger than a block error rate R3 set in advance (step S155 in FIG. 36), the selection control portion 714 instructs the base station 6 to switch the modulation/coding mode to a slower mode as a modulation/coding mode for the pertinent mobile station 2 (step S156 in FIG. 36), resets the receipt failure block number counter (C1) 715 (C1←0), resets the receipt failure block number counter (C2) 716 (C2←0) and restarts the receipt failure block number counter (C2) 716 (step S157 in FIG. 36) and returns to step S141.

If the block error rate=(C2/N2) is smaller than the block error rate R3 set in advance (step S155 in FIG. 36), the selection control portion 714 resets the receipt failure block number counter (C2) 716 (C2←0) (step S158 in FIG. 36) and returns to step S141.

In this way, since the base station control apparatus 7 switches the modulation/coding mode to a slower mode at the few predetermined number of blocks N1 in response to increase of a block error rate, it can promptly switch the modulation/coding mode to a slower mode when conditions of a transmission path are deteriorated.

In addition, since the base station control apparatus 7 switches the modulation/coding mode to a faster mode at the predetermined number of blocks N2 that is larger than the predetermined number of blocks N1 in response to decrease of a block error rate, a target block error rate can be satisfied. Thus, the modulation/coding mode can be promptly switched to an optimal mode in the eleventh embodiment of the present invention. In this case, since the switching to a faster mode is monitored at a long period, unnecessary switching of a mode can be reduced. Moreover, switching to a slower mode is determined according to a plurality of block errors, whereby unnecessary switching of a mode can also be reduced.

Figure 37:
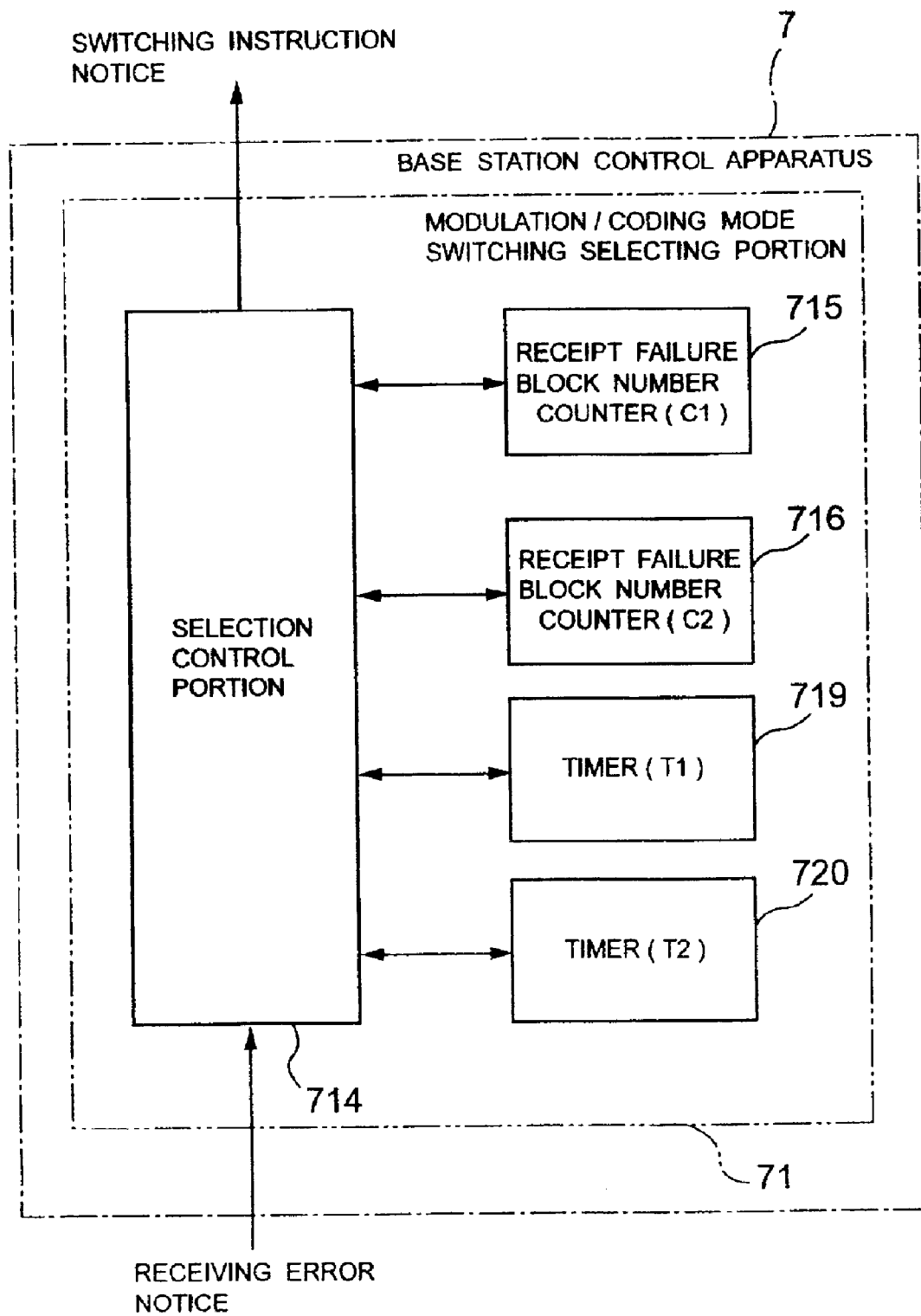
FIG. 37 is a block diagram showing a configuration of a modulation/coding mode switching selecting portion according to a twelfth embodiment of the present invention.

FIG. 37 is a block diagram showing a configuration of the modulation/coding mode switching selecting portion 71 according to a twelfth embodiment of the present invention. In FIG. 37, the modulation/coding mode switching selecting portion 71 according to the twelfth embodiment of the present invention has the same configuration as that of the modulation/coding mode switching selecting portion 71 according to the eleventh embodiment of the present invention shown in FIG. 34 except that it is provided with a timer (T1) 719 and a timer (T2) 720 instead of the block number counter (N1) 717 and the block number counter (N2) 718 and the identical elements are denoted by the identical reference numerals. In addition, operations of the identical elements are the same as those in the eleventh embodiment.

Figure 38:
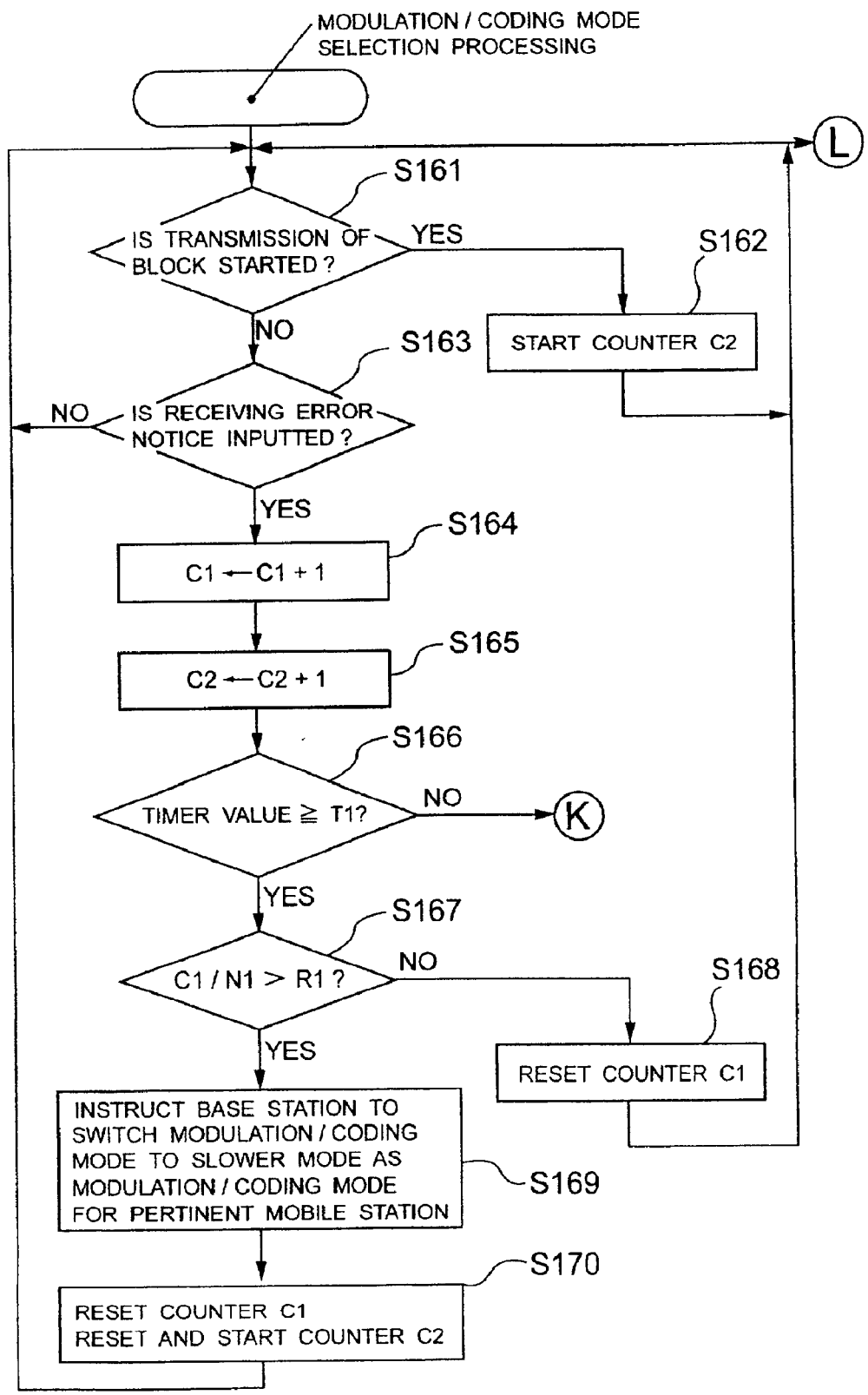
FIG. 38 is flow chart showing an operation of modulation/coding mode switching selection by the modulation/coding mode switching selecting portion of FIG. 37.
Figure 39:
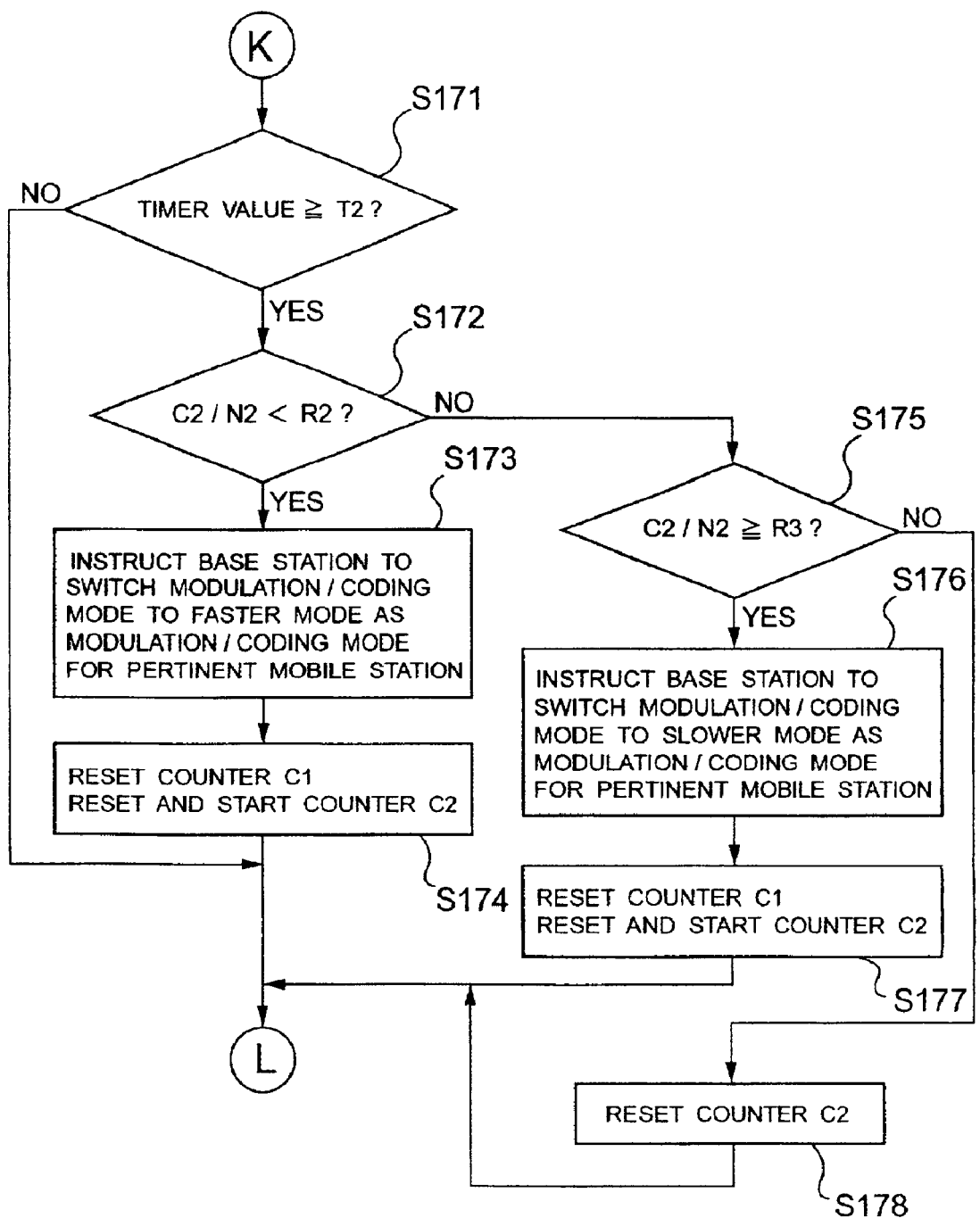
FIG. 39 is a flow chart showing an operation of modulation/coding mode switching selection by the modulation/coding mode switching selecting portion of FIG. 37.
Figure 40:
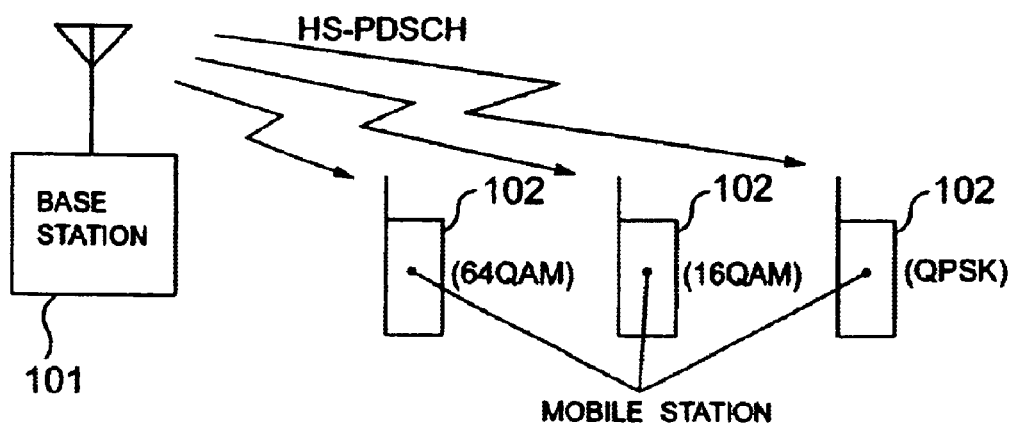
FIG. 40 illustrates an example of an operation of conventional modulation/coding mode switching selection.
Figure 41:
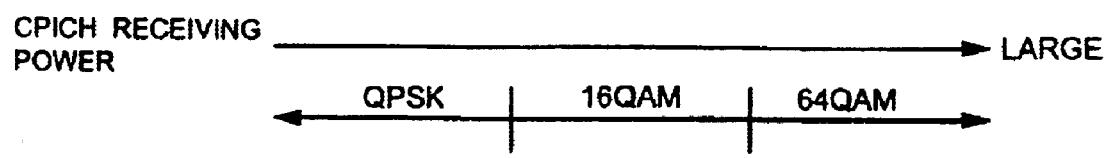
FIG. 41 illustrates an example of an operation of modulation/coding mode switching selection of a first prior art.
Figure 42:
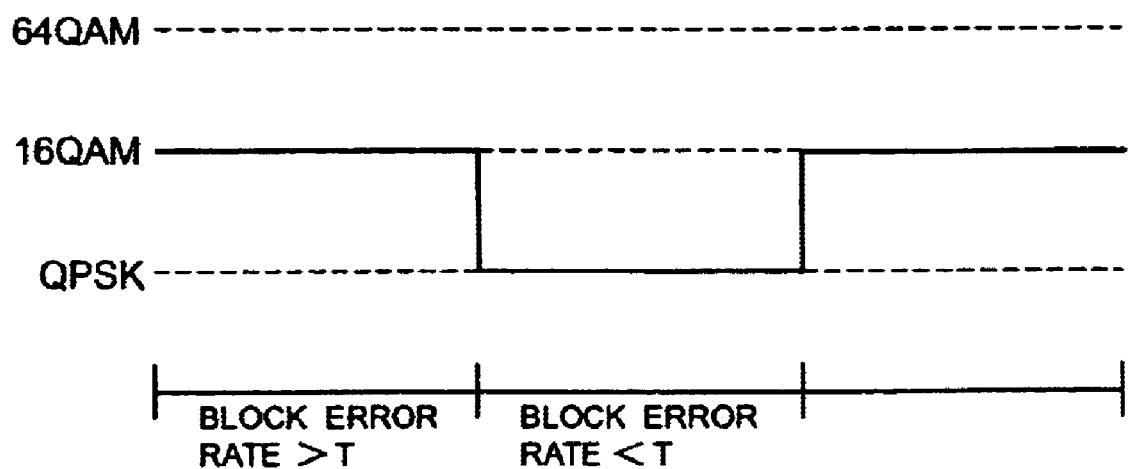
FIG. 42 illustrates an example of an operation of modulation/coding mode switching selection of a second prior art.

FIGS. 38 and 39 are a flowchart showing an operation of modulation/coding mode switching selection by the modulation/coding mode switching selecting portion 71 of FIG. 37. The operation of modulation/coding mode switching selection by the modulation/coding mode switching selecting portion 71 according to the twelfth embodiment of the present invention will be described with reference to FIGS. 37 to 39.

When transmission of a data block from the base station 6 to the mobile station 2 is started (step S161 in FIG. 38), the selection control portion 714 of the modulation/coding mode switching selecting portion 71 starts the receipt failure block number counter (C2) 716 (step S162 in FIG. 38). The selection control portion 714 starts the timer (T2) 720 following the start of the receipt failure block number counter (C2) 716.

Thereafter, when a receiving error notice from the mobile station 2 is received via the base station 6 (step S163 in FIG. 38), the selection control portion 714 starts and increments the receipt failure block number counter (C1) 715 (C1←C1+1) (step S164 in FIG. 38) and, at the same time, increments the receipt failure block number counter (C2) 716 (C2←C2+1) (step S165 in FIG. 38). Further, the selection control portion 714 starts the timer (T1) 719 following the start of the receipt failure block number counter (C1) 715.

When the timer (T1) 719 is up (timer value≧T1) (step S166 in FIG. 38), if a value found by dividing the count value C1 of the receipt failure block number counter (C1) 715 by the number of blocks=N1 to be transmitted during the predetermined time T1 (block error rate=C1/N1) is smaller than the block error rate R1 set in advance (step S167 in FIG. 38), the selection control portion 714 resets the receipt failure block number counter (C1) 715 (C←0) (step S168 in FIG. 38) and returns to step S161.

In addition, if the block error rate (=C1/N1) is larger than the block error rate R1 set in advance (step S167 in FIG. 38), the selection control portion 714 instructs the base station 6 to switch the modulation/coding mode to a slower mode as a modulation/coding mode for the pertinent mobile station 2

(step S169 in FIG. 38), resets the receipt failure block number counter (C1) 715 (C1←0), resets the receipt failure block number counter (C2) 716 (C2←0) and restarts the receipt failure block number counter (C2) 716 (step S170 in FIG. 38) and returns to step S161.

When the timer (T2) 720 is up (timer value≧T2) (step S171 in FIG. 39), if a value found by dividing the count value C2 of the receipt failure block number counter (C2) 716 by the number of blocks=N2 to be transmitted during the predetermined time T2 (block error rate=C2/N2) is smaller than the block error rate R2 set in advance (step S172 in FIG. 39), the selection control portion 714 instructs the base station 6 to switch the modulation/coding mode to a faster mode as a modulation/coding mode for the pertinent mobile station 2 (step S173 in FIG. 39), resets the receipt failure block number counter (C1) 715 (C1←0), resets the receipt failure block number counter (C2) 716 (C2←0) and restarts the receipt failure block number counter (C2) 716 (step S174 in FIG. 39) and returns to step S161.

In addition, if the block error rate (=C2/N2) is equal to or larger than the block error rate R3 set in advance (step S175 in FIG. 39, the selection control portion 714 instructs the base station 6 to switch the modulation/coding mode to a slower mode as a modulation/coding mode for the pertinent mobile station 2 (step S176 in FIG. 39), resets the receipt failure block number counter (C1) 715 (C1←0), resets the receipt failure block number counter (C2) 716 (C2←0) and restarts the receipt failure block number counter (C2) 716 (step S177 in FIG. 39) and returns to step S161.

If the block error rate (=C2/N2) is smaller than the block error rate R3 set in advance (step S175 in FIG. 39), the selection control portion 714 resets the receipt failure block number counter (C2) 716 (C2←0) (step S178 in FIG. 39) and returns to step S161.

In this way, since the base station control apparatus 7 switches the modulation/coding mode to a slower mode at the short predetermined time T1 in response to increase of a block error rate, it can promptly switch the modulation/coding mode to a slower mode when conditions of a transmission path are deteriorated.

In addition, since the base station control apparatus 7 switches the modulation/coding mode to a faster mode at the predetermined time T2 that is longer than the predetermined time T1 in response to decrease of a block error rate, a target block error rate can be satisfied. Thus, the modulation/coding mode can be promptly switched to an optimal mode in the twelfth embodiment of the present invention. In this case, since the switching to a faster mode is monitored at a long period, unnecessary switching of a mode can be reduced. Moreover, since switching to a slower mode is determined according to a plurality of block errors, unnecessary switching of a mode can also be reduced.

As described above, according to the present invention, there is an effect that, in a mobile communication system capable of selecting any one of a plurality of modulation/coding modes, which are used for data transmission of a unit of block between a base station controlled by a base station control apparatus and a mobile station, occurrence of a receiving error of a unit of block in data transmission is detected by the mobile station and switching of a modulation/coding mode is performed based on the occurrence of the detected receiving error, whereby selection of an optimal modulation/coding mode can be performed easily.

The present invention is not limited to the above embodiments and various changes and modifications can be made within the spirit and scope of the present invention.

Therefore, to apprise the public of the scope of the present invention the following claims are made.

What is claimed is:

1. A mobile communication system for transmitting data, in a unit of a block of data, in any one of a plurality of transmission modes, said system comprising:

a base station;

a base station control apparatus for controlling said base station;

a mobile station comprising a detecting unit for detecting a receiving error in a unit of a block of data during the data transmission;

switching selecting means for switching the transmission mode, based on the detection of the receiving error, wherein said switching selecting means is configured to switch the transmission mode to a first slow mode, which is slower than a current mode, when the block error rate in a first predetermined number of blocks is larger than a first predetermined block error rate, to switch the transmission mode to a fast mode, which is faster than the current mode, when the block error rate in a second predetermined number of blocks is smaller than a second predetermined block error rate, and to switch the transmission mode to a second slow mode, slower than the current mode, when the block error rate in the second predetermined number of blocks is equal to or larger than a third predetermined block error rate, where the second predetermined number of blocks is greater than the first predetermined number of blocks.

2. The mobile communication system according to claim 1, wherein said switching selecting means configured to switch said transmission mode to the fast mode when successful receipt of the data transmission by said detecting means has been detected m times, (where m is an integer larger than) 2.

3. The mobile communication system according to claim 2, wherein said switching selecting means is configured to switch to the fast mode based on a target block error rate in the data transmission.

4. The mobile communication system according to claim 1, wherein said switching selecting means is further configured to determine the first predetermined number of blocks, the second predetermined number of blocks, the first predetermined block error rate, the second predetermined block error rate, and the third predetermined block error rate according to a target block error rate in the data transmission.

5. The mobile communication system according to claim 1, wherein said switching selecting means is disposed in said base station.

6. The mobile communication system according to claim 1, wherein said switching selecting means is disposed in said base station control apparatus.

7. The mobile communication system according to claim 1, wherein said switching selecting means is disposed in said mobile station.

8. The mobile communication system according to claim 1, wherein the first slow mode and the second slow mode are the same.

9. A mobile communication system for transmitting data, in a unit of a block of data, in any one of a plurality of transmission modes, said system comprising:
- a base station;
- a base station control apparatus for controlling said base station;
- a mobile station comprising a detecting unit for detecting a receiving error in a unit of a block of data during the data transmission;
- switching selecting means for switching the transmission mode, based on the detection of the receiving error,
- wherein said switching selecting means configured to switch the transmission mode to a first slow mode, which is slower than a current mode, when the block error rate during a first predetermined time period is larger than a first predetermined block error rate, to switch the transmission mode to a fast mode, which is faster than the current mode, when the block error rate during a second predetermined time period is smaller than a second predetermined block error rate, and to switch the transmission mode to a second slow mode, which is slower than the current mode, when the block error rate in the second predetermined time period is equal to or larger than a third predetermined block error rate, where the second predetermined time period is greater than the first predetermined time period.

10. The mobile communication system according to claim 9,
- wherein the second predetermined time period is shorter than the third predetermined time period.

11. The mobile communication system according to claim 10,
- wherein the second predetermined time period and the third predetermined time period are based on a ratio of data transmission speeds in the fast mode and the second slow mode.

12. The mobile communication system according to claims 9,
- wherein said switching selecting means further configured to determine the first predetermined time period, the second predetermined time period, the first predetermined block error rate, the second predetermined block error rate, and the third predetermined block error rate according to a target block error rate in the data transmission.

13. The mobile communication system according to claim 9, wherein the first slow mode and the second slow mode are the same.

14. The mobile communication system according to claim 9,
- wherein said switching selecting means is disposed in said base station.

15. The mobile communication system according to claim 9,
- wherein said switching selecting means is disposed in said base station control apparatus.

16. The mobile communication system according to claim 9,
- wherein said switching selecting means is disposed in said mobile station.

17. A transmission mode switching method for selecting any one of a plurality of transmission modes for data transmission of a unit of a block of data between a base station controlled by a base station control apparatus and a mobile station, said method comprising:
- detecting a receiving error in a unit of a block of data during the data transmission to said mobile station; and
- on detection of the receiving error, switching the transmission mode to a first slow mode, which is slower than a current mode, when the block error rate in a first predetermined number of blocks is larger than a first predetermined block error rate, switching the transmission mode to a fast mode, which is faster than the current mode, when the block error rate in a second predetermined number of blocks is smaller than a second predetermined block error rate, and switching the transmission mode to a second slow mode, slower than the current mode, when the block error rate in the second predetermined number of blocks is equal to or larger than a third predetermined block error rate, where the second predetermined number of blocks is greater than the first predetermined number of blocks.

18. The transmission mode switching method according to claim 17,
- wherein transmission mode is switched to the fast mode when successful receipt of the data transmission has been detected m times, where (m is an integer larger than) 2.

19. The transmission mode switching method according to claim 17,
- wherein switching to the fast mode is based on a target block error rate in the data transmission.

20. The transmission mode switching method according to claim 17,
- wherein the first predetermined number of blocks, the second predetermined number of blocks, the first predetermined block error rate, the second predetermined block error rate, and the third predetermined block error rate are based on a target block error rate in the data transmission.

21. A transmission mode switching method for selecting any one of a plurality of transmission modes for data transmission of a unit of a block of data between a base station controlled by a base station control apparatus and a mobile station, said method comprising:
- detecting a receiving error in a unit of a block of data during the data transmission to said mobile station; and
- on detection of the receiving error, switching the transmission mode to a first slow mode, slower than a current mode, when the block error rate in a first predetermined time period is larger than a first predetermined block error rate, switching the transmission mode to a fast mode, faster than the current mode, when the block error rate in a second predetermined time period is smaller than a second predetermined block error rate, and switching the transmission mode to a second slow mode, slower than the current mode, when the block error rate in the second predetermined time period is equal to or larger than a third predetermined block error rate, where the second predetermined time period is greater than the first predetermined time period.

22. The transmission mode switching method according to claim 21,
- wherein the predetermined time period for switching the transmission mode to the fast mode is shorter than the predetermined time period for switching the transmission mode to the second slow mode.

23. The transmission mode switching method according to claim 22,
- wherein the predetermined time period for switching the transmission mode to the fast mode and the predetermined time period for switching the transmission mode to the second slow mode are based on a ratio of data transmission speeds.

24. The transmission mode switching method according to claim 21, the first predetermined time period, the second predetermined time period, the first predetermined block error rate, the second predetermined block error rate, and the third predetermined block error rate are based on a target block error rate in the data transmission.

25. A recording medium having recorded therein a program of a transmission mode switching method of a mobile communication system capable of selecting any one of a plurality of transmission modes used for data transmission of a unit of a block of data between a base station controlled by a base station control apparatus and a mobile station, wherein the program causes a computer to:

detect a receiving error of a unit of a block of data in the data transmission to said mobile station, and on detection of the receiving error, switch the transmission mode to a first slow mode, which is slower than a current mode, when the block error rate in a first predetermined number of blocks is larger than a first predetermined block error rate, switch the transmission mode to a fast made, which is faster than the current mode, when the block error rate in a second predetermined number of blocks is smaller than a second predetermined block error rate, and switch the transmission mode to a second slow mode, slower than the current mode, when the block error rate in the second predetermined number of blocks is equal to or larger than a third predetermined block error rate, where the second predetermined number of blocks is greater than the first predetermined number of blocks.

26. A recording medium having recorded therein a program of a transmission mode switching method of a mobile communication system capable of selecting any one of a plurality of transmission modes used for data transmission of a unit of a block of data between a base station controlled by a base station control apparatus and a mobile station, wherein the program causes a computer to:

detect a receiving error of a unit of a block of data in the data transmission to said mobile station, and on detection of the receiving error, switch the transmission mode to a first slow mode, slower than a current mode, when the block error rate in a first predetermined time period is larger than a first predetermined block error rate, switch the transmission mode to a fast mode, faster than the current mode, when the block error rate in a second predetermined time period is smaller than a second predetermined block error rate, and switch the transmission mode to a second slow mode, slower than the current mode, when the block error rate in the second predetermined time period is equal to or larger than a third predetermined block error rate, where the second predetermined time period is greater than the first predetermined time period.

* * * * *